(12) United States Patent
Reineccius et al.

(10) Patent No.: US 9,877,424 B2
(45) Date of Patent: Jan. 30, 2018

(54) SEED TREATMENT FACILITIES, METHODS AND APPARATUS

(75) Inventors: Greg A. Reineccius, Eden Praire, MN (US); Jaco Ernest Van Der Westhuizen, Lakeville, MN (US); Alan W. Geiss, Kansas City, MO (US); Bradley W. May, Cary, NC (US); Tharacad S. Ramanarayanan, Cary, NC (US); Marc Jean-Marie Andrieux, Chapel Hill, NC (US)

(73) Assignee: Bayer CropScience, LP, Research Triangle Park, NC (US)

( * ) Notice: Subject to any disclaimer, the term of this patent is extended or adjusted under 35 U.S.C. 154(b) by 1433 days.

(21) Appl. No.: 13/314,146

(22) Filed: Dec. 7, 2011

(65) Prior Publication Data

US 2012/0189762 A1    Jul. 26, 2012

Related U.S. Application Data

(60) Provisional application No. 61/421,030, filed on Dec. 8, 2010, provisional application No. 61/469,432, filed (Continued)

(51) Int. Cl.
*B05C 9/00* (2006.01)
*B05C 11/10* (2006.01)
(Continued)

(52) U.S. Cl.
CPC ............ *A01C 1/06* (2013.01); *G06K 7/10237* (2013.01); *G06Q 10/0631* (2013.01);
(Continued)

(58) Field of Classification Search
None
See application file for complete search history.

(56) References Cited

U.S. PATENT DOCUMENTS

| 1,545,480 A | 7/1925 | Boyle |
| 2,105,266 A | 1/1938 | Rendall |
| (Continued) | | |

FOREIGN PATENT DOCUMENTS

| CL | 0671-1992 | 6/1992 |
| CL | 38436 | 9/1992 |
| (Continued) | | |

OTHER PUBLICATIONS

GLCPS Gustafson Logic Controlled Proportioning System; 48 pages; Feb. 27, 2004.

(Continued)

*Primary Examiner* — Binu Thomas

(57) ABSTRACT

A seed treatment system having a central computerized data store, a user interface, and network connections from the data store to a plurality of retail facilities and a plurality of agricultural produce suppliers. Each retail facility having a seed treatment system configured to uniformly treat batches of seeds with any of a variety of precisely measured chemical formulations. The seed treatment apparatus having a treatment applicator coupled to a plurality of dispensing stations. Each dispensing stations having a pump in fluid communication with a container disposed on a scale. The pump and scale of each dispensing station coupled to a system controller. The system controller is coupled to the data store, configured to provide on-demand agricultural seed treatments to the applicator and chemical usage data from each station to the data store. The data store configured to provide centralized remote monitoring inventory control, supply chain monitoring, and container recycling compliance.

16 Claims, 49 Drawing Sheets

Related U.S. Application Data on Mar. 30, 2011, provisional application No. 61/469,370, filed on Mar. 30, 2011, provisional application No. 61/553,711, filed on Oct. 31, 2011, provisional application No. 61/553,692, filed on Oct. 31, 2011.

(51) Int. Cl.

| | | |
|---|---|---|
| *A01C 1/06* | (2006.01) | |
| *G06Q 10/06* | (2012.01) | |
| *G06Q 50/02* | (2012.01) | |
| *G06K 7/10* | (2006.01) | |
| *G06Q 10/08* | (2012.01) | |
| *A23B 9/14* | (2006.01) | |
| *A01C 21/00* | (2006.01) | |

(52) U.S. Cl.
CPC .......... *G06Q 10/087* (2013.01); *G06Q 50/02* (2013.01); *A01C 21/00* (2013.01); *A23B 9/14* (2013.01)

(56) References Cited

U.S. PATENT DOCUMENTS

| | | | |
|---|---|---|---|
| 2,416,725 A | 3/1947 | Williamson | |
| 2,502,809 A | 4/1950 | Vogelsang | |
| 2,673,024 A | 3/1954 | Kuss | |
| 2,925,197 A | 2/1960 | Frebel | |
| 3,348,738 A | 10/1967 | Hertlein | |
| 3,425,501 A | 2/1969 | Ganko | |
| 3,638,833 A | 2/1972 | Lucas | |
| 4,040,389 A | 8/1977 | Walters | |
| 4,045,004 A | 8/1977 | Berger | |
| 4,108,574 A | 8/1978 | Bartley et al. | |
| 4,208,954 A | 6/1980 | Chase | |
| 4,247,021 A | 1/1981 | Renier et al. | |
| 4,254,805 A | 3/1981 | Reeder | |
| 4,272,824 A | 6/1981 | Lewinger et al. | |
| 4,310,562 A * | 1/1982 | Melliger ................ | A61J 3/005 427/2.2 |
| 4,332,345 A | 6/1982 | Moran | |
| 4,361,232 A | 11/1982 | Olmsted | |
| 4,440,315 A | 4/1984 | Slobodnik | |
| 4,459,028 A | 7/1984 | Bruder et al. | |
| 4,465,017 A * | 8/1984 | Simmons ................ | A01C 1/06 118/19 |
| 4,494,619 A | 1/1985 | Matsuno | |
| 4,498,783 A | 2/1985 | Rudolph | |
| 4,500,038 A * | 2/1985 | De Ferrari ............ | B05B 7/1468 118/312 |
| 4,527,716 A | 7/1985 | Haas et al. | |
| 4,534,430 A | 8/1985 | Steel | |
| 4,544,279 A | 10/1985 | Rudolph | |
| 4,563,739 A | 1/1986 | Gerpheide et al. | |
| 4,579,252 A | 4/1986 | Wilson et al. | |
| 4,650,097 A | 3/1987 | Hagihara et al. | |
| 4,657,773 A | 4/1987 | Mueller | |
| 4,662,409 A | 5/1987 | Egli | |
| 4,689,249 A | 8/1987 | Thygesen | |
| 4,813,503 A | 3/1989 | Douglas et al. | |
| 4,846,345 A | 7/1989 | Hamuro et al. | |
| 4,863,277 A | 9/1989 | Neal et al. | |
| 4,936,978 A | 6/1990 | Bortnikov et al. | |
| 4,961,533 A | 10/1990 | Teller et al. | |
| 4,987,850 A | 1/1991 | McCracken | |
| 4,993,316 A | 2/1991 | Greer | |
| 5,040,699 A * | 8/1991 | Gangemi ................ | A61J 3/002 222/1 |
| 5,194,275 A * | 3/1993 | Greer ........................ | B02B 1/06 99/487 |
| 5,197,374 A | 3/1993 | Fond | |
| D337,774 S | 7/1993 | Schillinger | |
| 5,234,127 A | 8/1993 | Singer et al. | |
| 5,240,324 A * | 8/1993 | Phillips ................... | B01F 5/265 222/55 |
| 5,242,702 A | 9/1993 | Fond | |
| 5,255,819 A | 10/1993 | Peckels | |
| 5,285,925 A | 2/1994 | Leight | |
| 5,343,799 A | 9/1994 | Fond | |
| 5,400,921 A | 3/1995 | Smith, Jr. et al. | |
| 5,402,707 A | 4/1995 | Fond et al. | |
| 5,405,053 A | 4/1995 | Zublin | |
| 5,433,335 A | 7/1995 | Raudalus et al. | |
| 5,527,107 A | 6/1996 | Weibel et al. | |
| 5,551,492 A | 9/1996 | Rack et al. | |
| 5,567,238 A | 10/1996 | Long, Jr. et al. | |
| 5,568,882 A | 10/1996 | Takacs | |
| 5,603,430 A | 2/1997 | Loehrke et al. | |
| 5,606,094 A | 2/1997 | Besnier | |
| 5,632,818 A | 5/1997 | Toyoda et al. | |
| 5,632,819 A | 5/1997 | Geissler | |
| 5,638,519 A | 6/1997 | Haluska | |
| 5,656,316 A | 8/1997 | Fond et al. | |
| 5,712,990 A | 1/1998 | Henderson | |
| 5,769,276 A | 6/1998 | Alexander | |
| 5,863,277 A | 1/1999 | Melbourne | |
| 5,884,300 A | 3/1999 | Brockman | |
| 5,891,246 A | 4/1999 | Lund | |
| 5,894,111 A | 4/1999 | Kawanishi | |
| 5,897,899 A | 4/1999 | Fond | |
| 5,910,646 A | 6/1999 | Kawanishi | |
| 5,910,776 A | 6/1999 | Black | |
| 5,974,230 A | 10/1999 | Jenkins | |
| 5,983,960 A | 11/1999 | Haugh | |
| 6,021,443 A | 2/2000 | Bracho et al. | |
| 6,056,822 A * | 5/2000 | Jefferson ................ | A23K 1/001 118/19 |
| 6,092,726 A | 7/2000 | Toussant et al. | |
| 6,097,995 A | 8/2000 | Tipton et al. | |
| 6,167,679 B1 | 1/2001 | Horton-Steidle et al. | |
| 6,186,194 B1 | 2/2001 | Poupon | |
| 6,202,346 B1 | 3/2001 | Lyons et al. | |
| 6,209,259 B1 * | 4/2001 | Madigan ................ | A01C 21/00 47/57.6 |
| 6,253,928 B1 | 7/2001 | Weber | |
| 6,257,447 B1 | 7/2001 | Schlienger et al. | |
| 6,286,711 B1 | 9/2001 | Fukuda et al. | |
| 6,293,318 B1 | 9/2001 | Schmidt et al. | |
| 6,331,210 B1 * | 12/2001 | Dodd ...................... | A23P 1/085 118/24 |
| 6,412,661 B1 | 7/2002 | Hannah, Sr. | |
| 6,450,406 B2 | 9/2002 | Brown | |
| 6,472,615 B1 | 10/2002 | Carlson | |
| 6,551,402 B1 | 4/2003 | Renyer et al. | |
| 6,560,509 B2 | 5/2003 | Williams et al. | |
| 6,564,999 B1 | 5/2003 | Saveliev et al. | |
| 6,572,016 B2 | 6/2003 | Saveliev et al. | |
| 6,582,516 B1 | 6/2003 | Carlson | |
| 6,615,092 B2 | 9/2003 | Bickley et al. | |
| 6,666,573 B2 | 12/2003 | Grassi | |
| 6,675,728 B2 | 1/2004 | Lee et al. | |
| 6,684,119 B2 | 1/2004 | Burnard et al. | |
| 6,686,466 B2 | 2/2004 | Zhao et al. | |
| 6,711,798 B2 | 3/2004 | Sanders et al. | |
| 6,769,462 B2 | 8/2004 | Larson et al. | |
| 6,772,944 B2 | 8/2004 | Brown | |
| 6,783,082 B2 | 8/2004 | Renyer et al. | |
| 6,796,504 B2 | 9/2004 | Robinson | |
| 6,799,503 B2 | 10/2004 | Kollep et al. | |
| 6,806,429 B2 | 10/2004 | Carlson | |
| 6,816,746 B2 | 11/2004 | Bickley et al. | |
| 6,816,905 B1 | 11/2004 | Sheets et al. | |
| 6,843,415 B2 | 1/2005 | Vogler | |
| 6,907,741 B2 | 6/2005 | Kateman | |
| 6,953,069 B2 | 10/2005 | Galomb | |
| 6,968,876 B2 | 11/2005 | Yacko et al. | |
| 6,996,538 B2 | 2/2006 | Lucas | |
| 7,009,519 B2 | 3/2006 | Leonard et al. | |
| 7,020,680 B2 | 3/2006 | Defossé | |
| 7,053,773 B2 | 5/2006 | McGarry et al. | |
| 7,071,825 B2 | 7/2006 | VoBa | |
| 7,082,970 B2 | 8/2006 | Bartholomew et al. | |
| 7,083,093 B1 | 8/2006 | Brown | |
| 7,096,161 B2 | 8/2006 | Smith et al. | |

(56) References Cited

U.S. PATENT DOCUMENTS

| | | |
|---|---|---|
| 7,137,419 B1 | 11/2006 | Reeves |
| 7,156,259 B2 | 1/2007 | Bethuy et al. |
| 7,224,273 B2 | 5/2007 | Forster |
| 7,225,052 B2 | 5/2007 | Foote et al. |
| 7,233,241 B2 | 6/2007 | Overhultz et al. |
| 7,255,003 B2 | 8/2007 | Schneiter |
| 7,275,568 B2 | 10/2007 | Fredette et al. |
| 7,278,571 B2 | 10/2007 | Schmidtberg et al. |
| 7,292,993 B2 | 11/2007 | Uzzo et al. |
| 7,298,330 B2 | 11/2007 | Forster et al. |
| 7,299,981 B2 | 11/2007 | Hickle et al. |
| 7,385,510 B2 | 6/2008 | Childress et al. |
| 7,406,439 B2 | 7/2008 | Bodin et al. |
| 7,513,425 B2 | 4/2009 | Chung |
| 7,522,973 B1 | 4/2009 | Foote et al. |
| 7,542,926 B2 | 6/2009 | Arisman |
| 7,546,256 B2 | 6/2009 | Hillam et al. |
| 7,557,707 B2 | 7/2009 | Kumar et al. |
| 7,559,483 B2 | 7/2009 | Hickle et al. |
| 7,573,395 B2 | 8/2009 | Morrison et al. |
| 7,574,385 B2 | 8/2009 | Hillam et al. |
| 7,620,568 B1 | 11/2009 | Parker-Malchak |
| 7,640,194 B2 | 11/2009 | Bodin et al. |
| 7,630,923 B2 | 12/2009 | Harada et al. |
| 7,640,755 B1 | 1/2010 | Kateman |
| 7,650,298 B2 | 1/2010 | Godlewski |
| 7,735,365 B2 | 6/2010 | Crain et al. |
| 7,750,817 B2 | 7/2010 | Teller |
| 7,762,714 B2 | 7/2010 | Freeman et al. |
| 7,782,479 B2 | 8/2010 | Handa et al. |
| 7,805,340 B2 | 9/2010 | Blakeslee et al. |
| 7,855,637 B2 | 12/2010 | Forster |
| 7,858,888 B2 | 12/2010 | Lucas et al. |
| 7,869,902 B2 | 1/2011 | Hunter et al. |
| 7,899,713 B2 | 3/2011 | Rothschild |
| 8,458,953 B2 | 6/2013 | Hunter et al. |
| 8,504,211 B2 | 8/2013 | Applegate et al. |
| 8,621,780 B2 | 1/2014 | Ochampaugh |
| 2003/0010791 A1 | 1/2003 | Gentiluomo et al. |
| 2003/0214129 A1 | 11/2003 | Adler |
| 2004/0041714 A1 | 3/2004 | Forster |
| 2004/0045984 A1* | 3/2004 | Schuman ............ B01F 13/1055 222/181.3 |
| 2004/0065674 A1 | 4/2004 | Floyd et al. |
| 2004/0111335 A1 | 6/2004 | Black et al. |
| 2004/0193454 A1 | 9/2004 | Foote et al. |
| 2005/0000737 A1 | 1/2005 | Fox et al. |
| 2005/0151456 A1 | 7/2005 | Yoon et al. |
| 2005/0178144 A1 | 8/2005 | Crisp, III |
| 2005/0232731 A1 | 10/2005 | Lund |
| 2006/0173750 A1 | 8/2006 | Naley et al. |
| 2006/0236925 A1 | 10/2006 | Lund |
| 2006/0255060 A1* | 11/2006 | Miller ...................... A01C 1/08 222/63 |
| 2007/0029788 A1 | 2/2007 | Adler |
| 2007/0044820 A1 | 3/2007 | Chan et al. |
| 2007/0214055 A1 | 9/2007 | Temko |
| 2007/0225991 A1 | 9/2007 | Hollingsworth et al. |
| 2008/0009962 A1 | 1/2008 | Hood et al. |
| 2008/0033598 A1 | 2/2008 | Hollingsworth et al. |
| 2008/0136131 A1 | 6/2008 | Sorg et al. |
| 2008/0215345 A1 | 9/2008 | Hollingsworth et al. |
| 2008/0257975 A1 | 10/2008 | Matheis |
| 2008/0271927 A1 | 11/2008 | Crain et al. |
| 2009/0069930 A1 | 3/2009 | Peters et al. |
| 2009/0071857 A1 | 3/2009 | Astwood et al. |
| 2009/0087896 A1 | 4/2009 | Watson |
| 2009/0125460 A1 | 5/2009 | Hewison et al. |
| 2009/0125552 A1 | 5/2009 | Hunter et al. |
| 2009/0139907 A1 | 6/2009 | Hollingsworth et al. |
| 2009/0180899 A1* | 7/2009 | Dietrich .................... F04F 1/02 417/182.5 |
| 2009/0324815 A1 | 12/2009 | Nielsen et al. |
| 2010/0023430 A1 | 1/2010 | Hunter et al. |
| 2010/0089943 A1 | 4/2010 | Till |
| 2011/0027479 A1 | 2/2011 | Reineccius et al. |
| 2011/0093279 A1 | 4/2011 | Levine et al. |
| 2012/0046785 A1 | 2/2012 | Deo et al. |

FOREIGN PATENT DOCUMENTS

| | | |
|---|---|---|
| CL | 38645 | 3/1993 |
| CL | 38906 | 12/1994 |
| CL | 39638 | 8/1998 |
| CL | 1044-2001 | 5/2001 |
| CN | 2479482 Y | 2/2002 |
| DE | 34 15 160 A1 | 10/1985 |
| DE | 44 11 058 A1 | 10/1995 |
| DE | 201 13 798 U1 | 12/2001 |
| GB | 2 082 540 A | 3/1982 |
| JP | 2001-503622 A | 3/2001 |
| JP | 2003-189715 A | 7/2003 |
| KR | 10-2004-0000854 A | 1/2004 |
| RU | 2270547 C1 | 2/2006 |
| RU | 2317668 C1 | 2/2008 |
| WO | WO 98/18311 | 5/1998 |
| WO | WO 01/23820 A1 | 4/2001 |
| WO | WO 03/034329 A1 | 4/2003 |
| WO | WO 03/102845 A2 | 12/2003 |
| WO | WO 2005/100166 A1 | 10/2005 |
| WO | WO 2006/101394 A2 | 9/2006 |
| WO | WO 2008/007349 A1 | 1/2008 |
| WO | WO 2008/016368 A1 | 2/2008 |
| WO | WO 2011/017252 A1 | 2/2011 |

OTHER PUBLICATIONS

KSi AutoBatch V2: Controller and Database Option; 1 page; Sep. 1, 2009.

LX2000 Seed Treater with PLC Controls: Operators Manual 2009 Model; 63 pages; 2009.

New Seed Wheel Adds Precision to USC LLC Seed Treaters; 2 pages; Jul. 17, 2006.

Seed Transfer System User's Manual: vol. 1, KSI Conveyors, Inc., KSi Automation; 41 pages; Apr. 15, 2008.

HC 2000 & 3000 ACCU-COAT®: High Capacity Seed Treater; Bayer CropScience; 2 pages; Jun. 8, 2009.

LP4000 Seed Treater, Rev. D; 2 pages; Mar. 1, 2008.

Automatic Weight Dispensing System, Recommended for Hands-free, Closed loop Slurry Mixing, Bayer CropScience LP, Gustafson; 2 pages; prior to 2009.

GLCPS Seed Treatment System, Recommended for Barley, Corn, Cotton, Soybeans & Wheat, Bayer CropScience, Gustafson; 2 pages; prior to 2009.

RMOM, Rotary Mist-O-Matic 501 & 1001, Installation and Operation Manual, Bayer CropScience, Gustafson; RMOM © 2006 Gustafson Equipment RF M/021006/RMOM/409KB; 15 pages; 2006.

BMC Lab Treating System, Recommended for Alfalfa, Canola, Corn, Soybeans, Sugar Beet, Sunflower seeds, and Seed Percent Build-up; Bayer CropScience, Gustafson; 2 pages; prior to 2009.

"Expansion and Extension of the Green Technology Pilot Program," Federal Register, vol. 75, No. 217, Wednesday, Nov. 10, 2010, pp. 69049-69050.

"Elimination of Classification Requirement in the Green Technology Pilot Program," Federal Register, vol. 75, No. 98, Friday, May 21, 2010, pp. 28554-28555.

Seed Treatment Warning Label for AERIS Seed Applied Insectiside/Hermatcide; BayerCropscience; 2 pages; Sep. 2007.

Seed Treatment Warning Label for 42-S THIRAM Fungicide; Bayer CropScience LP; prior to Apr. 2012.

Installation Manual Commercial Series RH-800 & RH-2000; Gustafson-Bayer, 44 pages, rev. Nov. 9, 2009.

ACCU-TREAT® RH-800 & RH-2000, Rotary Seed Wheel Treater brochure, Gustafson, 1 page, rev. Jul. 1, 2009.

Crop Protection Bayer Systems for coverage you can count on, Gustafson Application Equipment and Accessories, Gustafson Equipment; Bayer CropScience; 15 pages; 2006.

(56) References Cited

OTHER PUBLICATIONS

Chemical Seed Treater Type CT 2-10 brochure, Petkus Technologie GmbH; 2 pages; Oct. 2007.
Chemical Seed Treater Type CT 1-10 brochure, Petkus Technologie GmbH; 2 pages; Oct. 2007.
Chemical Seed Treater Type CT 5-25 brochure, Petkus Technologie GmbH; 2 pages; Jun. 2008.
Mixing Chambers Blending and Film Coating; Bayer CropScience, Gustafson; 2 pages; Rev. Jun. 8, 2009.
Continuous Batch Treaters; Gustafson Equipment, Bayer CropScience; 4 pages; rev. Jul. 1, 2007.
Sayler, Tracy, "Dynasty Seed Treatment Adjusted," Sunflower Magazine, National Sunflower Association, 2 pages, Dec. 2006.
Yleef; Seed treatment costs 50 lb vs. 140000 units; Crop Talk; AgTalk; http://talkforums/thread-view.asp?tid=161818&mid=1161908; Posted Apr. 14, 2010 07:32; 2 pages.
A Combination Systemic and Contact Seed Protectant for Use on Lentils and Chickpeas. Crown ® Provides Control of Seed-Borne Ascochyta (*Ascochyta rabiei*) on Chickpeas; Crowns® Solution; Chemtur Canada Co./Cie; 5 pages; Jul. 14, 2010.
Stewart, Scott D. (editor); IPM Newsletter: Update for Field Crops and Their Pests; vol. 2; Agricultural Extension Service, The University of Tennessee, Jackson, TN; 4 pages; Apr. 25, 2003.
Seed Transfer System User's Manual: vol. 1—Publication Date: Apr. 15, 2008.†
Title: KSi AutoBatch V2: Controller and Database Option—Publication Date: Sep. 1, 2009.†
Title: LX2000 Seed Treater with PLC Controls: Operators Manual 2009 Model—Publication Date: 2009.†
Title: New Seed Wheel Adds Precision to USC LLC Seed Treaters—Publication Date: Jul. 17, 2006.†
Title: GLCPS Gustafson Logic Controlled Proportioning System: Installation and Operation Manual—Publication Date: Feb. 27, 2004.†
Title: HC 2000 & 3000 ACCU-COAT®: High Capacity Seed Treater—Publication Date: Jun. 8, 2009.†

\* cited by examiner
† cited by third party

SEED TREATMENT FACILITIES, METHODS AND APPARATUS

RELATED APPLICATIONS

The present application claims priority to U.S. Provisional Patent Application Nos. 61/421,030 filed Dec. 8, 2010, 61/469,432 filed Mar. 30, 2011, 61/469,370 filed Mar. 30, 2011, 61/553,711 filed Oct. 31, 2011, and 61/553,692 filed Oct. 31, 2011, each of which is incorporated by reference herein in its entirety.

FIELD OF THE INVENTION

The inventions herein relate to environmental stewardship and personnel protection in the seed treatment industry. More particularly the present inventions generally relates to a seed treatment center, methods, and apparatus suitable for retail sales of customized treated seeds.

The present invention also generally relates to systems and methods for the determination of a charge for goods and services related to the treatment and sale of agricultural seed products, more specifically, the precise application of one or more component formulations in a treatment recipe to a batch of seed and charging for the actual amount of each component formulation in the recipe that is applied to the batch of seed.

BACKGROUND OF THE INVENTION

Seeds that are planted for agricultural and other purposes are often treated prior to planting. The treatments may accomplish various purposes including attacking target bacteria, molds and fungus that can contaminate seeds or that may be present in the soil. Also seed treatment can include insecticides, pesticides and provide deterrence or prevention of insect and other animal pests that would target seeds. Treatments can also provide fertilizer. Direct application of seed treatment allows for a reduction in the amount of treatment composition that would be required by application to soil after planting for many of the beneficial effects. Post-planting application may not penetrate the soil to a level or location where it would be effective, is weather dependent, and may not be as economical as direct seed application. Seed distribution is presently accomplished by delivering seeds to farmers that have been treated with a variety of chemical fertilizers, pesticides, or herbicides, in a central production facility.

The treatment of seeds before planting however involves the application of chemicals and other agents that are expensive and may even be toxic to the environment or workers. Various devices for treatment of seeds in batch or continuous flow treatment mode are known. U.S. Pat. No. 5,891,246 to Lund, the disclosure of which is hereby incorporated by reference, describes a seed coating apparatus for applying a coating fluid whereby seeds are dispersed with a seed dispersing member. U.S. Pat. No. 4,657,773 to Mueller, the disclosure of which is hereby incorporated by reference, describes a process and apparatus for dressing seed in which seed is guided over a dispensing cone through a jet of dressing and onto a rotary table. German patent No. DE 4411058 to Niklas, the disclosure of which is hereby incorporated by reference, describes a device with a mixing bowl connected to a high speed, multi-turn actuator and a mechanism to feed seed into the mixing bowl. U.S. Patent Publication Nos. 2011/0027479 and 2006/0236925, the disclosure of which is hereby incorporated by reference, discloses various seed treatment apparatus that can be utilized to apply a treatment product or composition to a volume of seeds.

Undesirable chemical waste can be generated by applying excess treatment products to batches of seeds without precise controls. It is also possible that human handling, e.g. pouring various chemicals or formulations into a slurry or mix tank, can result in spillage or unused chemical waste due to inaccurate measuring that may cause environmental contamination. Because treatment products can be very expensive, e.g., hundreds of dollars per gallon, this can result in a large economic loss in addition to any risk of undesirable human exposure. Such chemical waste can also result in an environmental hazard. Accordingly, there is a need for an improved way to contain, control and automate the amount of treatment products applied to the seeds to minimize waste, ensure treatment uniformity, minimize cost and prevent spillage, particularly at the retail level where seed is treated and sold to individual farmer customers.

Certain computerized large-scale seed treaters can treat large batches of seeds in centralized distribution centers. However such equipment is expensive and not generally suitable for use at the retail level. Moreover, the delay caused by shipping treated seed between a central facility and the ultimate planting of that seed can reduce the optimal effects of a treatment applied to the seed. For certain treatments, including formulations having several treatments applied simultaneously to the seeds, the seeds need to be planted very soon, within hours after application, for optimal effectiveness. This is problematic with existing seed treaters and treating controls as such are expensive and typically are not easily used for repeated and rapid processing seed batches for multiple individual users at retail locations.

At such retail locations, if they do have seed treating capabilities, the chemical slurries to coat the seeds are mixed in open mixing bowls or vats, often having personnel actually measure particular liquid ingredients to be added to an open mixing bowl. Such liquid chemicals/formulations may be manually handled and manually poured into the vats. Then the liquid in the vat is ideally agitated and then pumped into seed treatment equipment. Such personnel are not necessarily well trained and the risk of personnel exposure to the chemicals as well as the risk spillages and improper disposal of the treatment chemicals is high. Precisely controlling quantities and application levels and even applying correct formulations is problematic. Moreover, there is simply no means for recording and verifying precisely what and how much has been applied to the seed. There is generally no automatic inventory and ordering systems resulting in possible shortages of certain chemicals and then use of less than ideal replacements. There is generally no automatic moisture control and dynamic rate application system available to seed treaters, resulting in possible inconsistent treatment of certain chemicals and less than ideal moisture content of treated seeds.

A need exists to provide application controls, personnel protection, and environmental protections, and inventory systems that are particularly suitable for the retail seed locations.

SUMMARY OF THE INVENTION

The present invention is directed to an on-demand seed treatment systems and methods of that provide personnel and environmental safeguards as well as use and inventory monitoring and controls, efficiently providing safety and operational advantages to all parties involved. The systems can be used for any size application, but is particularly useful for small to medium level treatment entities such as retailers that sell and distribute seeds locally to farmers. Embodiments of the invention can also locally and remotely provide control of and monitoring of the treatment of seeds, including proper equipment functioning, inventory use, as well as providing detailed data collection, reporting and accounting as desired, such as invoicing and reporting of particular chemical formulation for individual batches of seeds.

In an embodiment of the present invention, application of one or more seed treatment formulations, either alone or in a mixture with each other, as defined by a treatment recipe, are metered by pumps that are controlled electronically via a programmable electronic control panel. The electronic control panel can include a unique and custom-programmed controller or computer that "drives" or operates a treatment system based on one of a variety of entered chemical treatment recipes. The controller is configured with software to also oversee or monitor all processes during treatment, including the rate and quantity of each chemical treatment formulation that is applied to the seed as well as the rate the seed flows through the treatment apparatus. During the seed treatment process the controller software can be configured to send or receive data from a control center or remote server. The data can include, for example, equipment status, reports on each batch of treated seed, the amount of chemical treatment formulation utilized by the treatment process, requests for additional chemical deliveries, or new or updated treatment recipes or chemical formulation data.

In an embodiment of the present invention, the control panel of the treatment apparatus can be linked over a computer network, such as, for example, the Internet or a cellular telephone network, to allow different parties to receive data from, or provide updates to, the system. In this manner, for example, a seed company that desires to have a custom seed-treater treat their seeds can have a plurality of different recipes that it can have placed on different seed lots or batches. The seed company can send its recipes via the Internet, or other network connection, to the seed treatment company such that the recipes are electronically loaded into an embodiment of the disclosed seed treatment system at a desired retail or distribution location. Additionally, a chemical production or supply company can communicate with an embodiment of the present invention to update, recall, or change any one of the plurality of different recipes in the system that utilized component formulations supplied by the chemical company.

The operator of an embodiment of a seed treatment device of the present invention can select a recipe, and instruct a system controller to in turn operate one or more pumps, attached to various drums or kegs containing components of the recipe, to deliver the component(s) from the keg to a manifold system or other apparatus that applies the components to a batch of seed. In this manner, the various components of the recipe are transferred from the kegs to the application area of the seed treatment device and are applied in the proper amounts to coat a quantity of seed in the seed treatment device. The need to pre-mix or hand-mix various recipe components and chemical formulations can be reduced or entirely eliminated. This elimination of the need to pre-mix chemical formulations can also eliminate a need for an intermediate mixing or slurry tank and any associated pumps, hoses, or other plumbing that may require additional maintenance or cleaning between seed treatment batches.

In an embodiment of the present invention, the system can maximize the utilization of purchased treatment components by withdrawing substantially all of the component from each keg, thereby minimizing the amount of unutilized contents in the keg. For example, as the contents of a keg are depleted, or nearly depleted, sensors associated with the kegs can provide a signal through an interface to the system controller that can then issue an alert the custom seed-treater's operator indicating an instruction to prepare to replace the keg in a timely fashion. The sensors can monitor each unique keg to continuously calculate the amount of chemical composition remaining in each keg as its contents are applied during the treatment process based on the changing weight of the keg as provided to the system by the scale or load cell positioned under each keg at each keg station. When the weight of the keg stops changing during the application of the chemical treatment component the system can determine that the keg is effectively empty and that further pumping action could introduce air into the treatment lines. This allows the system to withdraw the entire treatment component in the keg that can be physically extracted with the dispensing hardware, while still preventing the system from under treating a batch of seed due to an empty keg. When the system has determined that no more fluid can be withdrawn from the keg the system can pause the treatment process until the keg is replaced, or begin withdrawing, or increase the pumping rate, of the same treatment component fluid from a different keg station that is equipped with an equivalent treatment component.

In an embodiment of the invention a retail seed treatment facility including a seed store for selling seed primarily to local or regional growers and farmers, has a storage area, an operations area, and a customer access area. The storage area for storing inventory of seed treatment chemicals, primarily a stock of seed treatment formulations in kegs, and may include bulk seed storage bins. In the operations area, the facility includes a bank of dispense stations, comprised of primarily keg stations and mixing station, a seed treater, all of which are connected to a programmable process controller. Typically a building will contain the storage area for the kegs and the operations area. The facility may include seed/grain conveyance equipment such as standard conveyors for providing the bulk seed to the seed treater and also for conveying output of the seed treater to a retail customer loading or pick-up area. The facility may include weather sensors, such as temperature, humidity, barometric pressure that may be connected to the programmable process controller.

The seed company can have real time access to view the application process or be granted permissions to modify, replace, or update the recipe over the Internet or other system of connected computers. In a similar manner the custom seed treater is also in a position to control the device locally. Also, if desirable, the company that manufactures the seed treatment chemicals (i.e., the chemical company) can be included in a list of entities that can access the system over the Internet or other network to enable, for example, the chemical company to schedule the production of chemical inventory or to monitor quality or quantity of materials that are being applied to seed batches. This monitoring can provide the chemical company with information to ensure the recipe is being properly applied and to manage inventory levels as the chemicals are applied.

In an embodiment of the present invention, the system can provide inventory management control for the seed company, the seed composition producing company (e.g. the chemical company producing the seed treatment composition), the local custom seed-treater, or any combination thereof. For example, as the contents of a keg are depleted, or nearly depleted, sensors associated with the kegs can provide a signal through an interface to the system controller that can then issue an alert the custom seed-treater's operator indicating an instruction to replace the keg in a timely fashion. The sensors can be unique to each keg, or the system can continuously calculate the amount of chemical composition in each keg as its contents are applied during the treatment process based on the changing weight of the keg as provided to the system by the scale or load cell positioned under each keg at each keg station.

The system can also transmit an alert to the custom seed-treater's ordering department to order more material as needed, which in turn can alert the chemical company to schedule more production of the needed seed treatment component or chemical formulation. The seed company can also be alerted if there will be delays/shortages of materials, so it too can make inventory decisions. For example, a seed company can shift the seed treatment recipe to another similar recipe that may not call for a formulation or component that is in short supply.

An embodiment of the present invention includes a method of preparing in-depth detailed reports on all processes from customer input, applied chemical formulations, seed varieties, seed quantity, treated batches, inventory level control of products, selected recipes, the location of individual kegs, and automatic replenishment of consumable components from appropriate distribution centers. The data sharing capability of an embodiment of the invention provides for communication between individual on-demand seed-treater systems, the producer of the seed treatment material (e.g. the chemical producing company), the seed supply companies desiring to have the seeds so treated, the retail seed treater/distributor, and farmers who are the ultimate consumers of the treated seeds.

One advantage includes software controllers also can provide automated adjustment, self-diagnosis and calibration configuration of the system by the controller, such as a programmable logic controller, that can assure an accurate chemical application to a batch of seed dynamically in response to changes in the system. The system can adjust the pump speed at each individual keg station to ensure that the treatment rate of an individual treatment component is at the level required by the treatment formulation recipe. This can be accomplished by continuously or periodically monitoring the change in weight of each treatment component container (keg) during the application process to ensure that an actual application of the treatment component is taking place. In response to changes in the actually application rate, as measured by the change in weight of a keg, possibly due to partially clogged filters or hoses, the system can increase the pump speed to accommodate for these conditions, and similarly decrease the pump rate if a filter is replaced or an obstruction in a hose is removed.

An embodiment of the present invention utilizes bar codes or RFID tags to uniquely identify each individual keg, drum, or other chemical container. The identification information encoded on each keg by a bar code label or RFID tag can include information such as the manufacturer of the contents of the keg, the batch or lot number associated with the contents of the keg, the size or capacity of the keg, the actual amount of chemical product contained within the keg as provided by the manufacturer or chemical supply company, a check digit to authenticate or error check the identifying data, a unique keg serial number, or other useful identifying information.

An embodiment of the present invention includes modular keg stations that connect individual kegs of chemical formulations to a seed treatment apparatus. A plurality of keg stations are coupled to a manifold that can combine the formulations from a plurality of kegs into a mixture as directed by a recipe that is programmed into a system controller. The resulting fluid mixture can be further mixed by directing the fluid through an oscillatory baffled reactor or other fluid mixing apparatus prior to application of the chemical to the seeds by the seed treatment apparatus.

An embodiment of the present invention includes a Graphical User Interface (GUI) that can provide real-time seed treatment reporting, inventory status and information, keg status reporting and alert notifications, along with an interface to configure recipes and batches for seed treatment. The GUI provides a local operator with the capability to configure the system for operation and to monitor the chemical treatment process. The GUI can also provide an interface to initiate or review updates to recipes that are downloaded from a remote location via the system's network connection. The GUI can also provide an interface to enter or configure a customized recipe at the local installation of the system.

One advantage of the present invention includes reducing the delay between seed treatment and planting. Such seed treatment needs to be done at a local level, closer to the farmer, by the seed retailer. Because embodiments of the system can efficiently and economically treat the seed at the retail level, while still being environmentally secure by handling the desired chemical formulations in a closed system, the time between treatment and planting associated with seed distribution and shipping can be greatly reduced.

One advantage of the present invention includes the elimination of the need to mix seed treatment products into a slurry, or pre-mix. Instead the treatment can be applied "neat" or without pre-mixing directly to the seed. The application mixture can include several products that are metered electronically and controlled by a programmable control panel. The use of secure drums or kegs that can only be accessed or "tapped" with an appropriate connecter can prevent tampering with the contents of the kegs and provide an additional factor contributing to the integrity and quality of the chemical formulation contained in a keg. Additionally, the application of secure kegs can allow for the reclamation of any residual contents of a nearly depleted keg upon the keg's return to a recycling or reclamation facility.

One advantage of the present invention includes the enforcement by the programmed control software that directs the mixing and proportion of all entered chemical recipes. The system also monitors and oversees all processes during treatment and can simultaneously send and receive data from a control center or server that can be located remotely from the seed treatment apparatus.

One advantage includes the elimination of hand mixing of chemical jugs into slurry tanks where chemicals are pre-mixed and run the risk of "falling" out of suspension if not used in adequate time. This system also greatly improves and enforces human and environmental safety by reducing the potential for chemical spillage or contamination.

One advantage includes software controllers also can provide crisis management via wireless or wired Internet or similar networks to assist in detecting any undesirable chemical formulations, recipes, application and/or seed issues. A self-diagnosis and calibration configuration of the controller, such as a programmable logic controller, can assure an accurate chemical application to seed and provide assistance to diagnose errors or equipment malfunction.

In one embodiment a multiple formulation liquid seed treatment drum rack system for placement in proximity to seed treatment equipment. The system offers modularity, redundancies, and accessibility providing for environmental and personnel safeguards. The drum rack system comprises a series of individual rack unit and in embodiments, the individual rack units having several keg receiving units and a mixing unit. Each having a base with a drum seating surface and a scale portion such that a keg placed on the drum seating surface is weighed by the scale portion. In embodiments the base has a rectangular footprint with four sides, a front side, two lateral sides, and a back side. Each rack unit has dedicated components comprising a pump and a pump controller, an air removal device, and a mixer with a mixing motor, plumbing, wiring for power and control. A mounting framework extending upwardly at the back side of the base supports and provides connections for the dedicated components.

A feature and advantage of embodiments are that the dedicated components, the plumbing, the wiring, and the connections are readily accessible for each rack unit from the front side of each rack unit.

A feature and advantage of embodiments is that the base is at a low height, in other words, the distance between the ground and the top of the scale is minimized in order to reduce the distance that a full keg must be lifted to place the keg on the scale.

A feature and advantage of embodiments is that the rack unit can be adjusted to accommodate drums or kegs of various heights.

A feature and advantage of embodiments of the invention is that the an equipment mounting framework extends upwardly at the back side such that the supporting framework for the frame work is not positioned at the front side of the rack.

One embodiment of the present invention includes modular keg stations that include a scale or load-cell, a pump, a stirrer apparatus, air removal assembly, a keg coupler, and associated piping or tubing to connect individual kegs of chemical formulations to a seed treatment apparatus. The replaceable component architecture of the keg satiations can reduce the number of serviceable and replacement parts that must be maintained or held in an inventory of spare parts. In one embodiment a plurality of keg stations are in fluid communication with a manifold that can combine the formulations from a plurality of kegs into a predetermined mixture as directed by a recipe that is programmed into a system controller. The resulting fluid mixture can be further mixed by directing the fluid through an oscillatory baffled reactor or other fluid mixing apparatus. In one embodiment the air removal assembly includes a valve configured to return any fluid, which may escape with air or bubbles are removed from a formulation supply line, to the keg where the formulation was originally withdrawn.

One advantage of embodiments of the present invention includes the elimination of the need to mix seed treatment products into a slurry, or pre-mix. Instead the treatment can be applied "neat" or without pre-mixing directly to the seed. The application mixture can include several products that are metered electronically and controlled by a programmable control panel. The use of secure drums or kegs that can only be accessed or "tapped" with an appropriate connecter can prevent tampering with the contents of the kegs and provide an additional factor contributing to the integrity and quality of the chemical formulation contained in a keg. Additionally, the application of secure kegs can allow for the reclamation of any residual contents of a nearly depleted keg upon the keg's return to a recycling or reclamation facility.

BRIEF DESCRIPTION OF THE DRAWINGS

The embodiments of the present invention may be more completely understood in consideration of the following detailed description of various embodiments of the invention in connection with the accompanying drawings, in which:

FIG. 1b depicts a portion of the keg stations of FIG. 1a.

Figures 10A, 10B:
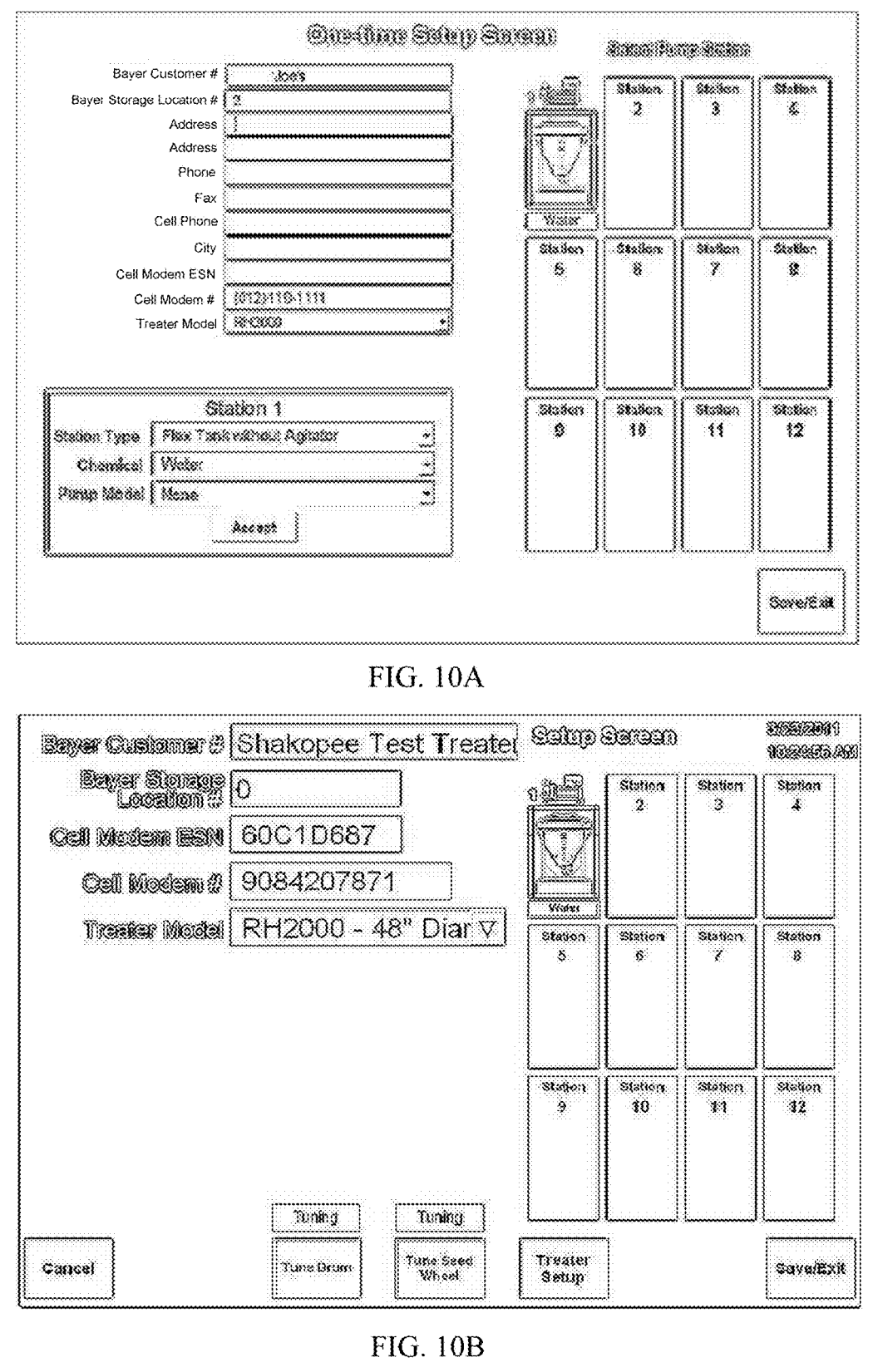

FIG. 10a-10d depict an exemplary seed treatment system setup screens.

Figures 12A, 12B:
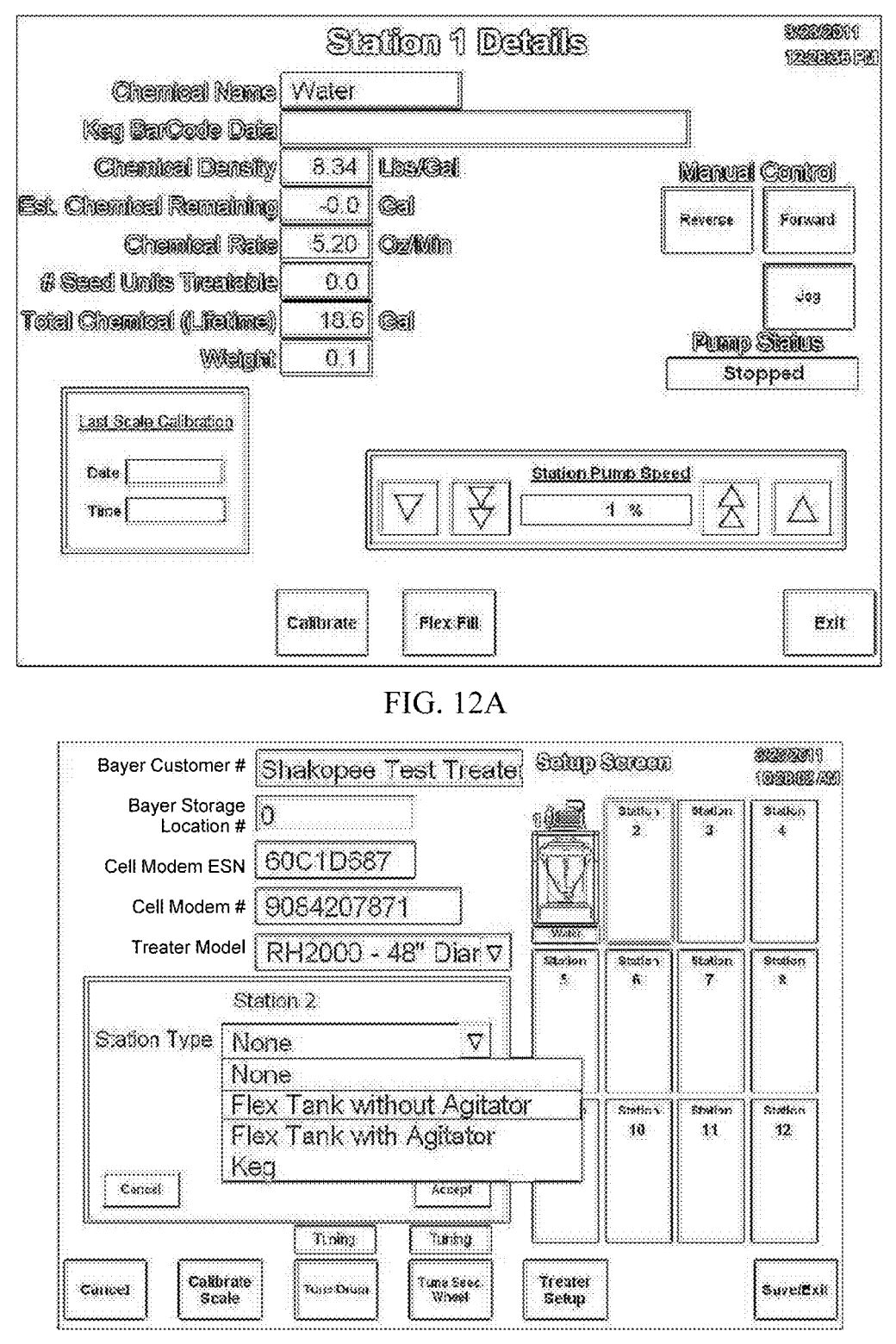
Figures 12C, 12D:
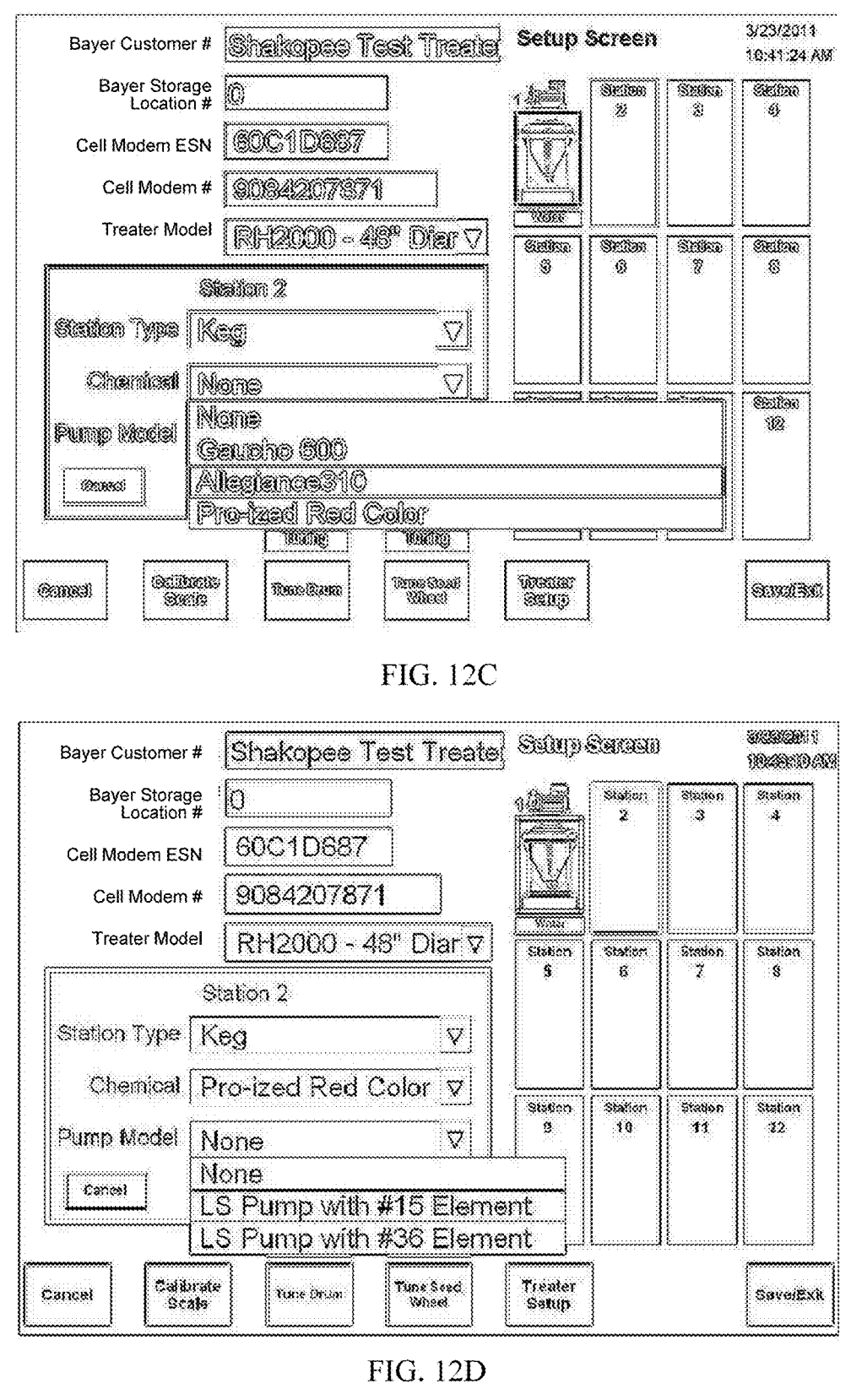

FIG. 12a-12g depict exemplary seed treatment system pump station detail screens.

FIG. 13a-13c depict exemplary scale calibration screens.

Figures 14A, 14B:
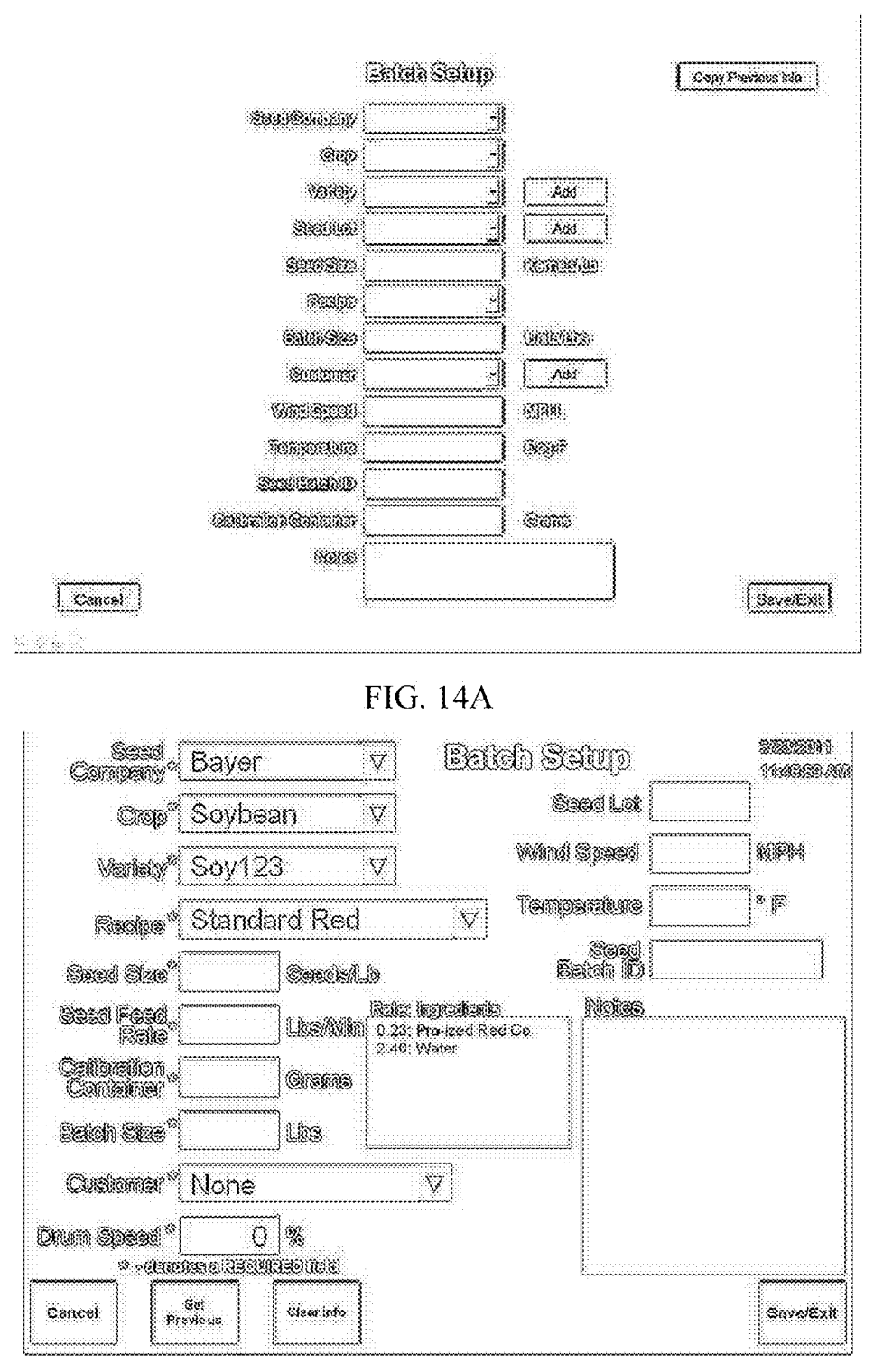
Figures 14C, 14D:
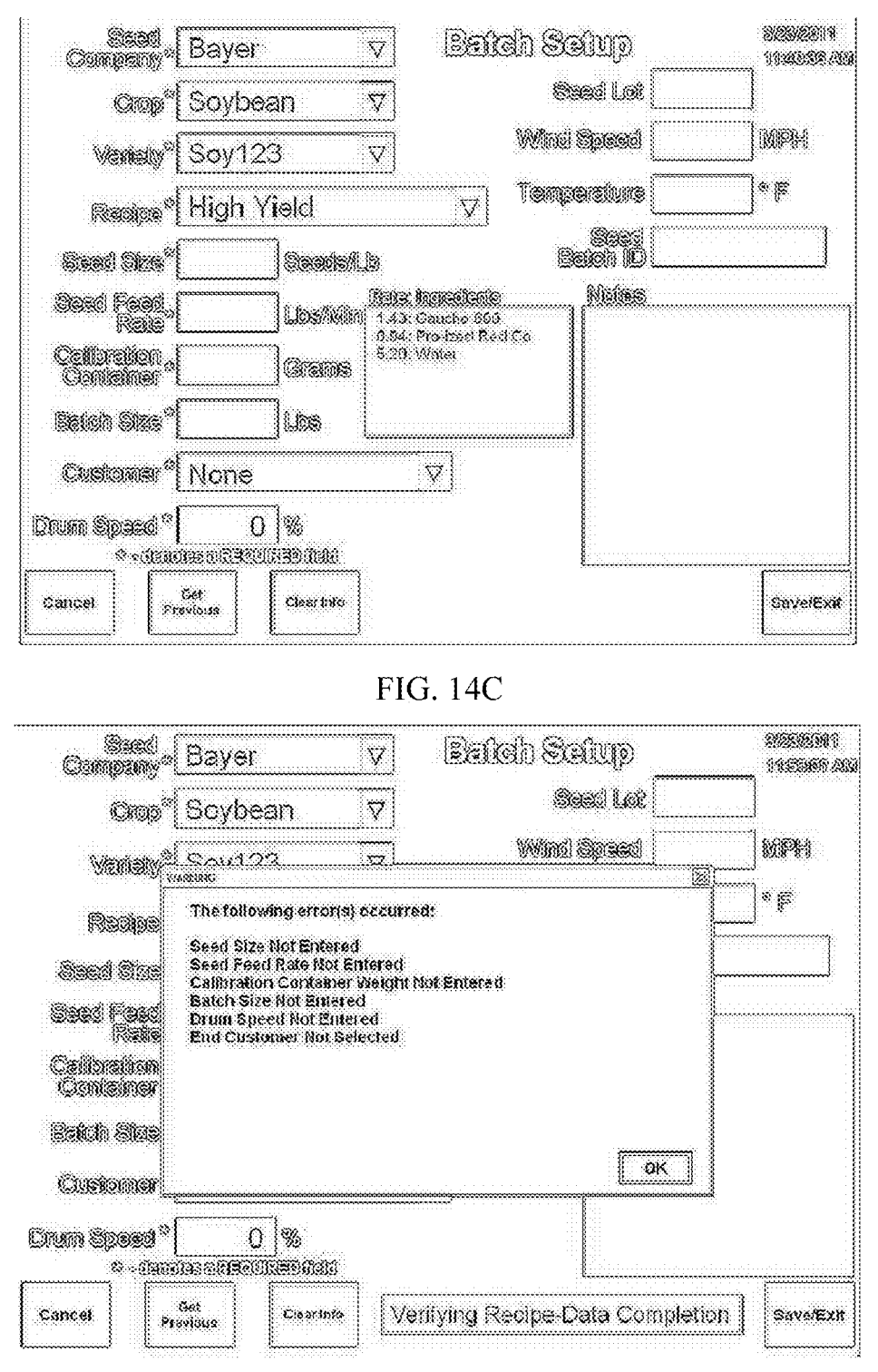
Figures 14E, 14F:
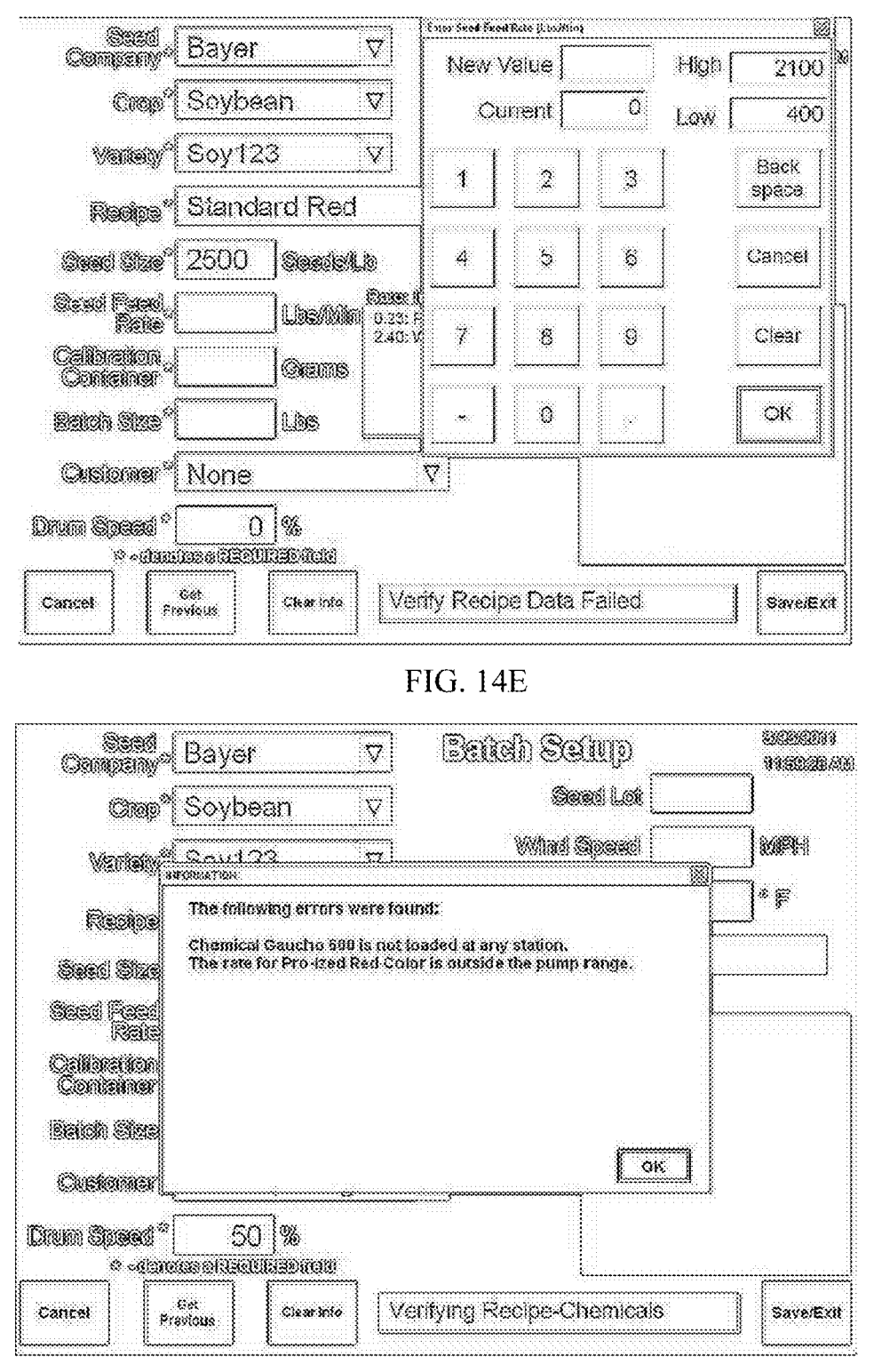

FIG. 14a-14f depict exemplary seed treatment system batch treatment setup screens.

Figure 1A:
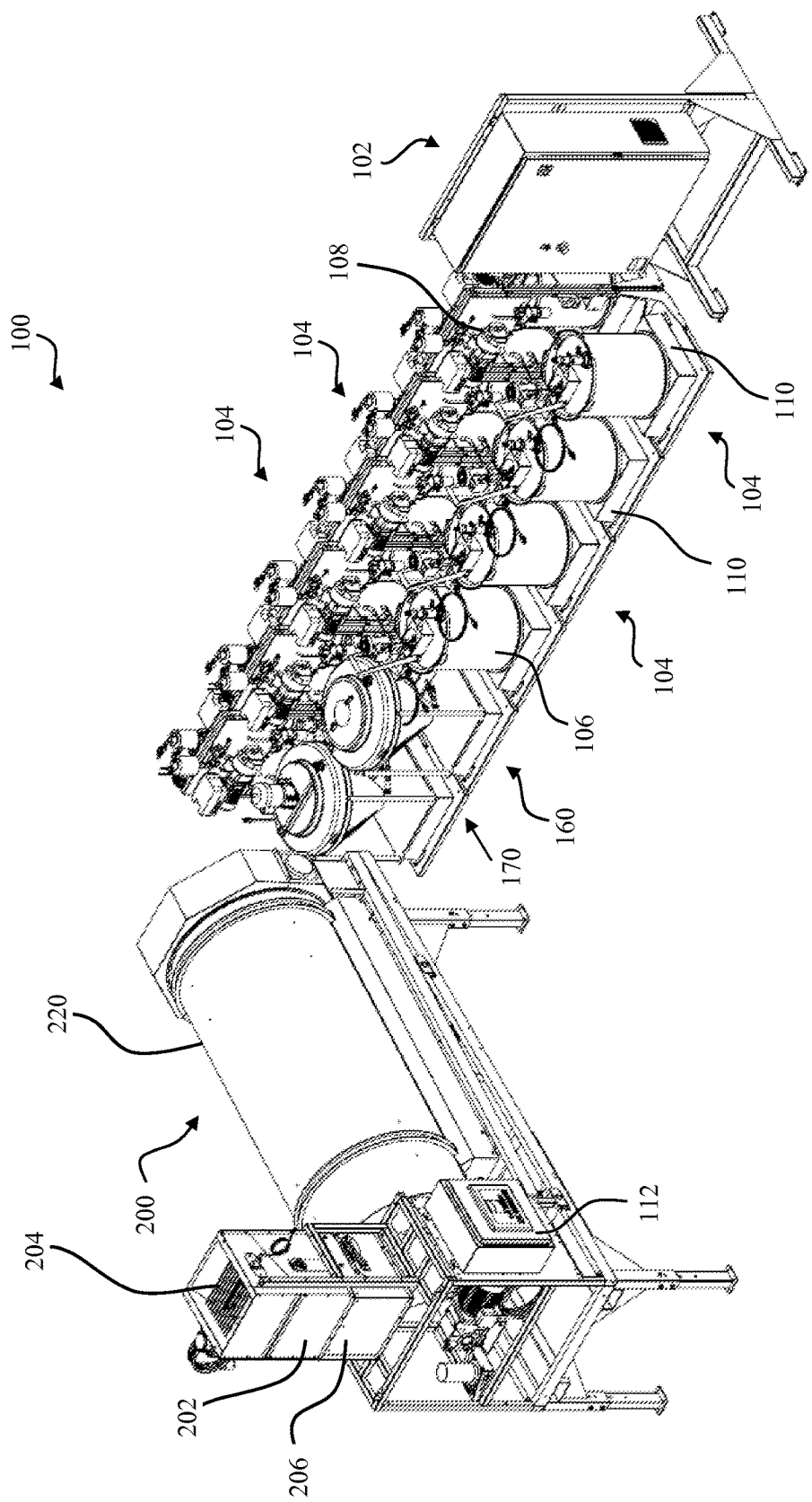
FIG. 1a depicts an exemplary embodiment of a seed treatment system with ten keg stations, a flex-tank station, and an agitator station.

While the present invention is amendable to various modifications and related forms, specifics thereof have been shown by way of example in the drawings and will be described in detail. It should be understood, however, that the intention is not to limit the present invention to the particular embodiments described. On the contrary, the intention is to cover all modifications, equivalents, and related embodiments falling within the spirit and scope of the present invention.

DETAILED DESCRIPTION

Crop seeds can be treated with a variety of components or formulations such as fertilizer, herbicide, fungicide, insecticide, or any of a variety of combinations of these chemicals, typically along with a colored dye or other indicator that the seed is treated. A seed treatment recipe or combination of formulations can vary due to the needs of a farmer who will plant the seed, the type of seed, and the seed-growing environment. Environmental factors can include, the geographic planting region, soil types, the potential presence of specific plant diseases or pests, climate, growing season, etc. A farmer may need to account for some or all of these variables when selecting seeds and requesting seed treatments prior to planting.

Due to the variety of seed types and chemical treatment formulations that are available it is not efficient or necessarily practical to produce or maintain an inventory of treated seeds with all possible combinations of seed and seed-treatments that are be desired to accommodate the widest possible variety of seed-treatment requests. Due to the potentially hazardous nature of some chemicals it is important that only an appropriate amount of chemical treatment be applied to a batch of seeds, that all appropriate regulations be followed in the handling and application of chemical formulations, and that exposure of the chemicals to humans or the external environment be limited to the extent feasible. Therefore, it would be advantageous to a seed retailer to be able to treat a wide variety of seeds with any of a number of chemical treatment formulations at the retailer's point of sale in an on-demand fashion with a safe and contained treatment system.

Figure 1B:
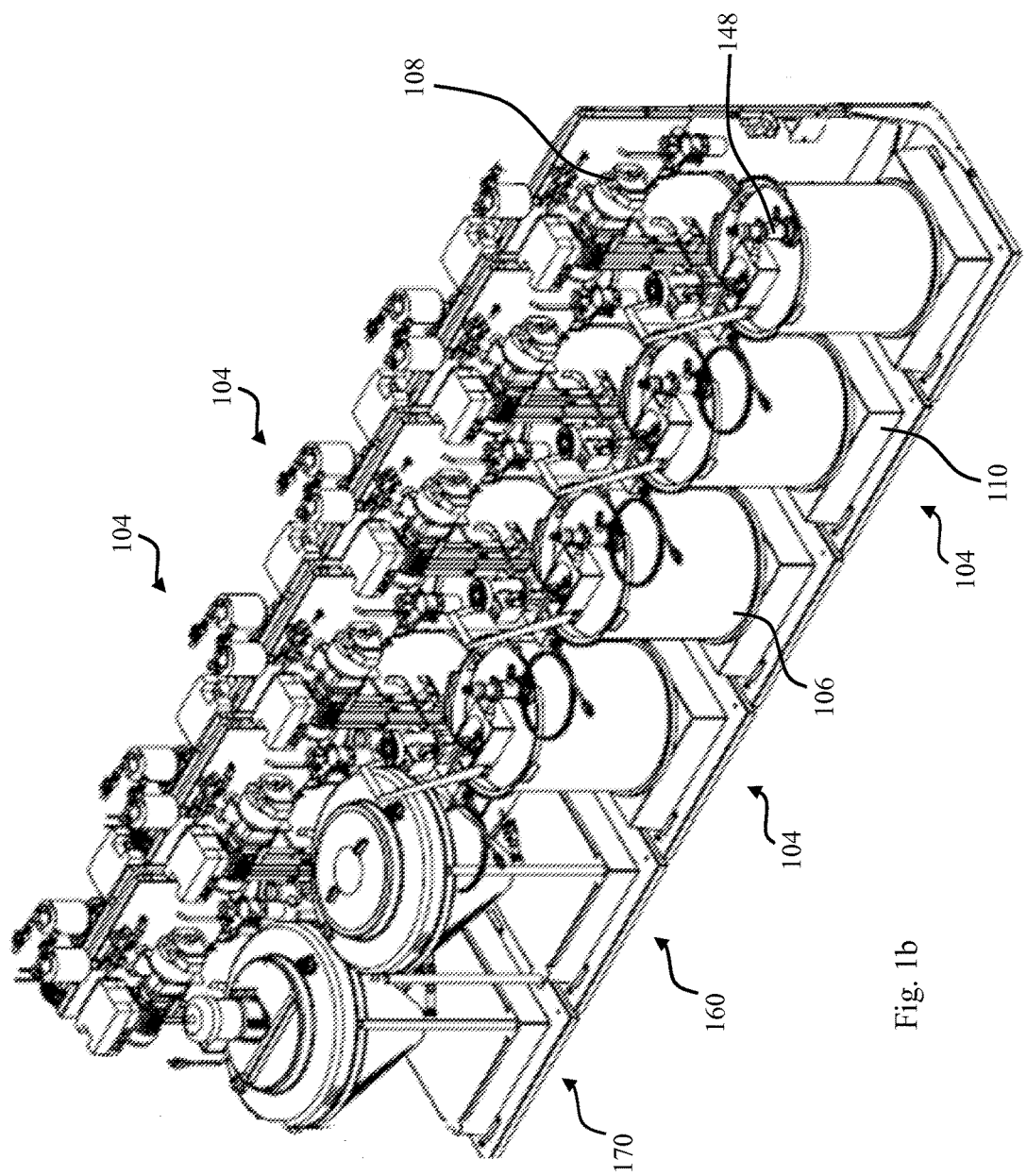
Figure 5:
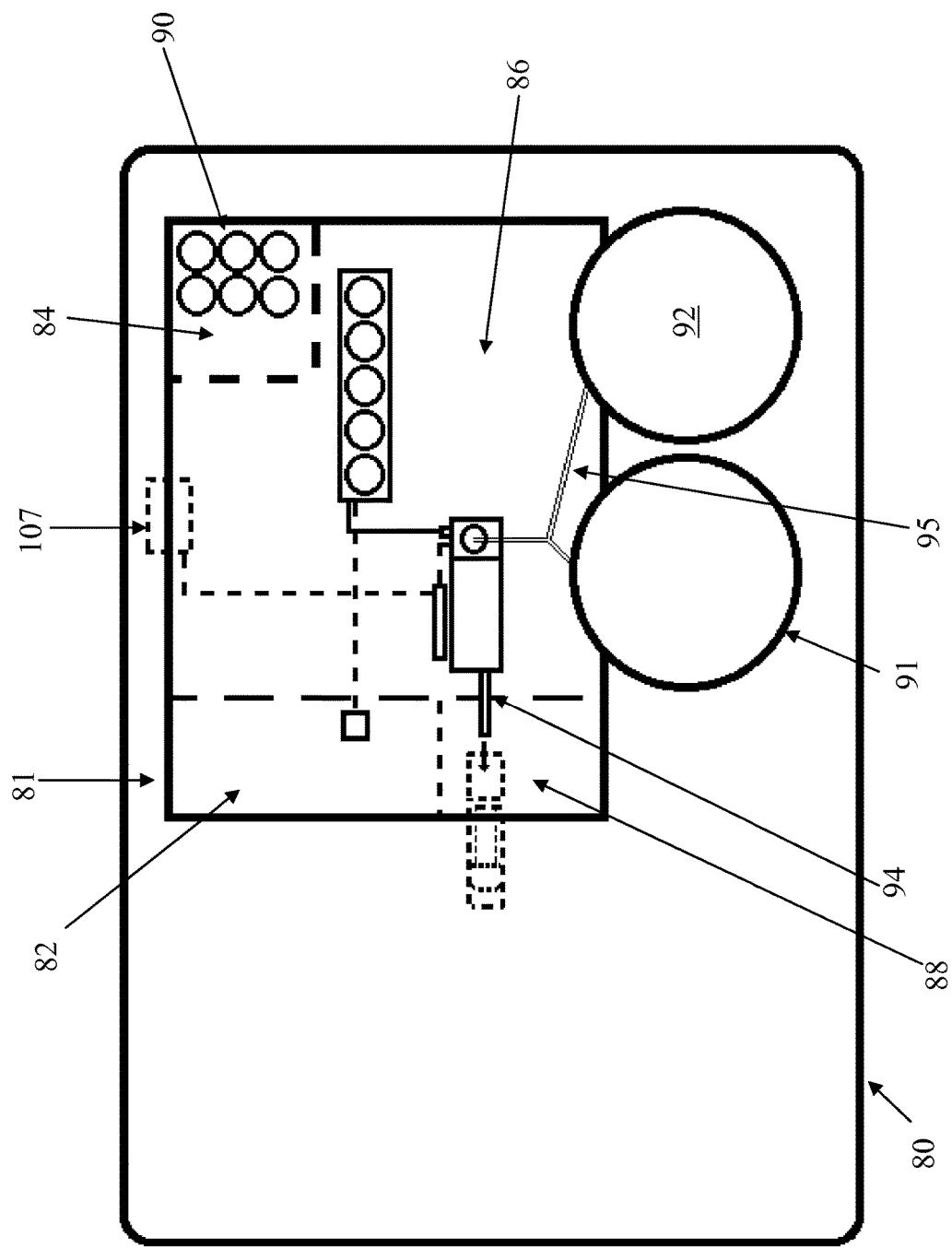
FIG. 5 depicts a plan view layout of an exemplary embodiment of a retail seed treatment facility.

Referring to FIGS. 5a, 1a, and 1b, in an embodiment of the invention, a retail seed treatment facility 80 will typically having a building 81 including a seed store 82 for selling seed primarily to local planters, growers, farmers. The facility has a storage area 84, an operations area 86, and a retail customer access area 88 for the planters, farmers, growers. The storage area primarily for storing inventory of seed treatment chemicals, that is, a stock 90 of seed treatment formulations received from a seed treatment formulation supplier. Said area provide storage for a multiplicity, defined herein as a dozen or more, kegs. Storage also includes bulk seed storage bins 91 for storage of bulk seed 92, especially prior to treatment. Typically the building will contain the storage area for the kegs and the operations area. The facility may include seed/grain conveyance equipment 94 such as standard conveyors 95 for providing the bulk seed to the seed treater and also for conveying output of the seed treater to a retail customer loading or pick-up area. In the operations area 86, the facility includes a seed treater 100, a system controller 102, bank 103 of dispense stations 105, comprised of primarily keg stations and mixing station, The facility may include a weather station 107 including sensors, such as temperature, humidity, barometric pressure that may be connected to the programmable process controller. An exemplary on-demand seed treatment system is depicted in FIG. 1a. The seed treatment system 100 can include a system controller 102, a plurality of keg stations 104 each including a keg 106 containing a chemical treatment, a pump 108 and scale 110. A keg 106 (also referred to as a drum) can be in a range of sizes, for example in an embodiment the keg 106 can have a capacity of approximately fifteen gallons. Alternative kegs can range in size from five to twenty-five gallons. In yet another related embodiment, kegs can range in size from seven to fifty-five gallons. In an embodiment the keg 106 can have a capacity of approximately thirty gallons.

Figure 3A:
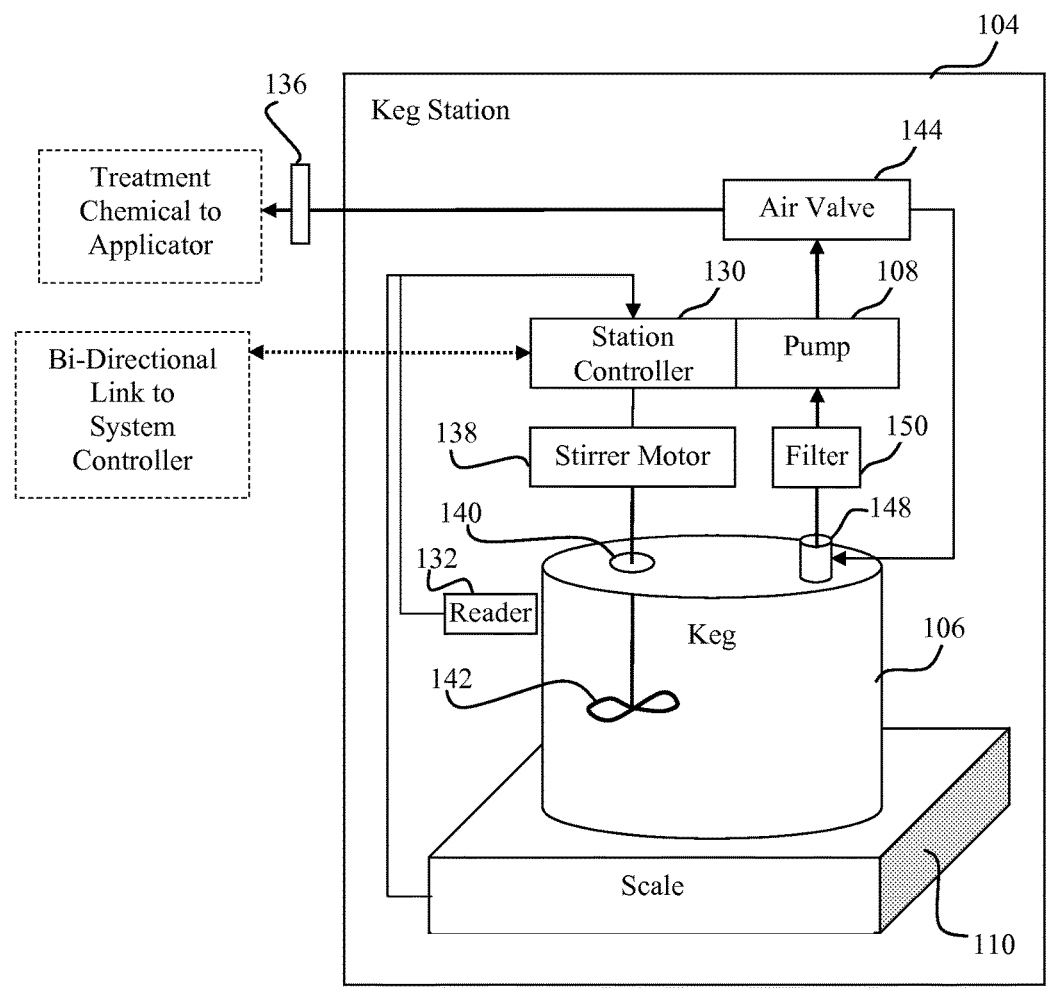
FIG. 3a is a block diagram of an exemplary embodiment of a keg station.
Figure 4A:
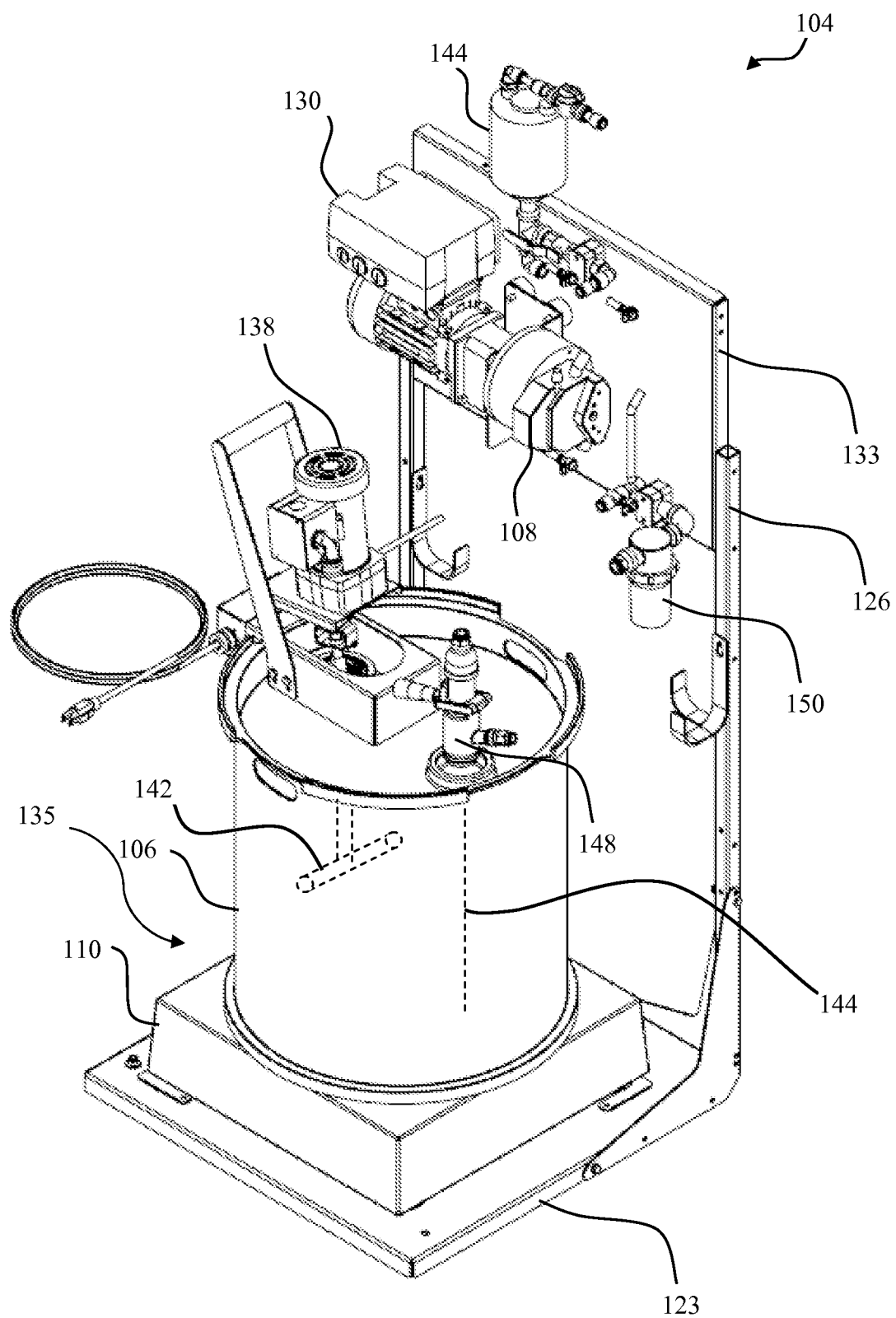
FIG. 4a depicts a perspective view of an exemplary embodiment of a keg station with a keg disposed on a scale.

FIG. 1a depicts an exemplary embodiment of a seed treatment system with ten keg stations 104, a flex-tank or mixing station 160, and an agitator station 170. As shown in FIGS. 3a and 4a, the agitator station 170 can include a stirrer mechanism 142 actuated by a stirrer-motor 138. FIG. 1b is another depiction of the keg stations 104 and flex-tank station 160 of FIG. 1a in an 11-station configuration.

The pump 108 for each of the plurality of keg stations 104 can provide chemical treatment from each keg 106 to a seed treatment application apparatus 200. In an embodiment pump 108 can be a peristaltic pump, or roller pump, or another appropriate type of positive displacement pump. The system controller 102 can be coupled to a user-interface 112 such as a graphical touch-screen that can provided a user or operator of the seed treatment system 100 with a variety of menus, alerts, alarms, data-entry fields, and other options to configure or operate the system 100. The system controller can also be coupled to a local weather monitoring station 107 on site or off site that can provide the system with the ambient temperature, relative humidity, and atmospheric pressure. An emergency stop button or switch can be coupled to the system controller 102 to allow an operator to immediately halt the treatment process in case of an emergency or other system failure.

Figure 2A:
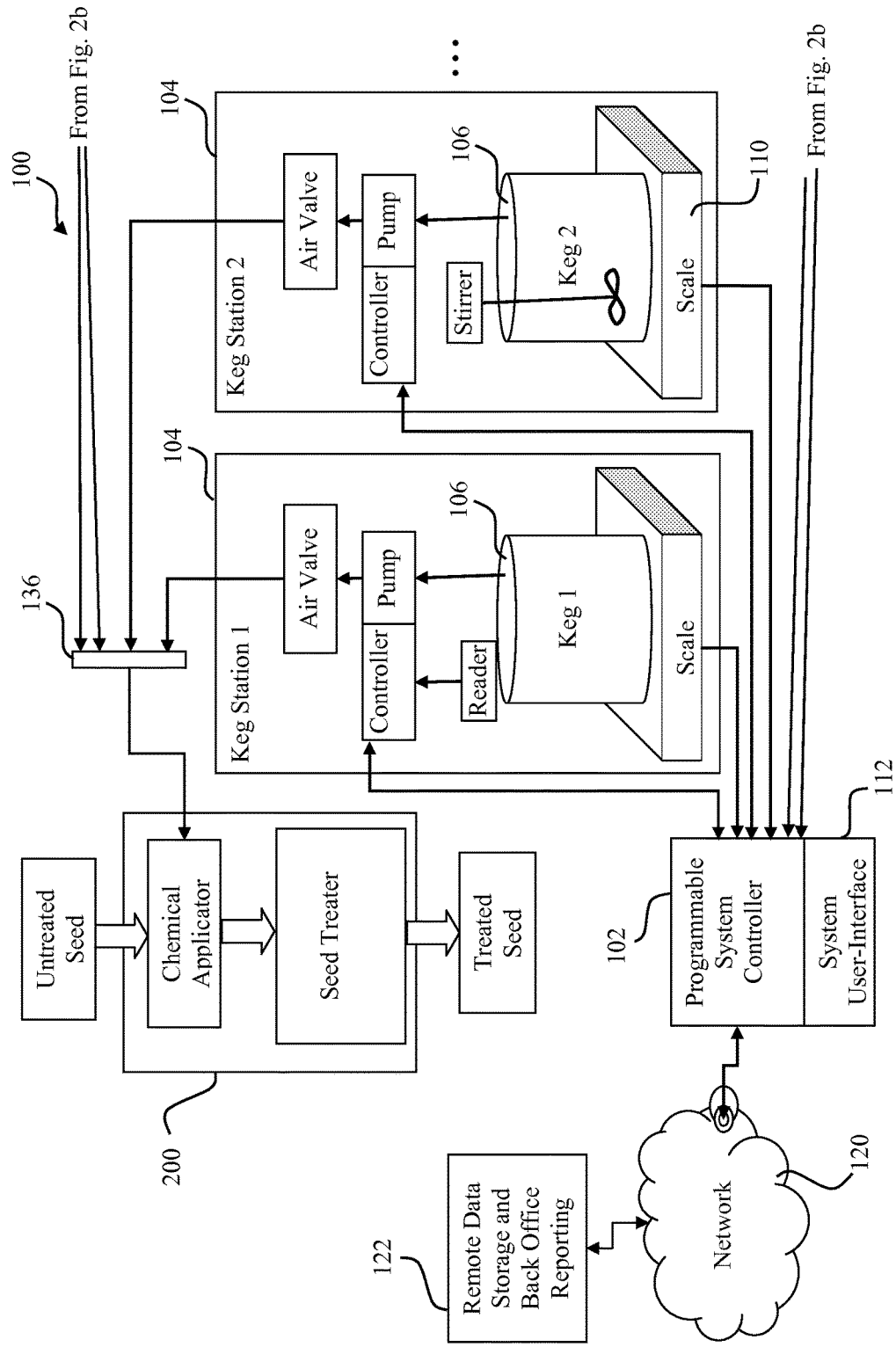
FIG. 2a-2b is a block diagram of an exemplary embodiment of a seed treatment system.
Figure 2B:
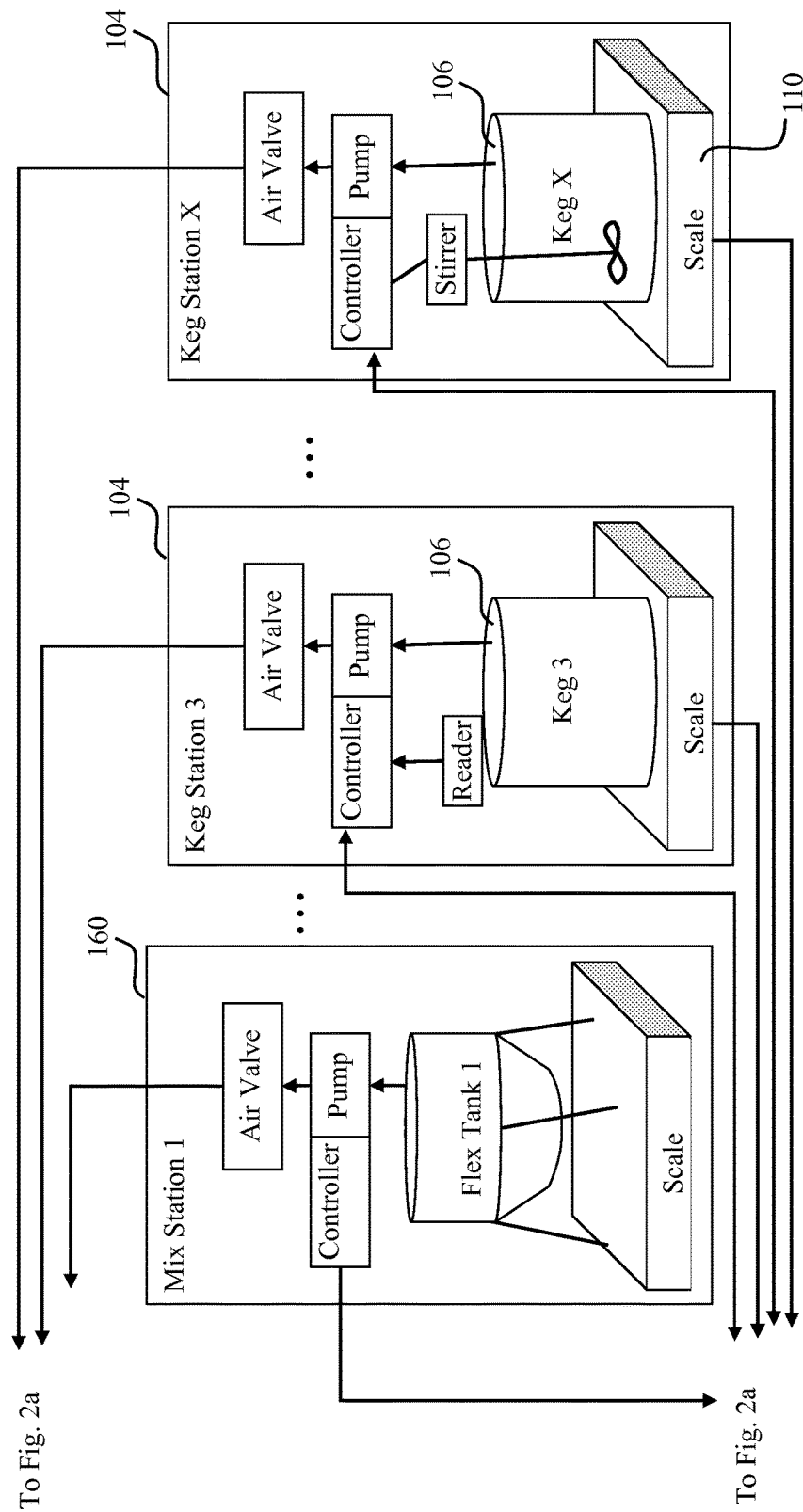

Referring to FIG. 2a, the system controller 104 can be connected to a network 120, such as the Internet, a private corporate intranet, a cloud-based computer network, a cellular telephone network, or any of a variety of other electronic or optical communication networks. Network connectivity to the system controller 104 can be bi-directional. The system 100 can be connected through network 120 to a remote data storage and reporting facility 122. The facility 122, or back office, can include one or more databases, or an inventory management system such as an enterprise resource planning (ERP) product available from SAP AG, and an electronic computer readable storage medium configured to gather, process, and store any data received from one or more individual treatment systems 100. The reporting facility 122 can also store and distribute through network 120 treatment recipes and formulation information for the various chemical treatment formulations. Formulation information can include label data, manufacturer information, formulation properties such as density or stirring requirements, and any other relevant data that may be useful for the application of the application of the chemical formulation to treat seeds.

In an embodiment the reporting facility 122 can manage and track the location, use, and contents of each individual keg 106 that has been registered with the facility 122. Each keg 106 includes a bar code or RFID tag to uniquely identify each individual keg, drum, or other chemical container. An RFID tag can be embedded in a barcode label affixed to each keg 106 to provide redundant or additional information. The identification information encoded on each keg 106 by a bar code label or RFID tag can include information such as the manufacturer of the contents of the keg, the batch or lot number associated with the contents of the keg, the size or capacity of the keg, the weight of the keg when empty, the weight of the keg when assembled with a pre-installed stirring apparatus, the actual amount of chemical product contained within the keg as provided by the manufacturer or chemical supply company, the density of the contents of the keg, a check digit to authenticate or error-check the identifying data, a unique keg serial number, or other useful identifying information or data.

A seed company can utilize real-time access to the seed treatment system 100 to modify, replace, or update seed treatment recipes or formulations. Treatment information for every batch of seeds can be transmitted from the treatment controller 102 to a data storage point at an individual seed company, into a cloud-based data store, or reporting facility 122, through a network 120.

In an embodiment system 100 can be configured to only produce batches of treated seed in accordance with pre-programmed recipes, or recipes that are purchased or downloaded from the remote data storage and reporting facility 122. In an alternate embodiment system 100 can be configured to allow customized or unique recipes to be programmed directly into the system 100 through the user-interface 112 or by coupling the system controller 102 to a personal computer, a tablet computer, a removable non-volatile media storage device or other computer readable medium. The capability of the system 100 to lock-out unauthorized recipes and otherwise control the administration of the system can be accomplished with a security log-in mechanism or other access control that can prevent unauthorized access or modification to the system 100 and its configuration while still providing access to individual users or operators that can initiate, monitor, and complete the batch treatment process. The system controller 102 can also be configured to record a user-id associated with an individual user that is operating the system 100 such that a database record for each batch of treated seed can include the user-id of the individual associated with that batch.

The tracking and management of each keg 106 can also provide for first-in first-out (FIFO) management of individual chemical formulations. For example, if a retail location receives separate deliveries of identical chemical formulations at different times the system 100 can require that the older chemical formulation to be placed on a keg station 104 before the newer, second to arrive, keg. In this manner the efficacy of the chemicals is managed and monitored. Alternatively, if an individual keg is stored in an inventory for a period of time longer than desired to ensure the efficacy of the chemical formulation, the system 100 can prevent the use of that keg if an operator attempts to use the chemical formulation after it has expired. In one embodiment the system 100 can instruct the operator to return the keg to an appropriate chemical recycler or the original chemical supplier. In one embodiment the system can notify the chemical supplier, through a network connection 120 to a central data store, of the location of each keg that contains an expired product.

FIGS. 1a, 1b, 2a, 2b, and 3a, 4a-4f, and 6 depict additional exemplary embodiments of keg stations 104 and components thereof. A keg station 104 can include, a base portion 123, an upright support structure 126, a back mount or rack 133, and a scale 110. The scale being sized to receive a single keg 106 at a keg receiving region 135. The scale 110 can provide continuous or periodic measurements of the weight of the keg 106, and any changes in the weight of the keg 106 that would indicate a change in the volume of chemical stored in the keg 106. The scale 130 of the keg station 104 can be electrically coupled to the system controller 102 and provide weight measurements to the system controller, as depicted in FIG. 2a. Alternatively, as shown in FIG. 3, the scale 110 can be electrically coupled to a station controller 130. When the density of a chemical formulation is known, or provided to the system controller 102, an accurate measurement of the weight of a keg 106 and the change in weight of the keg over time can be used to calculate the volume and rate of chemical being delivered to the seed treatment applicator 200. The monitoring of the changes in the weight of the keg 106 via scale 130 during the application process can provide the system controller 102 with accurate data indicating the amount of chemical that is actually being applied to a quantity of seed being directed into the seed treatment applicator 200. The calculated volume and rate of delivery can be utilized by the station controller 130 to automatically adjust or fine tune the delivery rate of each chemical component to match the desired application rate as provided in a treatment recipe.

Figure 6:
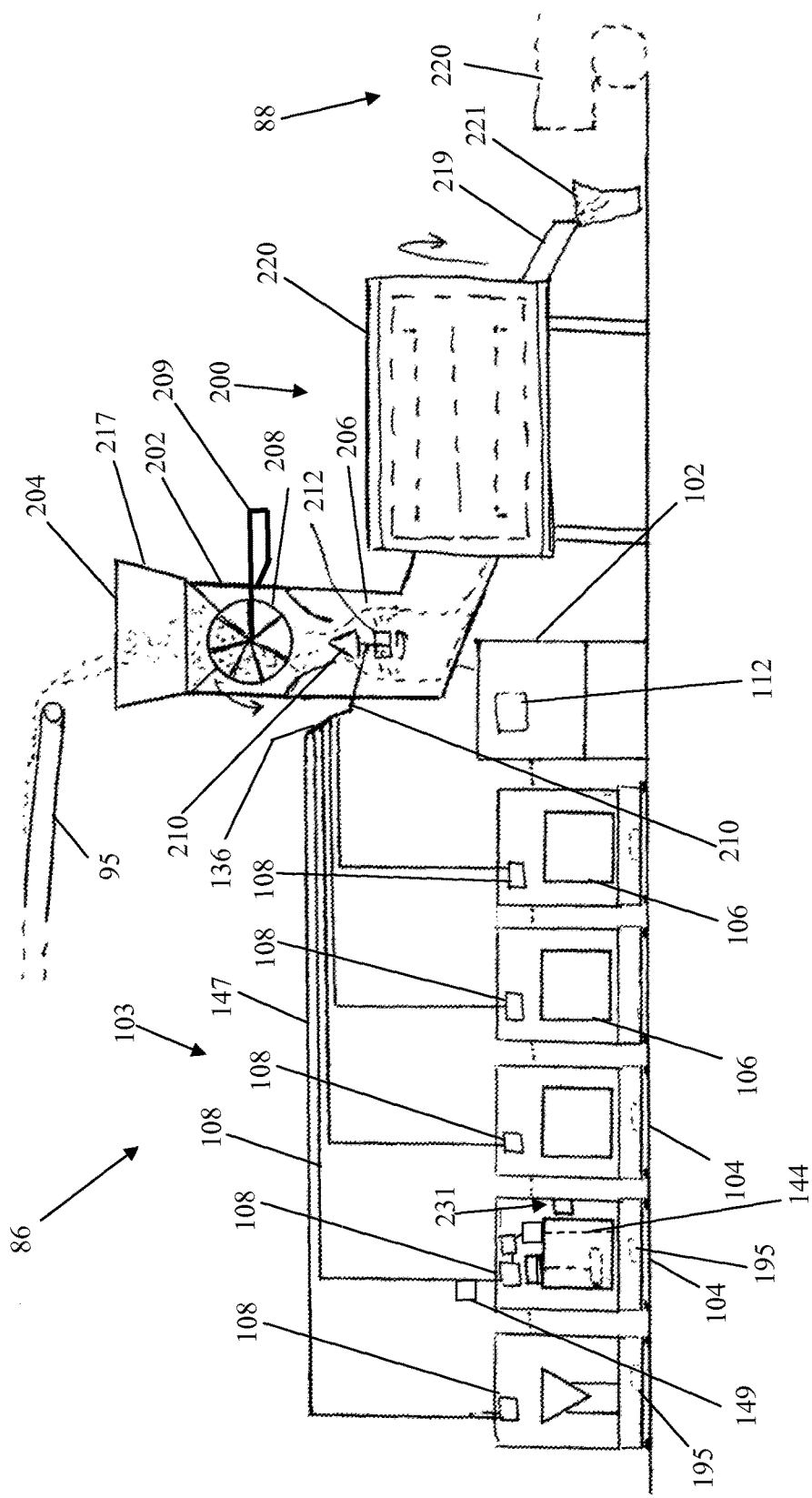
FIG. 6 depicts an exemplary embodiment of a seed treatment system with five keg stations and a flex-tank station.

Accurate weight measurements of the keg 106 and its contents can be obtained through the use of a motion sensor 231 at a dispense station, see FIG. 6, or for example, coupled to the scale, and in communication with the controller 130 such that the station controller 130 is notified of movement that could cause the scale 110 to provide an inaccurate reading. Oscillations due to the placement of a new keg on a scale, floor vibrations, or accidental contact with a keg 106 by an operator or other external source can cause inaccuracies that should be minimized or avoided by only weighing the keg when the scale is providing a stable reading and no motion is detected.

Generally, a keg station 104 can include a modular platform or station that includes a scale 110 or load-cell 195 to continuously or periodically measure the weight of a keg 106 and its contents, an accurate variable-flow pump 108 configured to transfer specific amounts of fluid from a keg 106 to an applicator manifold 136, a stirrer assembly 138 that includes a motor and stirrer-coupler 140 coupled to a stirring apparatus 142, an air release or removal valve 144 that can prevent gas build-up in the fluid lines to manifold 136 and remove any air introduced into the line, a keg coupler 148, associated piping or tubing to deliver the contents of an individual keg 106 to the seed treatment apparatus 200, and a junction box 149. Air can be inadvertently introduced into the line during the mating of a keg coupler 148 and associated piping or tubing to an individual keg 106. Due to the generally low delivery rate of some chemical formulations it is desirable to deliver the contents of each keg 106 to the seed treatment apparatus 200 without any air in the delivery lines. The presence of any more than a trivial amount of air in a line can prevent the uniform application of the desire chemical treatments. An air removal valve 144 can also be mounted on the back plate.

Coupler 148 can be a quick connect coupling device that is self-sealing, for example, a commercially available RSV (Reusable Stainless Valve) closed chemical system coupler as produced by Micro Matic USA, Inc. of Sparks, Nev. Coupler 148 can include a return port that allows any over flow from air removal valve 144 to be returned into keg 106.

Keg station 104 can also include a station controller 130 coupled to a pump 108 that can operate to remove the chemical contents from the keg 106 through coupler 148. The station controller 130 can be electrically coupled to the system controller 102. The system controller can provide the station controller 130 with commands directing the operation of pump 108. Commands can include pump speed, pumping duration, and pump direction. The station controller 130 can transmit pump or station data to the system controller 102. Station data can include weight measurements supplied by the scale 110 to the station controller 130.

Seed treatment chemicals can be distributed in drums or kegs 106 with a capacity of approximately fifteen gallons, although other sized kegs of approximately five to sixty gallons can also be accommodated by various embodiments. Kegs or drums with a capacity of greater than approximately fifty-five gallons may call for larger or additional load cells in scale 110. Kegs 106 are generally configured to reduce the potential for spillage or contamination and provide a safe and convenient mechanism for transport. Kegs of 15 or 30 gallons are particularly suitable. Each keg 106 can be labeled or coded with a bar-code, quick response (QR) code, a Radio Frequency Identification (RFID) tag, or other unique identifier that can include or reference information such as the chemical contents, weight, formulation, batch number, lot number, manufacturer, capacity, owner, or status of the keg and its contents.

Each keg can include a separate stirrer coupler 140, a coupler 148 that can be in fluid communication with a down tube or dip tube 144 in the keg 106, and a fill port 151. The stirrer 142 and stirrer-coupler 140, along with the coupler 148 can be installed prior to filling the keg. Once filled with a chemical treatment component the fill port 151 can be sealed such that fluid can only be withdrawn from the keg 106 through the coupler 148. In this manner the keg can remain sealed during transit and use, preventing or minimizing any risk of spillage or contamination of the contents of the keg 106.

Keg station 104 can include a reader that is electronically coupled to the station controller 130 or the system controller 102. In various embodiments of the invention the reader can comprise a bar code scanner, a RFID tag reader, a QR code reader, or any other appropriate inventory identification or monitoring equipment. In the example of an RFID tag reader, the reader 132 can be coupled to the keg station 104 such that only a single keg 106 can be positioned such that an RFID tag disposed on the keg 106 can be read by the reader 132. The reader can provide the RFID tag data from keg 106 to the station controller 130 or the system controller 102. The link between the reader 132 and the station controller 130 or the system controller 102 can be wired or wireless. In an alternate embodiment the reader 132 can comprise a wireless bar code scanner that is in electronic communication with the system controller 102. The system controller 102 can be configured to require that the reader 132 identify a keg 106 when it is placed on the scale 110 prior to the activation of pump 108. In this manner the system controller can update an inventory database, a batch report, and monitor the chemical formulation contained in each keg 106 at each station 104.

Figure 30:
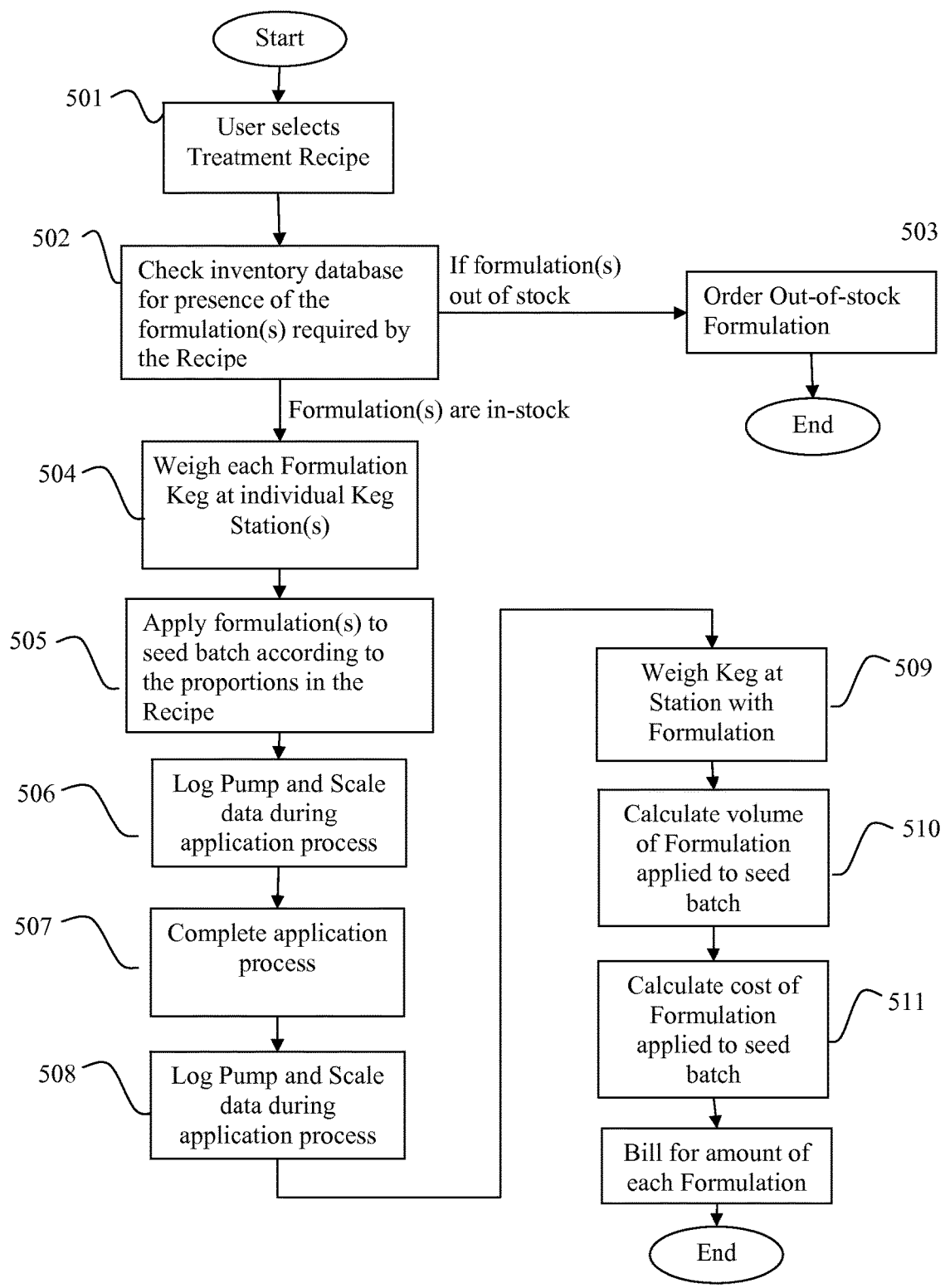
FIG. 30 depicts an exemplary application and billing process.
Figure 31:
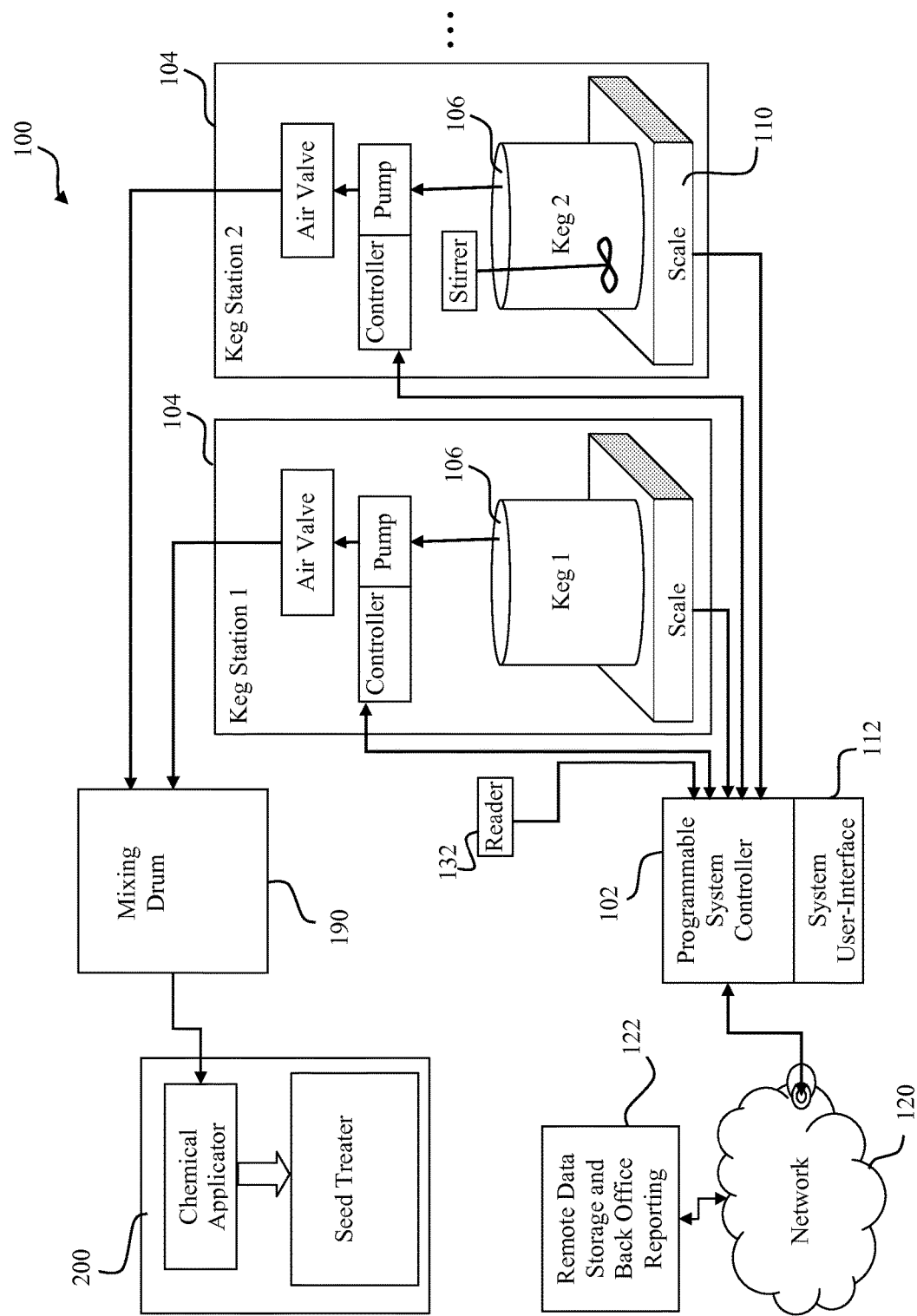
FIG. 31 is a block diagram of an exemplary embodiment of a seed treatment system that includes a pre-mix drum.

Keg 106 can also include an internal stirrer mechanism 142 to accommodate chemicals that must be stirred or agitated prior to application. The stirrer mechanism 142 can include a stirring port 140, an example of which is depicted in FIG. 30. The stirring port 140 is coupled to stirrer mechanism 142 disposed within the keg 106. Proper stirring or agitation may be needed for certain chemicals on a periodic basis, or within a period of time prior to application. The stirrer mechanism 142 is actuated by a stirrer-motor 138 that can be electrically coupled to the station controller 130. The system controller 102, in communication with the station controller 130, can be configured to ensure that chemical stirring or agitation only occurs at appropriate times and intervals. For example, the system controller 102 can direct the station controller 130 to prevent operation of the stirrer mechanism 142 during the application of a chemical formulation from a keg 106. The system controller 102 can coordinate stirring of chemical formulations at various keg stations 104 in order to optimize the availability of the chemical formulations in the kegs 106 for treatment applications. In a scenario where multiple application batches are scheduled the system controller 102 can direct the one or more station controllers 130 to activate the stirrer mechanisms 142 in a plurality of kegs 106 that are needed for a subsequent batch application during a first batch application utilizing a recipe that does not include that plurality of kegs 106.

The station controller 130 can include a timer or timing mechanism that can be configured or programmed to activate individual keg 106 stirrer mechanisms 142 at periodic or preset intervals. For example, a specific chemical at a specific keg station could require ten-minutes of stirring once every hour. A second chemical in a keg 106 mounted at a second keg station could require a one-hour period of stirring prior to application. The station controller 130 can be configured to accomplish both requirements with a periodic stirring of the first chemical every hour, and with a daily timer that activates the second keg stirrer at 7 AM, one-hour prior to beginning a programmed 8 AM batch application.

As a chemical fluid is pumped out of a keg 106 the fluid can pass through a filter 150 that can remove particulate matter before entering the pump 108. The pump 108 can then direct the fluid through an air-removal valve 144 that can prevent the formation of air pockets in a fluid line that connects the keg station 104 to the manifold 136 and ultimately to the application apparatus 200.

In one embodiment, the fluid lines 147 between the keg and the treatment apparatus 200 are clear or translucent, allowing the operator to confirm that a desired chemical, optionally treated with a colored dye, is present in each line. In a situation where a new line is installed or where a line is empty, possibly due to cleaning or the repurposing of a keg station 104 from one chemical to a different chemical, the operator can prime the system by directing the system controller 102 to operate the pump 108 associated with the empty line until the line is filled with fluid. In an alternative embodiment, optical, capacitive, or flow sensors 149 can be included at each keg station 104 or at the manifold 136 to monitor and validate the presence of fluid in each fluid supply line. These sensors could be coupled to individual station controller 130 associated with the supply line, or to the system controller 102. In either configuration the sensors can be monitored during the seed treatment process to monitor and verify the presence of each desired chemical formulation in the supply lines.

Figure 3B:
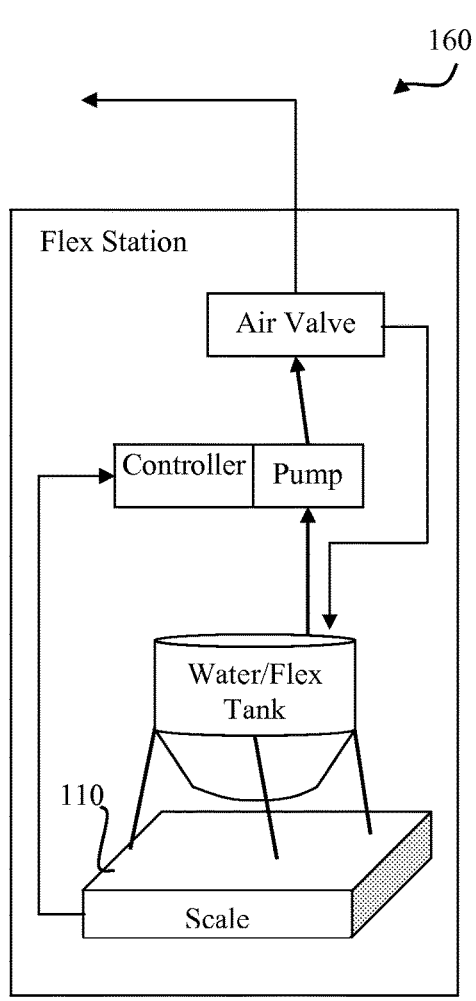
FIG. 3b is a block diagrams of a water flex-tank dispense station.
Figure 36:
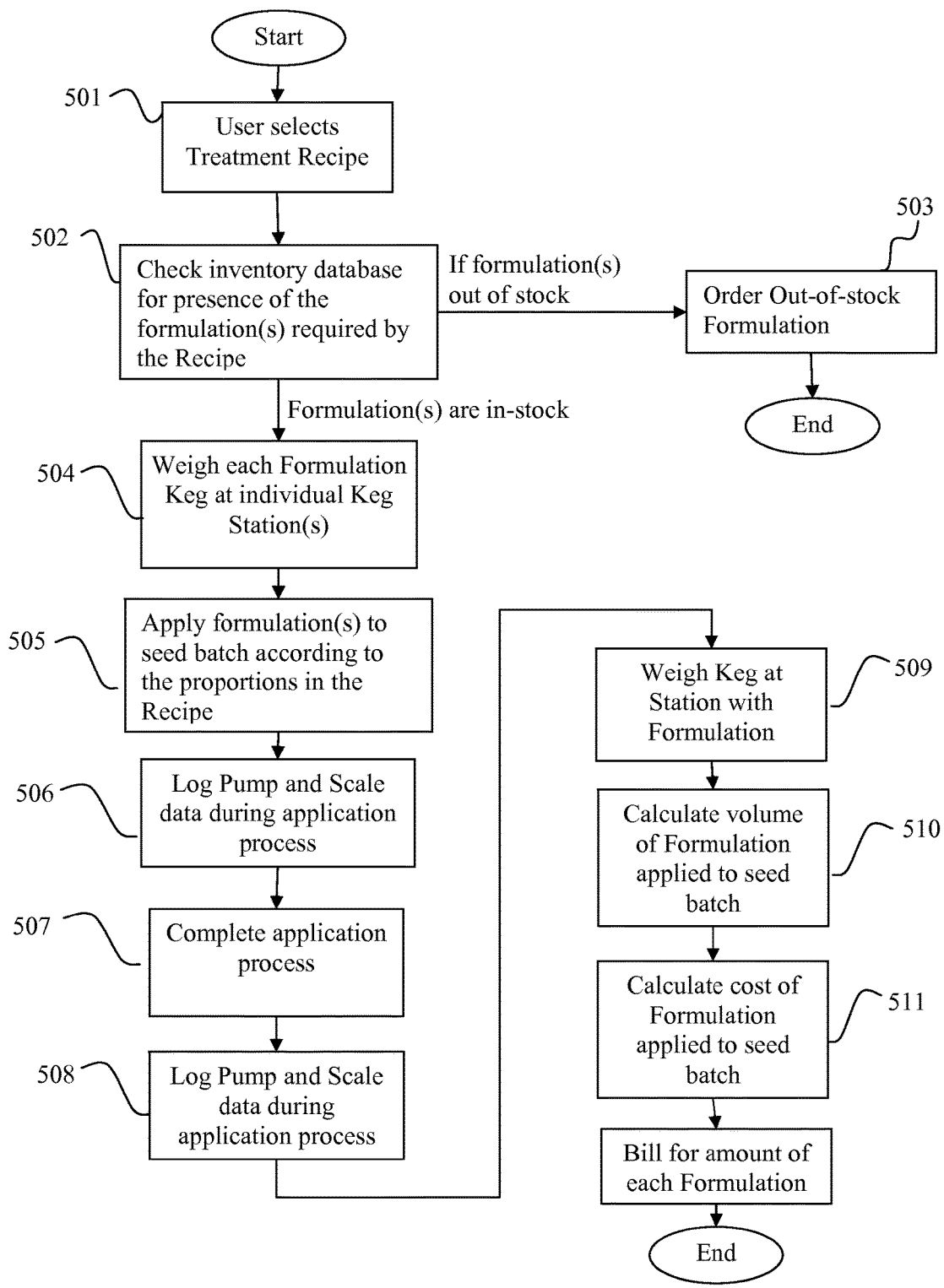
FIG. 36 depicts an exemplary dynamic application and adaptation of a treatment process.

Referring to FIGS. 3b and 36, an exemplary flex-tank station 160 can be included in system 100 to provide water or other components required by a specific recipe. The flex-tank can include a water source 161 for treatment recipes that call for the dilution of the combined chemical formulations. The flex-tank can include a portal 163 to introduce other components into the system 100 as required by the recipe or a customer's specific request. FIG. 6 depicts a seed treatment system with five keg stations 104 and a flex-tank station 160.

Figure 3C:
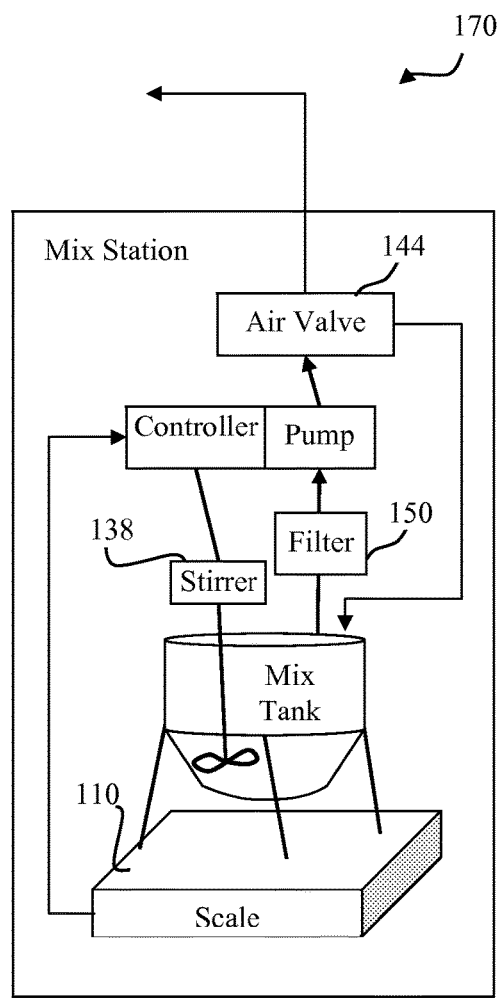
FIG. 3c is a block diagrams of a mixing tank dispense station.

Referring to FIG. 3c, an exemplary mix-tank station 170 can be included in system 100 to provide mixing or agitation of chemical formulations that are not available in individual kegs or powder or granular components that require pre-mixing. The mix-tank can also include a water source. The mix-tank can include a stirrer 138 as a standalone unit or integrated into the mix-tank bowl. Both the flex-tank station 160 and mix-tank station 170 can include a controller, pump, air-removal valve 144, filter, scale, and any additional components that could be included with a keg station 104.

Figure 4B:
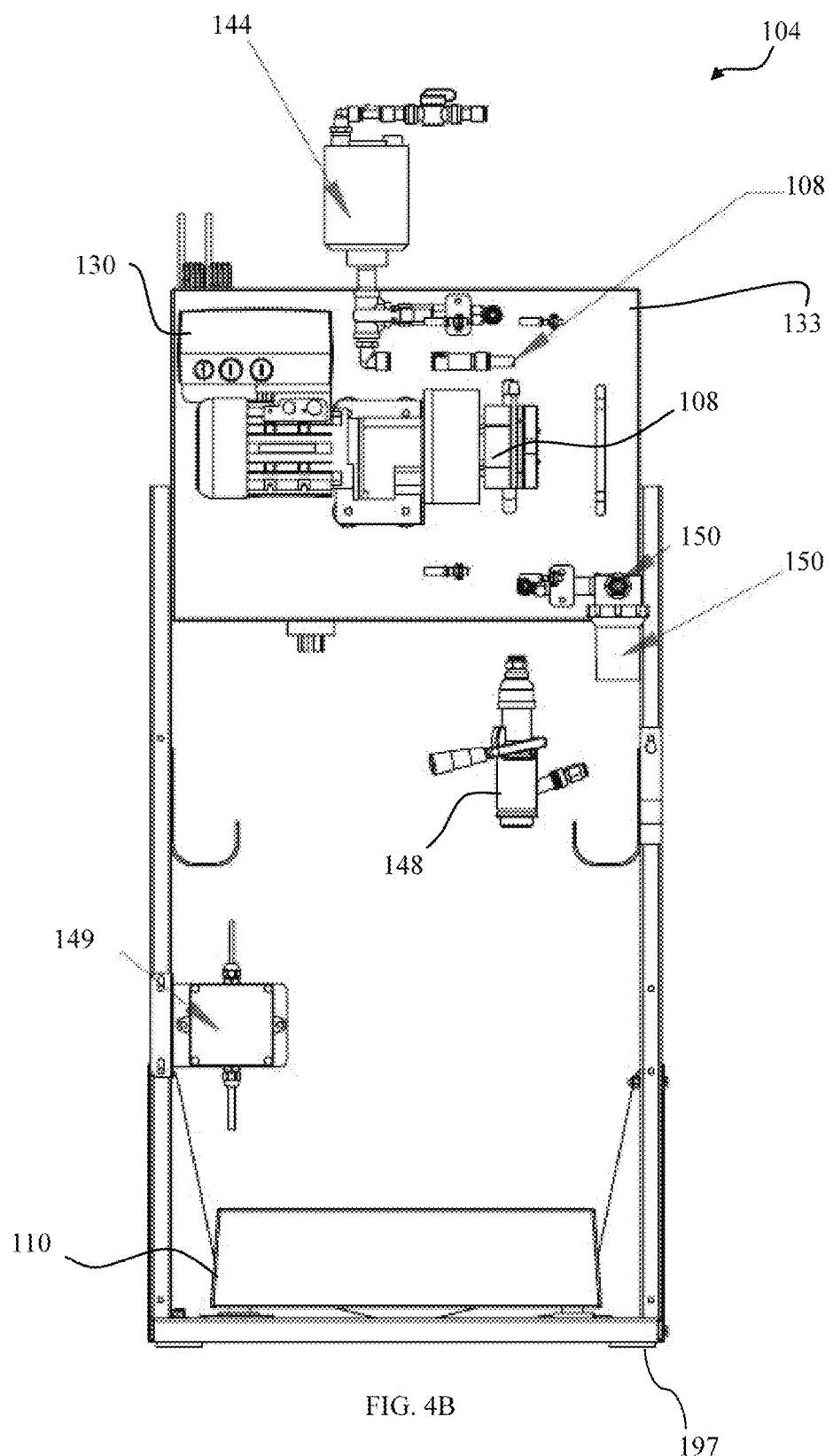
FIG. 4b depicts a elevational view of an exemplary embodiment of a keg station.
Figure 4C:
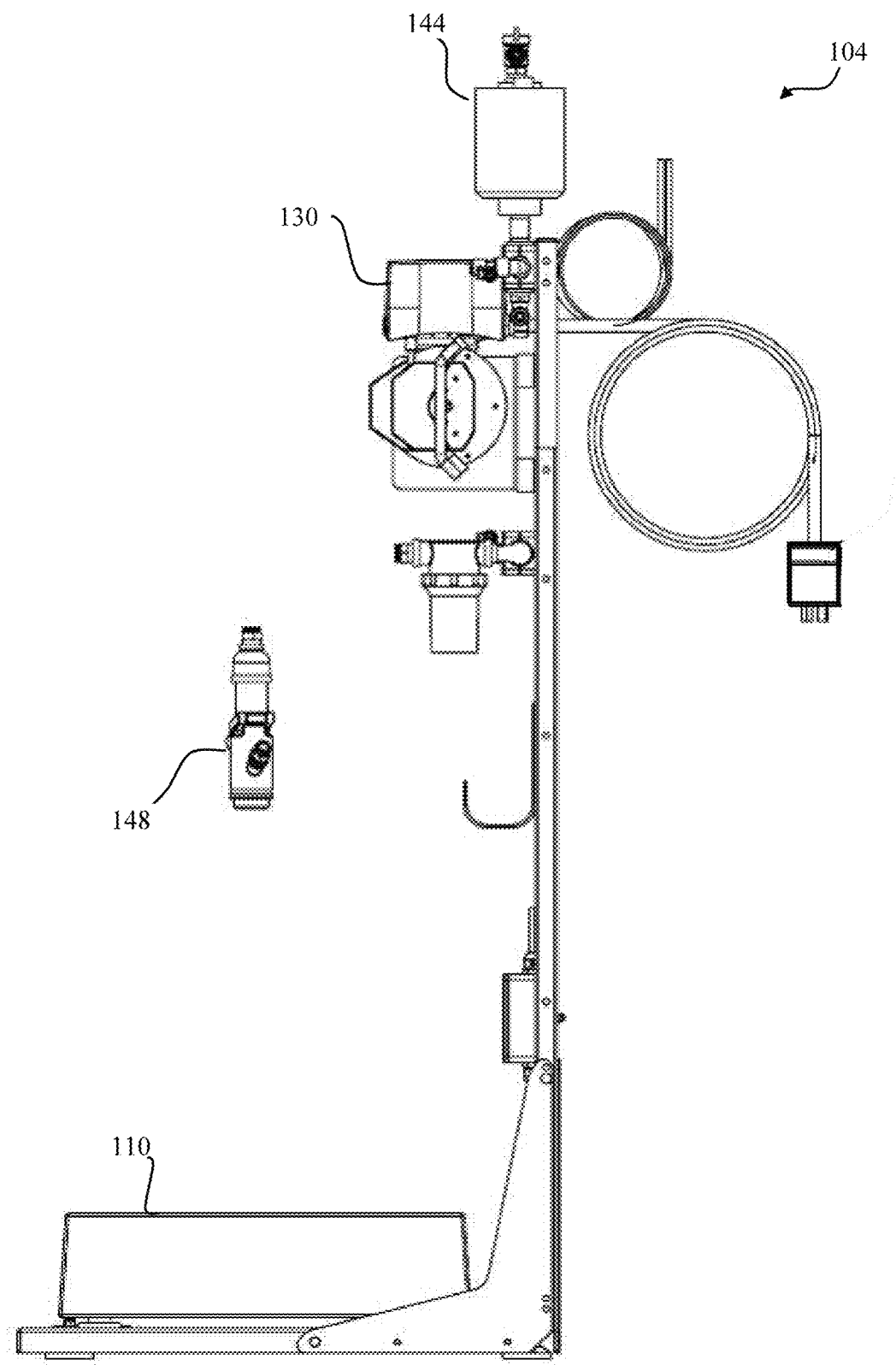
FIG. 4c depicts a side elevational view of an exemplary embodiment of a keg station, the view from the opposite side with respect to the base, scale, and upright support frame being a mirror image thereof.
Figure 4D:
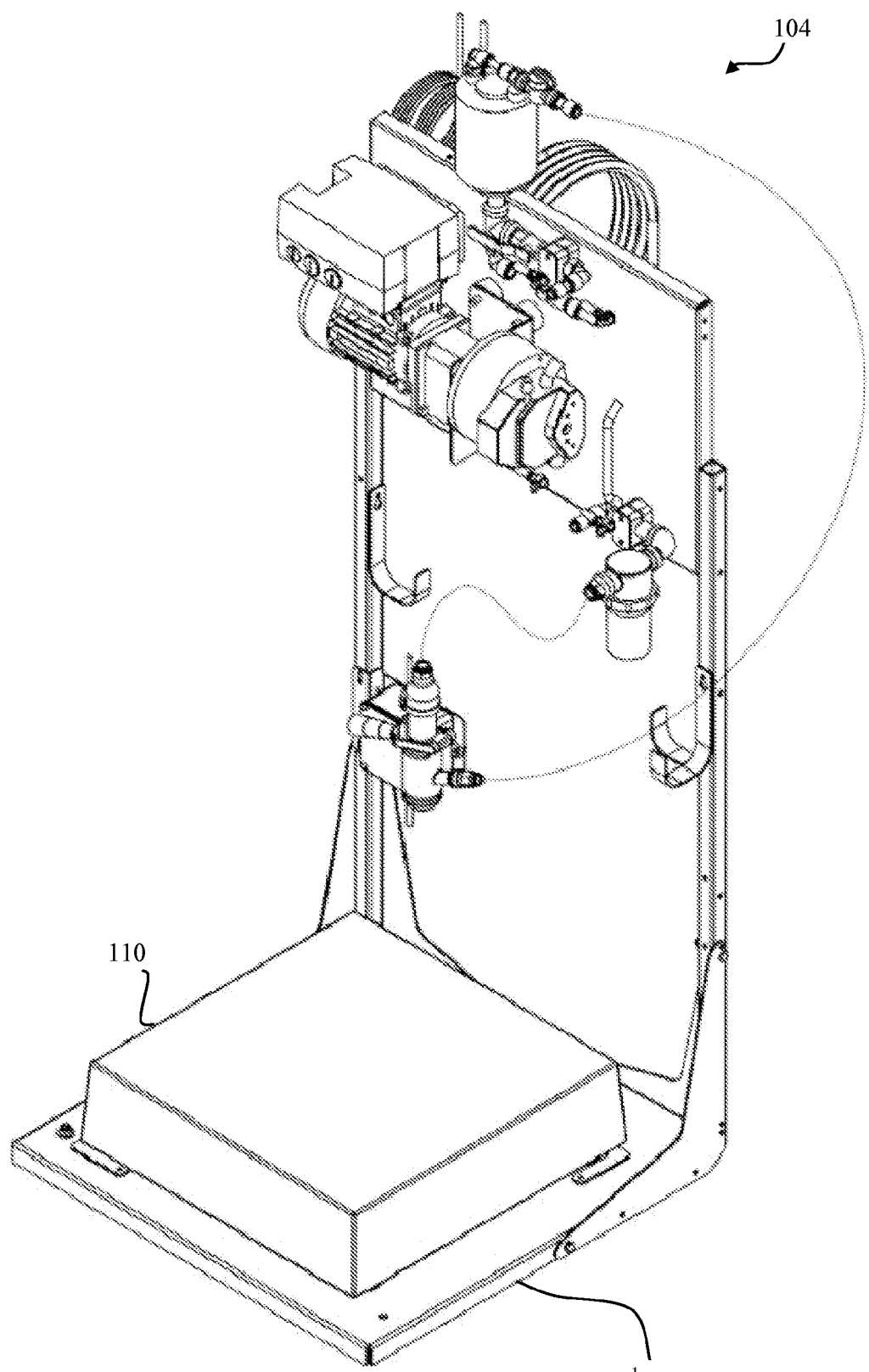
FIG. 4d depicts a front perspective view of an exemplary embodiment of a keg station, the view from the adjacent front corner with respect to the base, scale, and upright support frame being a mirror image thereof.
Figure 4E:
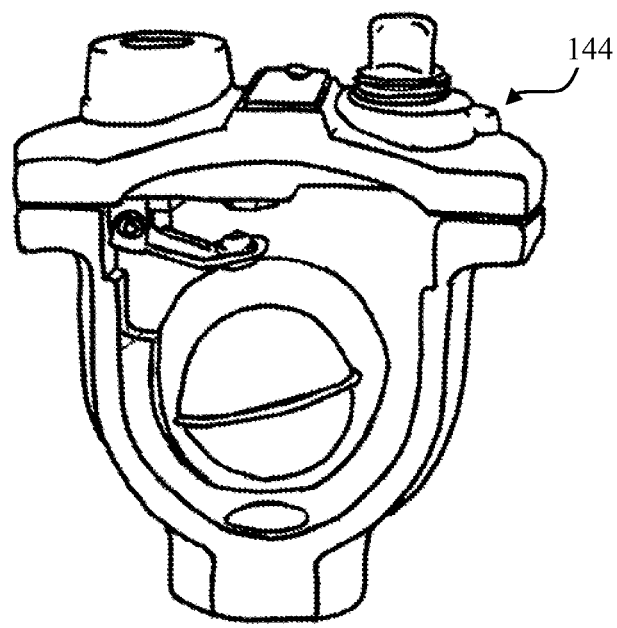
FIG. 4e is a cutaway perspective view of an air relief valve.
Figure 4F:
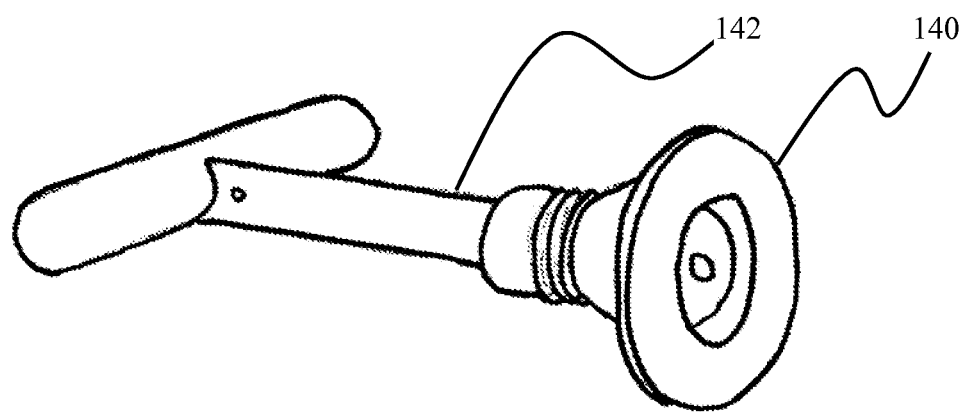
FIG. 4f is a perspective view of a keg stirrer mechanism that may be supplied with kegs filled with seed treatment formulations.

Referring to FIGS. 4b and 6, each scale 110 includes at least one load cell 195 disposed in a support structure 196. The support structure 196 can include a plurality of rubber bumpers 197 or insulators that can dampen vibrations that may cause the load cell 195 to generate inaccurate measurements.

The system controller 102 and the station controller 130 can be coupled with a bi-directional communication channel or protocol that requires both the system controller 102 and the station controller 130 to acknowledge the other prior to the beginning of a treatment application. This configuration can provide the system controller 102 with a mechanism to verify the presence and working operation of each station controller 130 on a plurality of keg stations 104. Similarly, the loss of communication in either direction between the system controller 102 and any individual station controller 130 can cause an alert or alarm to be issued. The presence of an alert may require operator action or result in an automated pause or shutdown of a batch treatment application. Treatment can be paused or temporarily suspended by stopping each pump 108 on each station 104, as well as stopping the flow of seed into or through a seed treatment apparatus.

Referring to FIGS. 1a, 6, 33a, and 33b, further details of an exemplary continuous flow seed treatment apparatus 200 and bank 103 of dispense stations 104 are illustrated. The seed treater 200 includes a housing 202 including a seed inlet 204 to a chemical applicator or treatment portion 206. In an embodiment, chemical treatment portion 206 can include a seed wheel 208 driven by a variable speed motor 209, a dispersion cone 210, a spinning atomizer wheel or bowl 212, connected to a rotating polishing drum 220 or mixing chamber. The chemical treatment portion 206 is in fluid communication with one or more kegs 106 containing chemical formulations for treating the seeds via an inlet tube 210. The inlet tube 210 can be coupled to a plurality of kegs 106 by a multi-port manifold 136, as depicted in FIGS. 32a and 32b. The manifold has a plurality of inlets 227 and one outlet 229. Couplings 231 may be used to connect inlets to the fluid lines from the dispense stations. The inlet tube may include internal baffles or mixing vanes to further mix the combined fluid flow therein and thus defining a blending device. The seed inlet 204 may be an open or closed hopper 217 and one or more conveyors 95 may deposit seed for bulk seed storage into the hopper. The quantity of seed entering the seed treater is metered by the seed wheel 208 which is connected to the control processor 102. The seed is funneled onto the cone 210 where it is dispersed into an annular seed stream. The combined seed treatment formulations are directed to the spinning bowl 212 that atomizes or converts the fluid into a droplets that are sprayed onto the curtain of seeds. The seeds then are directed into the rotating drum where by mixing more uniform coating is accomplished. The seed treater has an outlet 219 that may be used to fill a container such as a bag 221 or other customer containers, a truck bed 223, for example, providing delivery to the retail customer whereby the customer takes possession of the treated seed for planting, ideally in the next 24 hours, for example.

Additional seed-treatment apparatus disclosure is provided in U.S. Patent Publication No. 2011/0027479, incorporated herein by reference.

The seed treatment apparatus 200 can be connected to a system controller 102 with a processor that is coupled to a control panel or touch screen 112 for monitoring or operating the system. The system controller can control the seed wheel, the atomizer wheel or bowl, and the rotation drum.

Such a seed treatment apparatus 200 coupled to a system controller 102 can be configured to proportion both amounts of seed and treatment products to the polishing drum 208 or mixing chamber in order to provide for minimal treatment product waste and consistent treatment product application. The seed treatment system 200 can include sensors, flow meters, and/or controls to monitor/control both the flow rates of the treatment products coming out of the pumps 108 and the metered volume of seeds entering or exiting the chemical applicator 206. Based upon a pre-programmed recipe system 100 can automatically adjust the flow rates of the treatment products based on the volume of seeds to be treated that are supplied to apparatus 200 at a given time in order to control the amount of treatment product applied to the seeds. Thus, if a flow sensor sensing the flow rate of the treatment products and a seed sensor sensing the volume of seeds indicate that the ratio of flow rate to volume is not within a desired amount of a predetermined optimal ratio or a range of ratios, the system 100 can automatically adjust the flow rate of seeds and/or the volume of chemical treatment product. This provides a more accurate distribution of treatment product to the seed than previously possible because the correlation of volume of seeds to amount of treatment product is consistently maintained.

Figure 33:
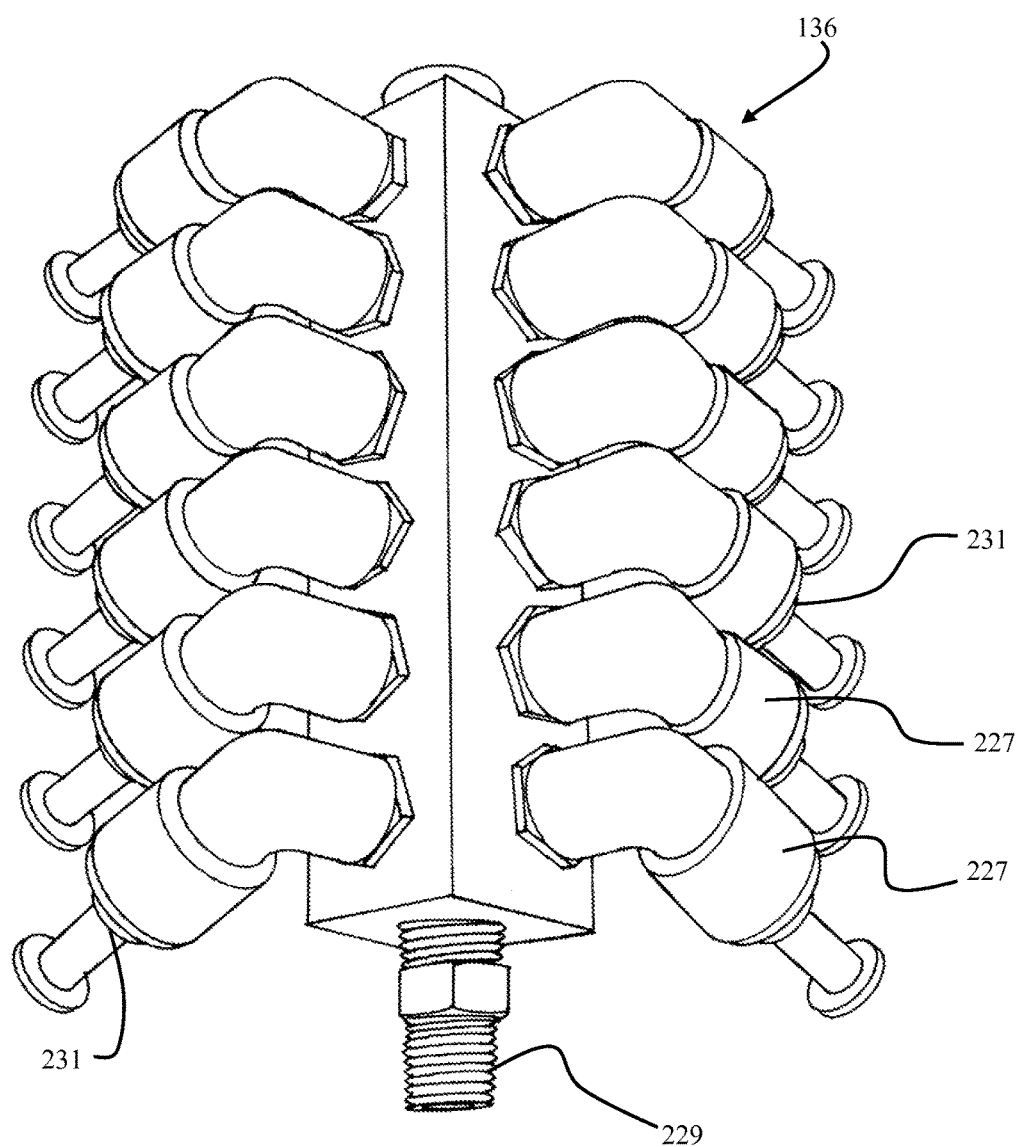
FIG. 33 depicts exemplary twelve-input manifold.
Figure 34:
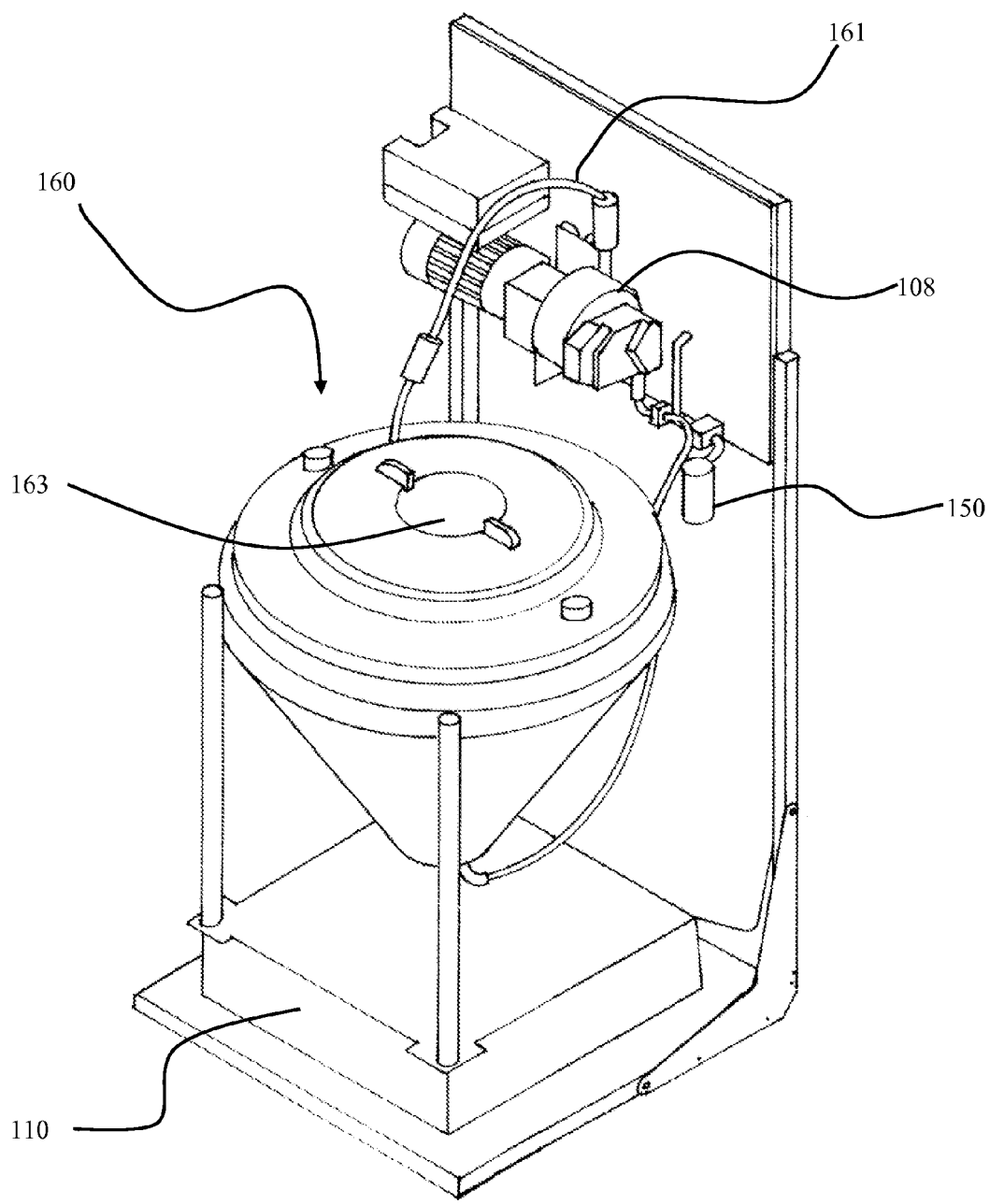
FIG. 34 is a dispense station with a tank on a scale.

FIG. 1a depicts an embodiment of a seed treatment system with ten keg stations 104 and a pair of flex-tank station 160. The flex-tank stations can include a water source for treatment recipes that call for the dilution of the combined chemical formulations or the addition of a solid or powdered component, such as an inoculant, that is mixed with water before seed treatment. The flex-tank can include a portal to introduce other components into the system 100 as required by the recipe or a customer's specific request. The fluid supply lines between stations 104 and apparatus 200 are not shown for clarity, however each station 104 includes an individual fluid supply line that is connected to a manifold input of apparatus 200. An exemplary twelve-input manifold 136 is depicted in FIG. 33b. Typical input manifolds can range in size from two to twenty inputs, although additional inputs can be accommodated with larger manifolds. Manifold 136 is shaped such that the individual chemical formulations are thoroughly mixed together prior to deliver to a seed treatment apparatus 200 for application to a batch of seeds.

Figure 7:
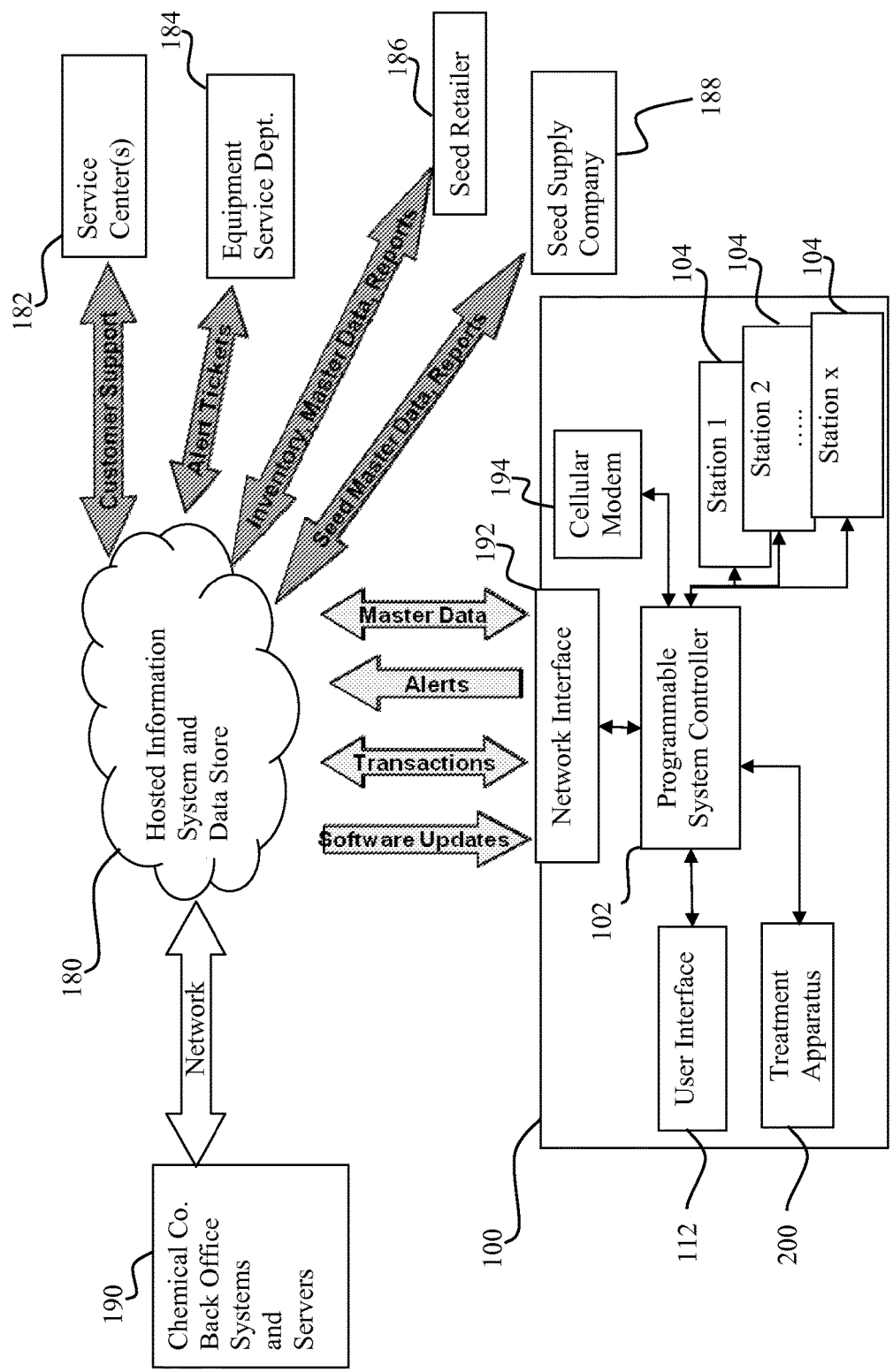
FIG. 7 is an exemplary block diagram of communications between a treatment system and other networked locations and system participants.

FIG. 7 is an exemplary block diagram of an embodiment of various communications pathways between an embodiment of treatment system 100 and other networked elements. System 100 can transmit and receive a variety of electronic communication from a remote information system and data store 180 through either a wired or a wireless network. This communication can include software updates, transaction data, alert messages or alarms, and data related to a master database of recipes and formulation information. Additionally, other entities such as a customer service center 182, an equipment service department 184, individual seed retailer(s) 186, and seed producer companies 188 can all transmit and receive data from the remote information system and data store 180 as appropriate. A chemical company 190 or other treatment system owner or distributor can also transmit and receive data.

A communications failure between one or more keg stations 104 and the system controller 102 can be reported at the user interface 112, to a back-office reporting center 190, or directly to a customer service center 182. The programmable system controller 102 can include a wired network interface 192 that provides a reliable connection to the Internet or a private network. In the case of an Internet or other wired network failure, a properly quipped system 100 can send an error indication via a secondary network such as a cellular-telephone modem 194.

The system controller 102 can also report errors or failures of the treatment application apparatus equipment 200. For example, indications of a seed wheel motor failure or indications of a drum motor failure can be reported or logged by the system controller 102. Other communications between the system controller 102 and the treatment apparatus 200 can include commands to start or stop a flow of seed or if appropriately equipped, to select one of several bins or containers of different seed varieties. In this manner a fully-automated seed treatment recipe that includes both the chemical formulations as well as the seed variety can all be controlled by the system controller 102.

The system controller 102 can deduce various errors in the operation of individual keg stations 104. For example, if a fluid supply line between the treatment application apparatus 200 and an individual keg station 104 were to become clogged or blocked such that the pump 108 was unable to draw a chemical out of the keg 106, the system controller 102 can detect the blockage. In the situation where the pump 108 being operated, the scale 110 should report a decrease in the weight of keg 106 proportional to the speed of operation of the pump 108. If no decrease in the weight of keg 106 is detected despite the operation of pump 108 an alert can be raised or alternatively the system controller 102 can stop any active batch treatment process until the blockage is removed. Similarly, if the pump 108 or pump motor were to fail or otherwise be unable to withdraw fluid from keg 106 the system controller 102 can issue an alert or alarm. Any alert or alarm that is generated due to a failure condition detected by system controller 102 can be reported to the data store 180 as well as an appropriate service center 182 or service department 184. These reports can be in the form of repair tickets that indicate the location, type, time and potential resolution if any, of the alert or alarm.

In one embodiment the system controller 102 can adjust the speed of a pump 108 at an individual keg station 104 to adapt to a gradual buildup of material in a filter 150 that can cause the actual flow rate of a chemical formulation in a keg 106 to decrease given a constant pump speed. In the situation where the pump 108 being operated, the scale 110 should report a decrease in the weight of keg 106 proportional to the speed of operation of the pump 108. If the decrease in the rate of change of the weight of keg 106 decreases over a period of time where the speed of operation of pump 108 is constant an alert can be raised or alternatively the system controller 102 can increase the speed of the pump 108 to compensate for the decrease in flow (rate of change of the weight of the keg) thereby maintain the treatment formulation consistency for an active batch treatment process. In this manner the system 100 can self-calibrate by correlating the speed of each pump 108 at each keg station 104 with the change in weight of the keg 106 during pump operation. The self-calibration can be combined with the density of the contents of the keg 106, obtained by the reader 132 scanning an RFID tag or barcode, to provide consistent and accurate seed treatment.

Individual transactions can be logged by the system 100 and held locally in an internal database on computer readable storage coupled to the system controller 102. The transactions can also be reported to the data store 180 in real-time or in periodic communication or synchronization intervals. Examples of transactions include receipt of seed or chemical treatment inventory, replenishment orders, seed treatment forecasts, and seed treatment application information for individual batches.

The back office system 190 can include Enterprise Resource Planning (ERP), Business Intelligence (BI), Electronic Data Interchange (EDI), Supply Chain Management (SCM), or other software programs or resources that can provide additional forecasting or inventory management information. Additionally, the back office system 190 can provide: advanced shipment notifications, demand planning based on seed treatment forecasts, replenishment orders, and seed treatment batch information converted to seed company invoice or electronic statements/bills.

The back office system 190 can provide "Business Object Dashboards" to support internal chemical supplier functions such as inventory supply chains for chemical formulation components, equipment efficiencies, equipment service information and records, and additional analysis and reporting to support sales and marketing efforts.

Software updates can include code pates that are specific fixes to isolated issues, or a complete new release of the software. Additionally, system maintenance announcements can be provided to inform or remind the system operator of maintenance issues or bulletins.

Alerts can be communicated to one or more reporting centers by the system controller. An individual load scale failure and its rack location number. The rack location number of an individual load cell or scale failure to properly return to zero during calibration process can be on example of an alert to both the local user at the user interface 112 and the equipment service department 184. A pump failure can generate a similar notification that includes the locate of the system 100 installation, the rack location number of the pump, the amount of time the pump has been in service, the number of total gallons of fluid delivered through the pump, and the type of formulation contained in the keg 106 at the station 104 can all be included in a report to the customer service center 182 for both customer assistance, technical troubleshooting, and engineering reliability data analysis.

Figure 8:
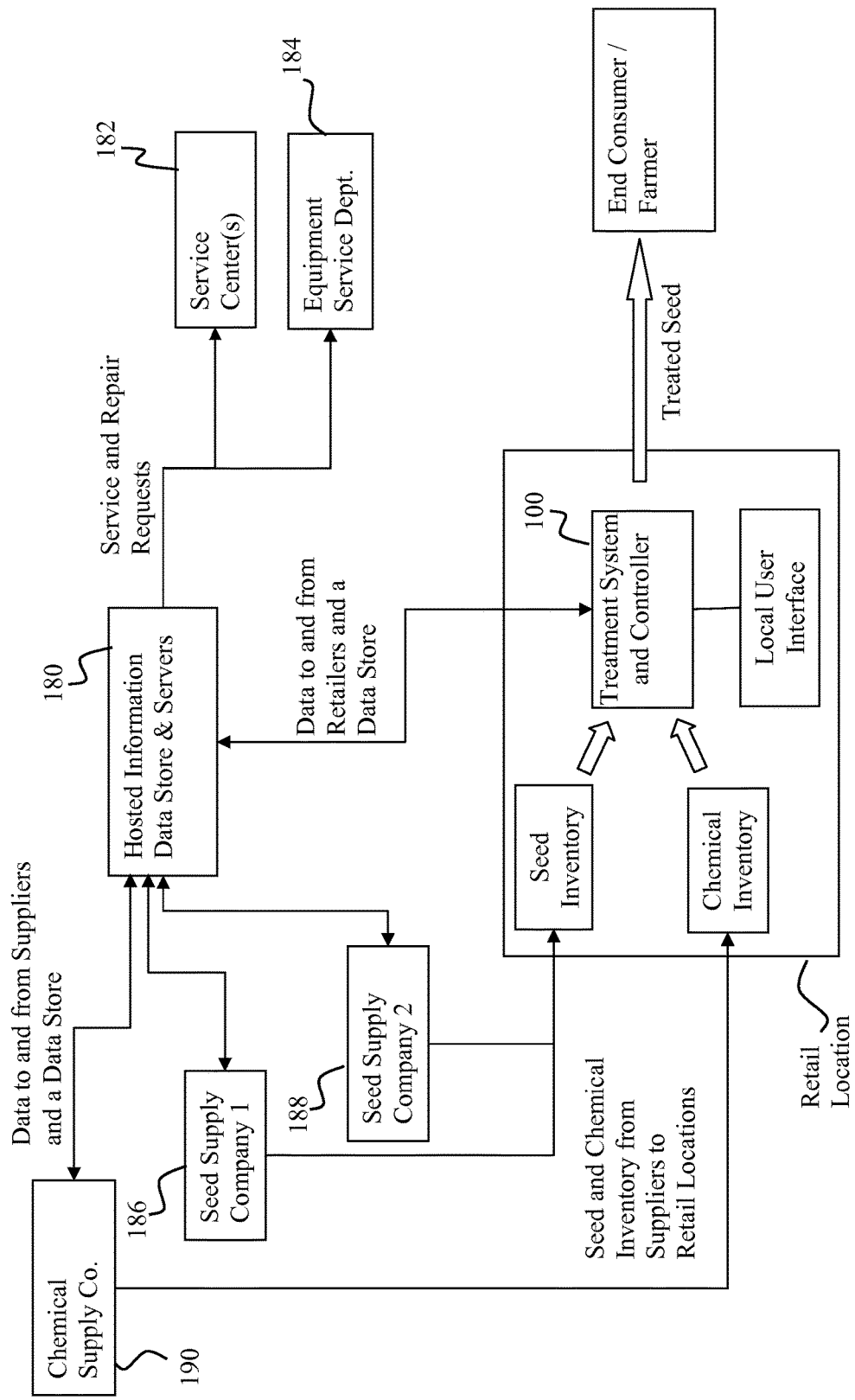
FIG. 8 is an exemplary block diagram of communication and produce flow between retail locations, suppliers, and consumers according to an embodiment of the invention.

FIG. 8 depicts a variety of separate locations and suppliers that can be in communication with an individual retail location equipped with a seed treatment system 100. At least one chemical supply company 190, a first seed retailer 186 and a second seed supplier 188 can each provide chemical and seed inventory to a retail location. This inventory can be scanned, recorded, and confirmed electronically at the retail location. The use of a bar code reader or RFID inventory control system, coupled to system 100 can identify each keg 106 that is delivered as part of the locations chemical inventory. Seed deliveries can also optionally be recorded in the system in a similar manner. This information is then transmitted to data store 180 that is at a remote site from either the retail location and the suppliers. The suppliers can access the inventory data stored in the data store 180 through an appropriate network or Internet based interface.

Figure 9:
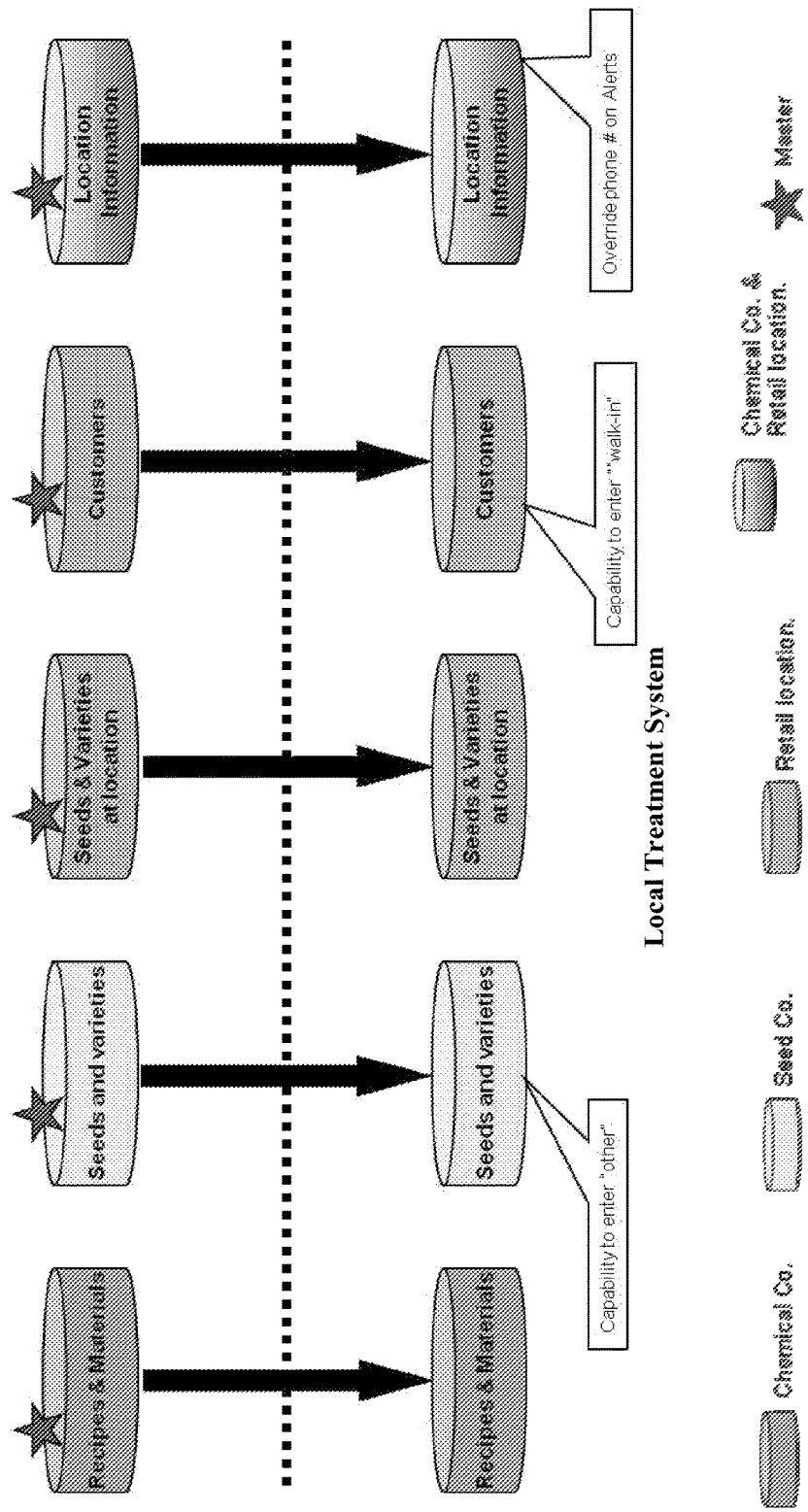
FIG. 9 is an exemplary block diagram of potential data storage and transactions between a seed treatment system and a remote could-based data store.
Figure 10C:
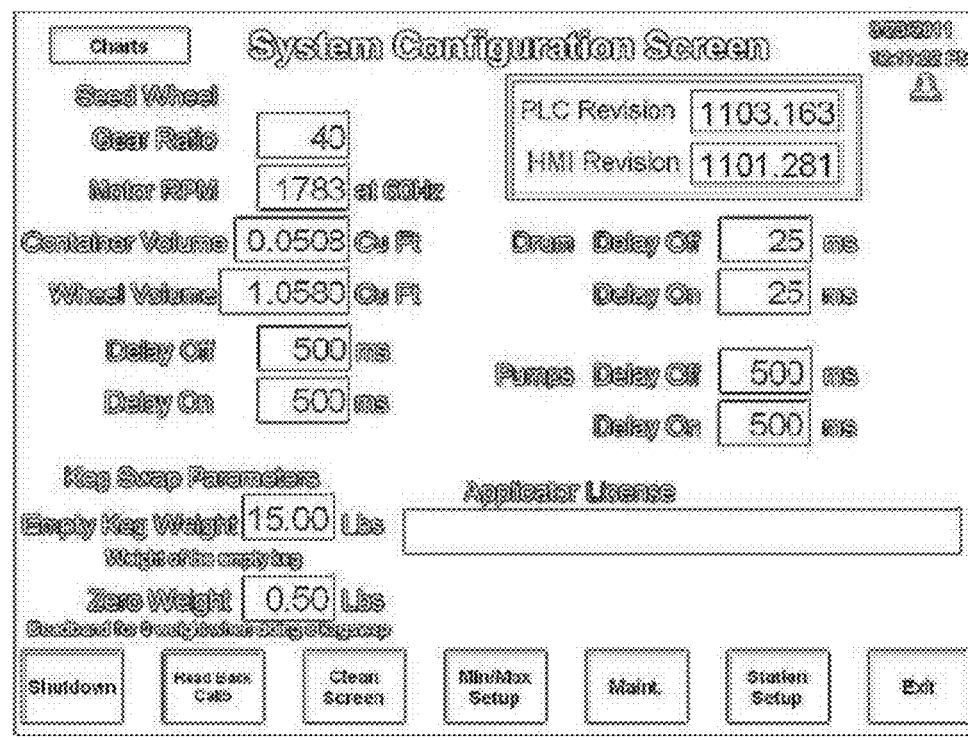
Figure 10D:
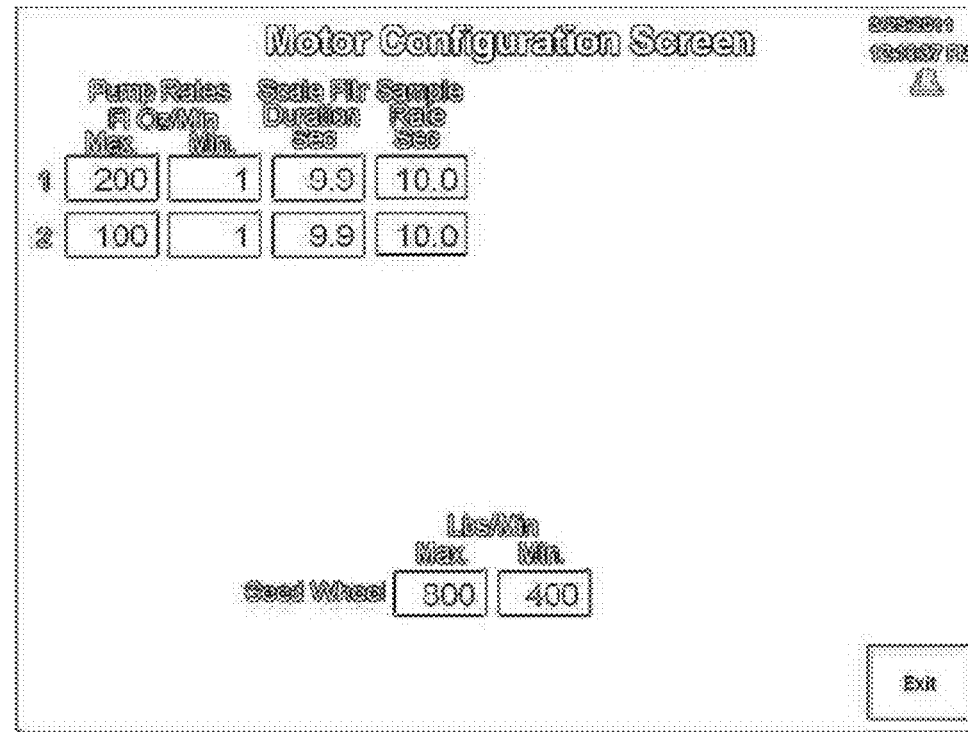

Referring to FIG. 9, an exemplary block diagram of potential data storage and transactions between a seed treatment system and a remote could-based data store. Due to the variety of sources and types of data that can be needed and generated by embodiments of an on-demand seed treatment apparatus, an embodiment of the data store 180 can compartmentalize the ownership and access to different types of data. For example, a chemical company can consider the precise proportion of component formulations in its recipes to be proprietary and not wish to expose that information or the total aggregation of an amount of a chemical that was sold during a year to the public. In this example the Recipes & Materials data can be securely transferred between the data store 180 and individual treatment systems 100. In this manner the data can be protected from unauthorized access. Similarly, a seed company can provide individual treatment systems 100 with information related to the type, size, quantity, or other information related to each variety that is delivered to a specific retail treatment location, through the network connection between the data store 180 and the individual system 100.

Information related to customers can also be transmitted to individual locations, for example if an order for a specific type, quantity, and treatment for a batch of seed is placed on-line with a seed company, that information can be forwarded to the retail see treatment location closest to the individual customer for advance fulfillment and/or delivery. Finally, location specific information, such as inventory data, contact information, alerts, repair status, and the like can be communicated between the data store 180 and each local treatment system.

Figure 32:
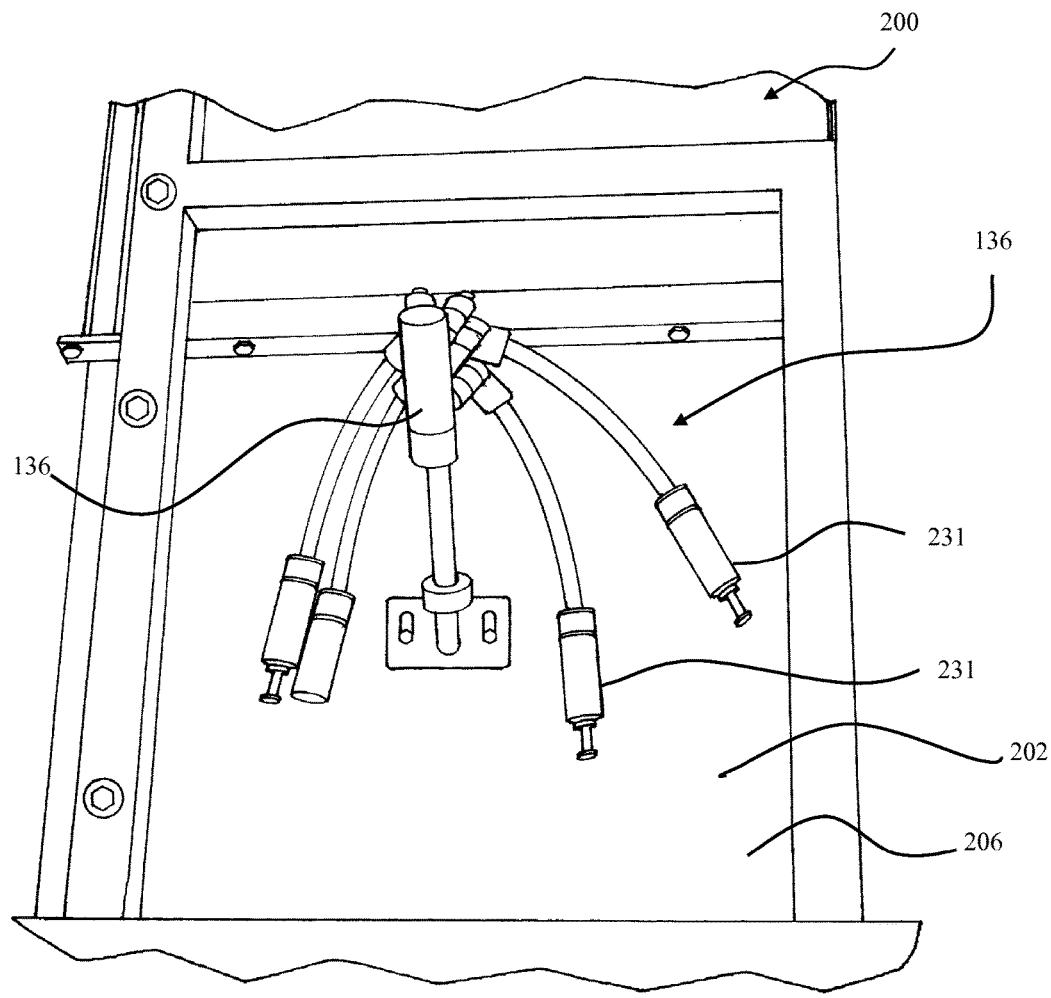
FIG. 32 is a perspective view of an exemplary fluid supply-line inputs to a six-input manifold attached to a treatment apparatus.

Embodiments of system 100 can include a graphical user interface (GUI), optionally with a touch screen panel suitable for an industrial or retail environment. The GUI can include a plurality of screens that provide a user/operator with a variety of options, commands, and information necessary to operate and monitor the system 100. FIG. 32 depicts an exemplary touch screen user-interface coupled to system controller 102.

FIGS. 10*a*-10*d* depicts an exemplary seed treatment system setup screens. These screens, along with appropriate display and input hardware, can provide a user interface to enter initial setup information for a system 100 installation. Preferably this information is only needs to be entered once during the initial installation of a system 100 and apparatus 200 at a retail or distribution treatment location.

Figure 11A:
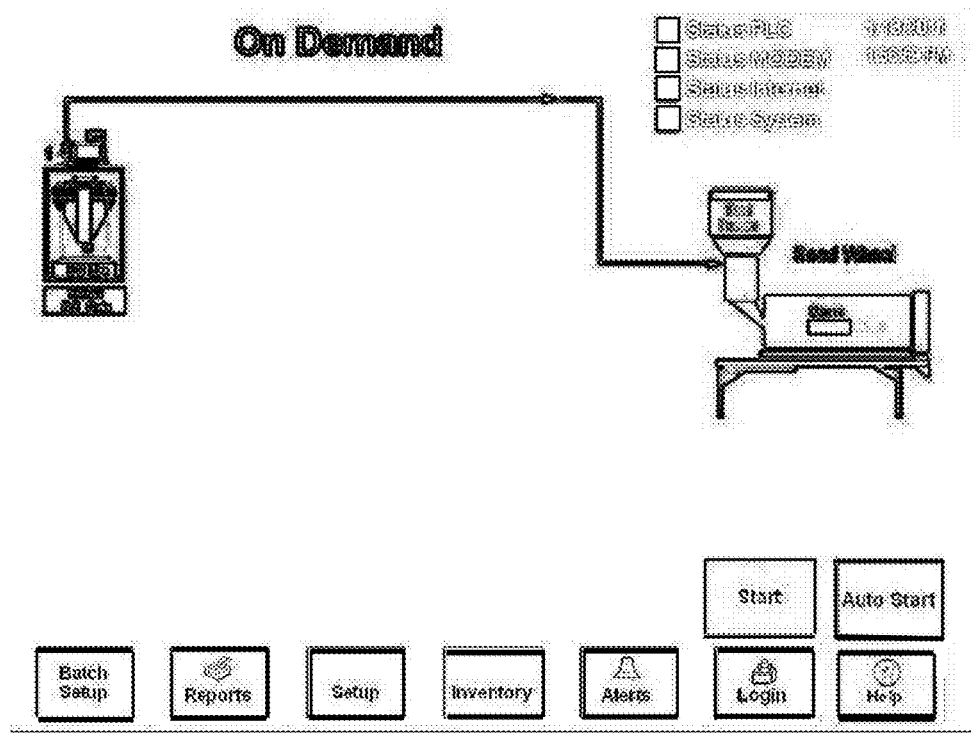
FIG. 11a-11d depict exemplary seed treatment main system screens.
Figure 11B:
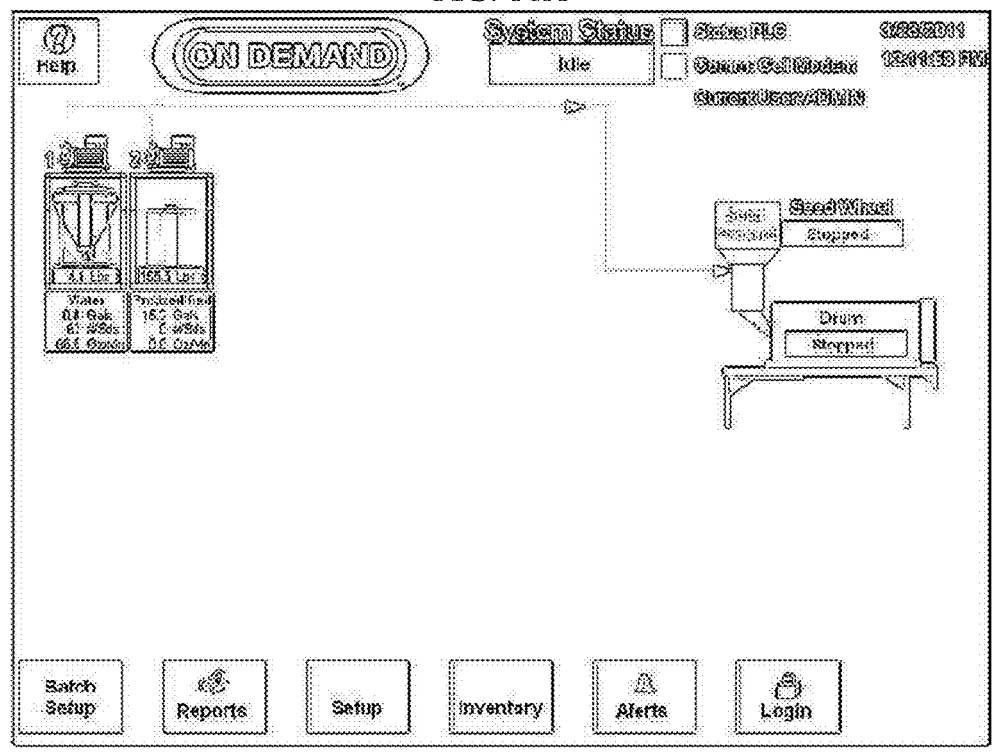
Figure 11C:
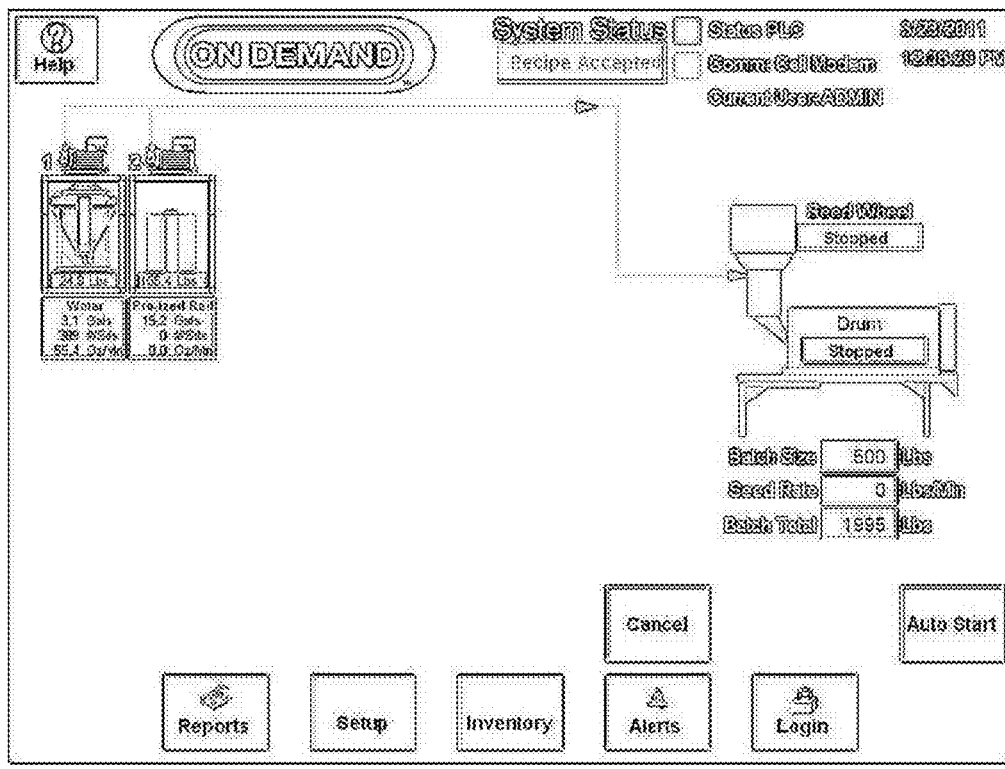
Figure 11D:
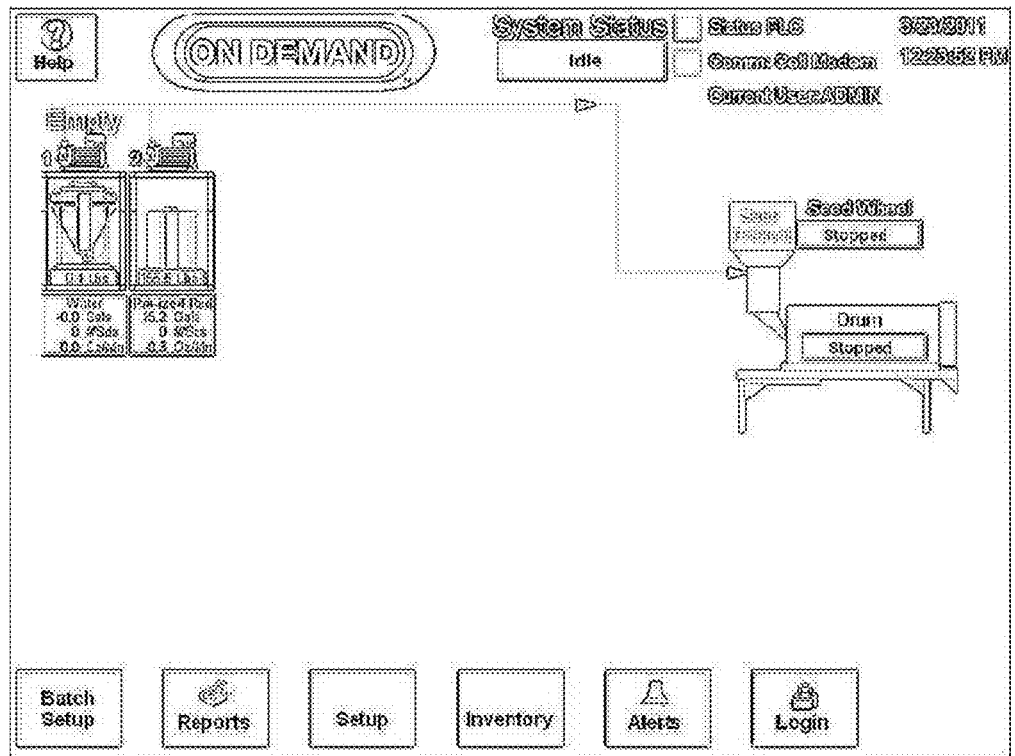
Figures 12E, 12F:
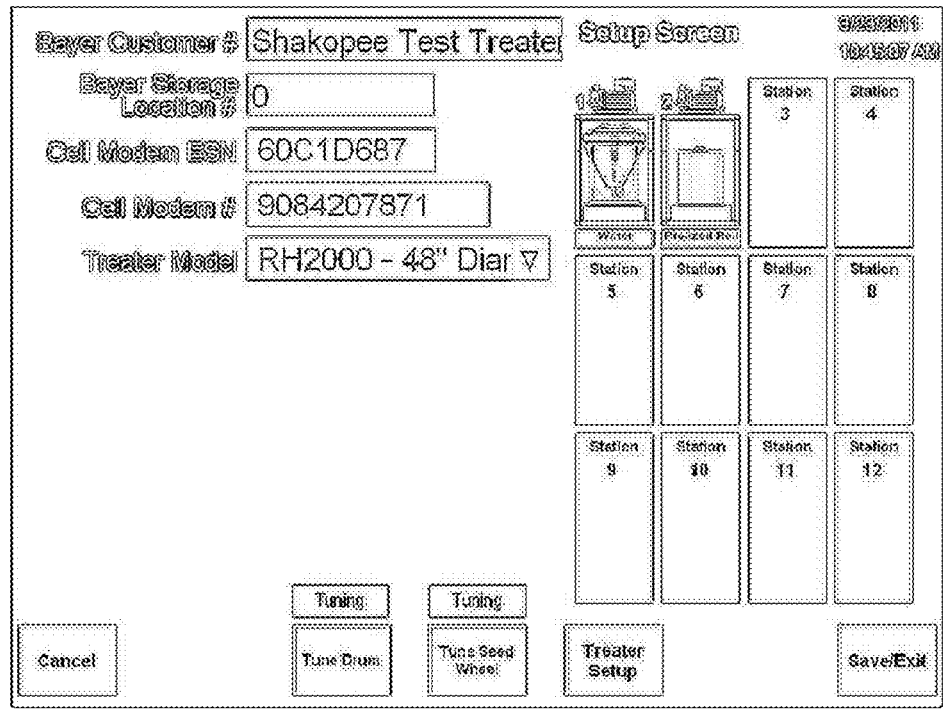

FIGS. 11*a*-11*d* depicts an exemplary seed treatment system pump status screen that allows the user/operator to navigate to other screens by selecting the various depicted buttons at the bottom of the screen. These screens can also display a variety of information in real time depicting the status and operation of the system. FIG. 11*a* depicts a single flex tank at station number one. FIG. 11*b* depicts the addition of a first keg station located at station two. FIG. 11*c* depicts a desire batch side of a five-hundred pound quantity of seed. FIG. 11*d* depicts an alert condition due to the lack of water in the flex tank at station one.

FIGS. 12*a*-12*g* depict exemplary seed treatment system pump detail screens. Each station 104 can be configured with information related to the type of chemical formulation that will be contained in a keg 106 at each station. This configuration allows the system 100 to checked that only a replacement keg is installed at the station by verifying that the keg bar code data for the replacement keg matches the data associated with the previously used keg. In an alternate embodiment the bar code data field is replace with RFID data. This screen also provides the option to calibrate, or zero, the scale when kegs are replaced or swapped.

Figures 12G, 13A:
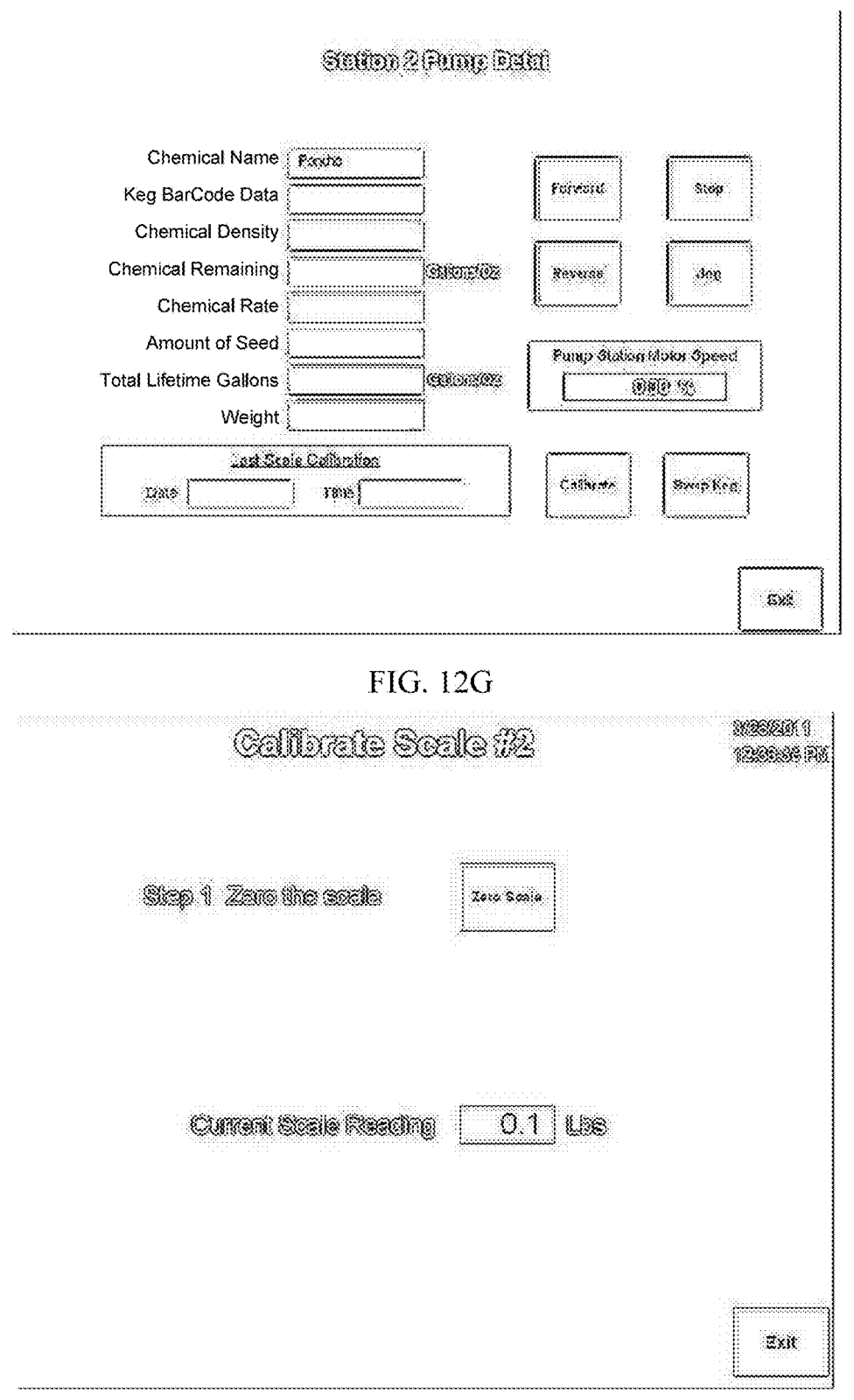
Figure 13B:
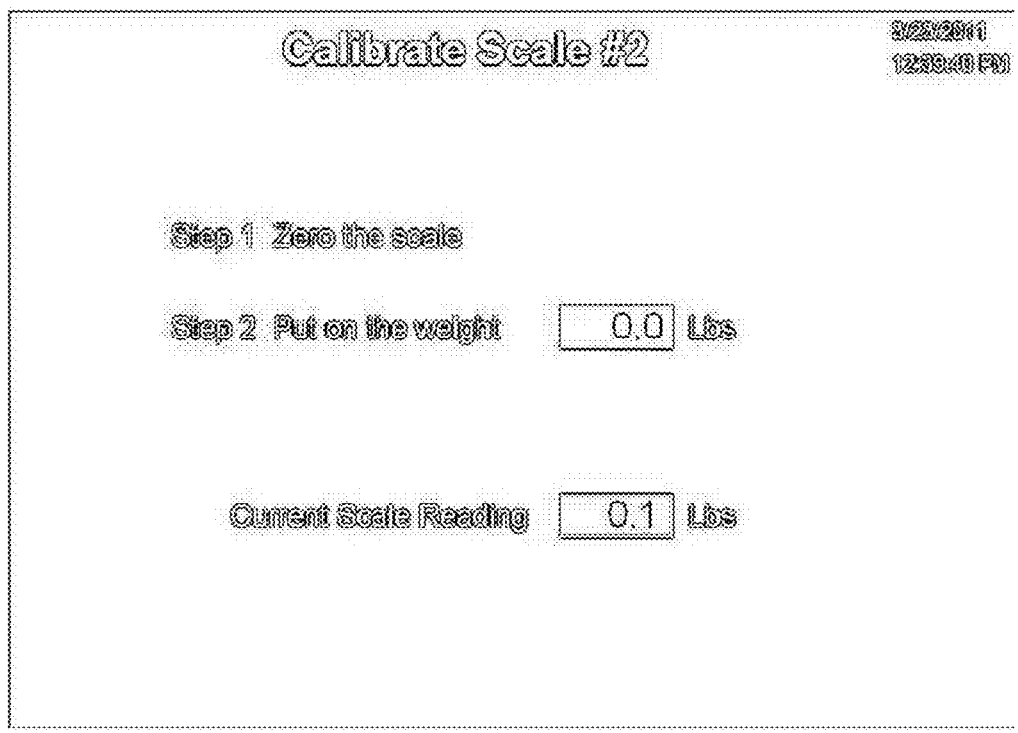
Figure 13C:
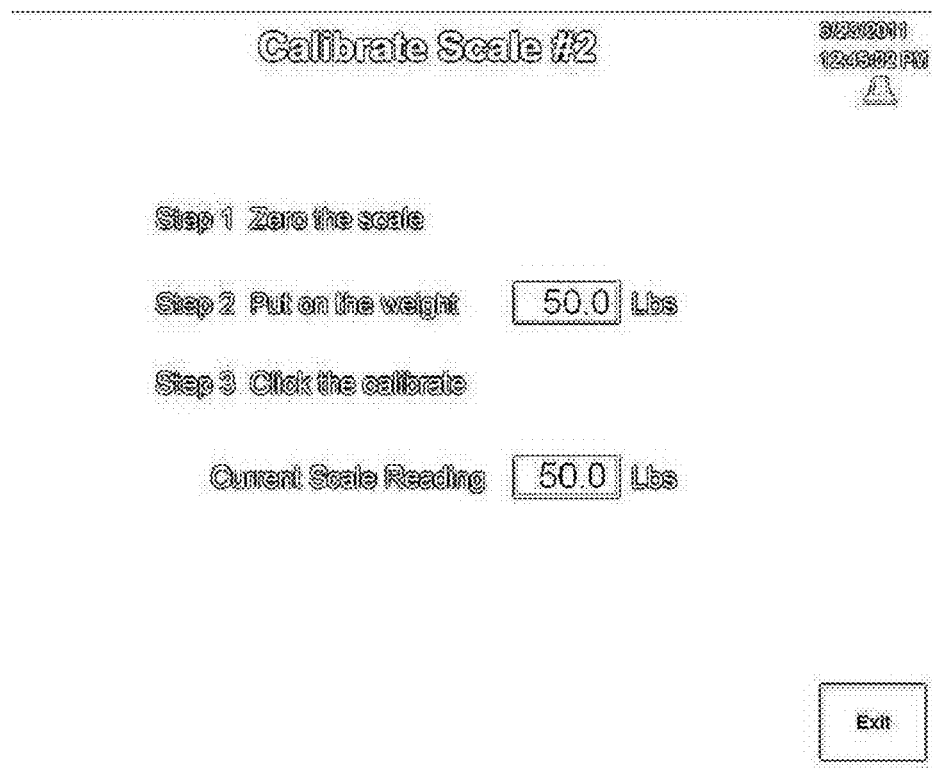

The calibration steps of zeroing a station scale are shown in FIGS. 13*a*-13*c*. Periodically it may be necessary to recalibrate the scale of each station in order to ensure accurate and precise weight measurements are obtained at each keg station 104. For example, a scale can be cleared, indicating a desired reading of zero pounds as shown in FIG. 13*a*, after the scale is zeroed a test weight of a known mass is placed on the scale and the scale can be adjusted to provide an accurate reading, or replaced if the scale has become defective.

FIGS. 14*a*-14*f* depict exemplary seed treatment system batch treatment setup screens. This screen allows the user/operator to select and input the various components and variables that make up a complete seed treatment-batch dataset. This data can include: seed company name, crop type, crop variety, seed lot information, seed size data, a recipe specifying the various chemical formulations to be applied to the selected seed, the size of the batch (if known), the customer name or identity, and environmental conditions such as wind speed and temperature.

Figure 15:
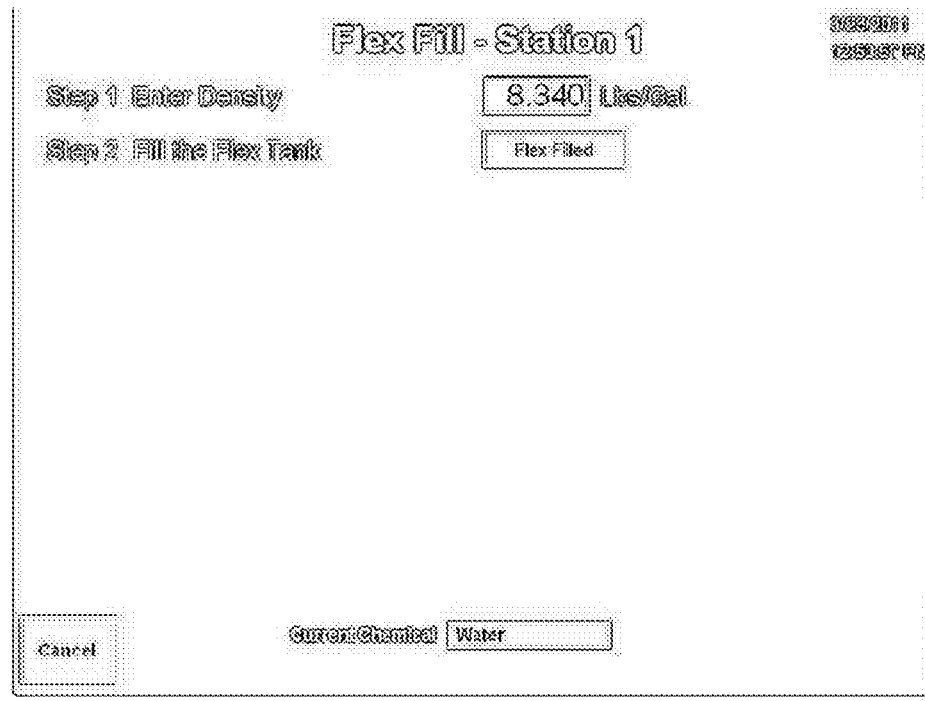
FIG. 15 depicts an exemplary flex fill instruction screen.

FIG. 15 depicts an exemplary detail screen that can provide an interface to configure a flex-tank station. A flex-tank station can accommodate water or slurry composition as depicted, or alternatively a chemical formulation that is unavailable in a keg or drum form factor. In either case the user can input the density of water or the alternative chemical formulation to ensure accurate application of the flex-tank contents based on the measured weight of the contents. The density of the chemical formulation can be entered manually, if known, or populated automatically when scanned from a barcode or other tag affixed to an individual keg when it is placed at a keg station.

Figure 16A:
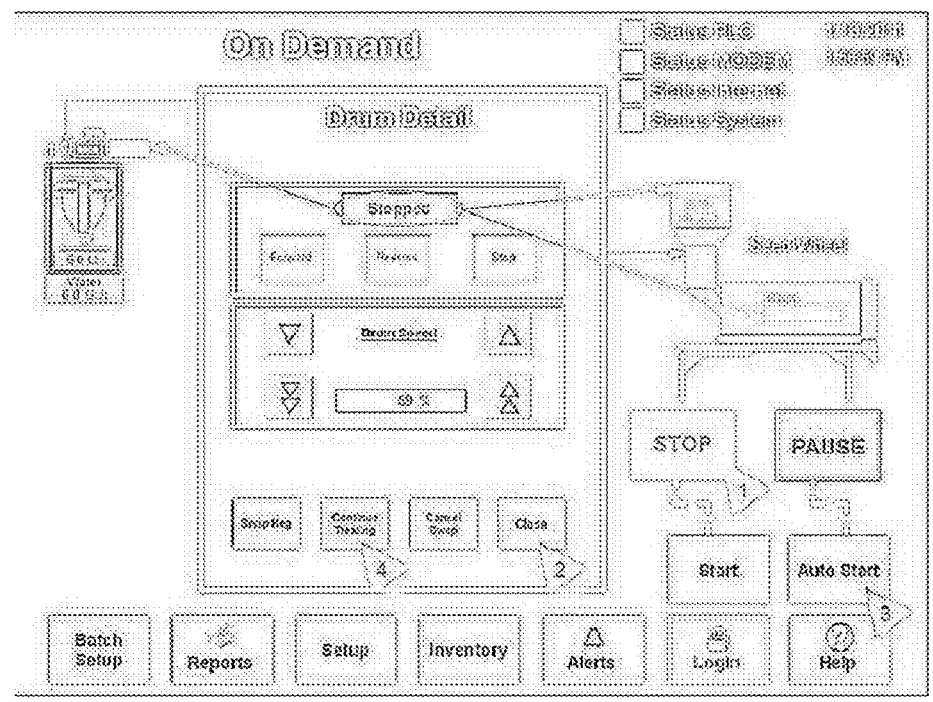
FIG. 16 depicts an exemplary seed treatment system status and command screen.
Figure 16B:
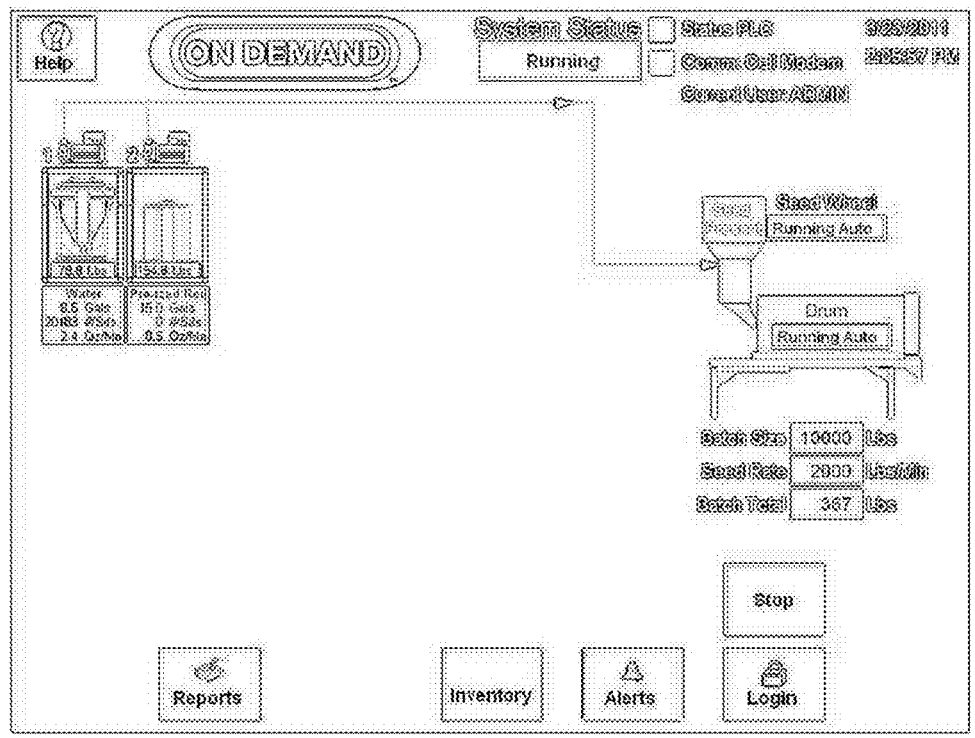

FIGS. 16*a* and 16*b* depicts exemplary seed treatment system status and command screens. From a command screen the user/operator can start and stop, or otherwise manage and monitor, the seed treatment-application process.

Figure 17A:
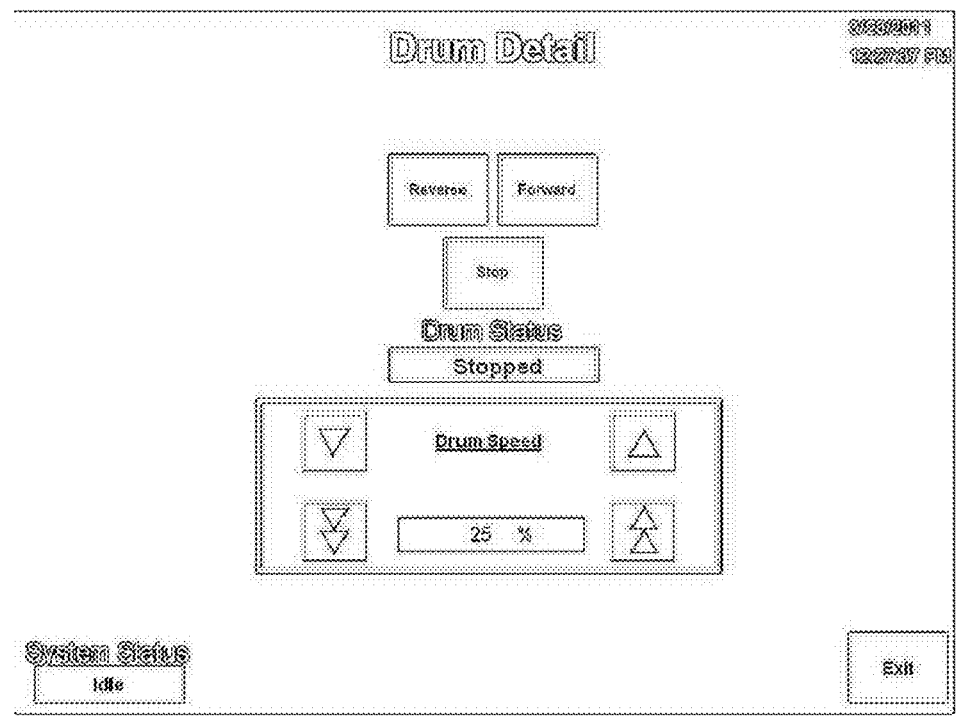
FIG. 17a-17d depict exemplary drum and seed wheel control screens.
Figure 17B:
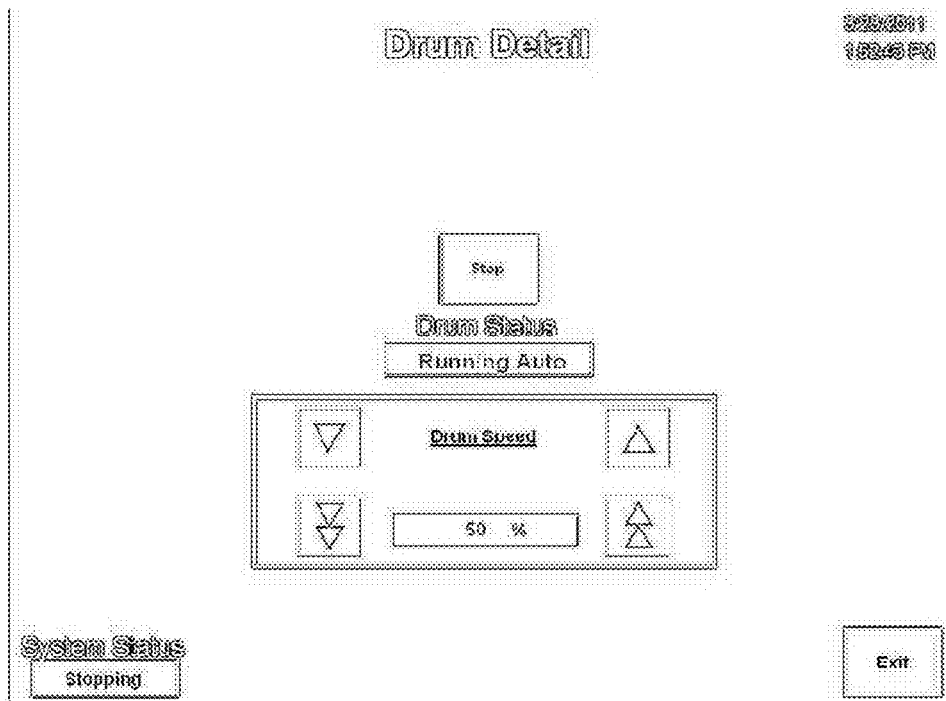
Figure 17C:
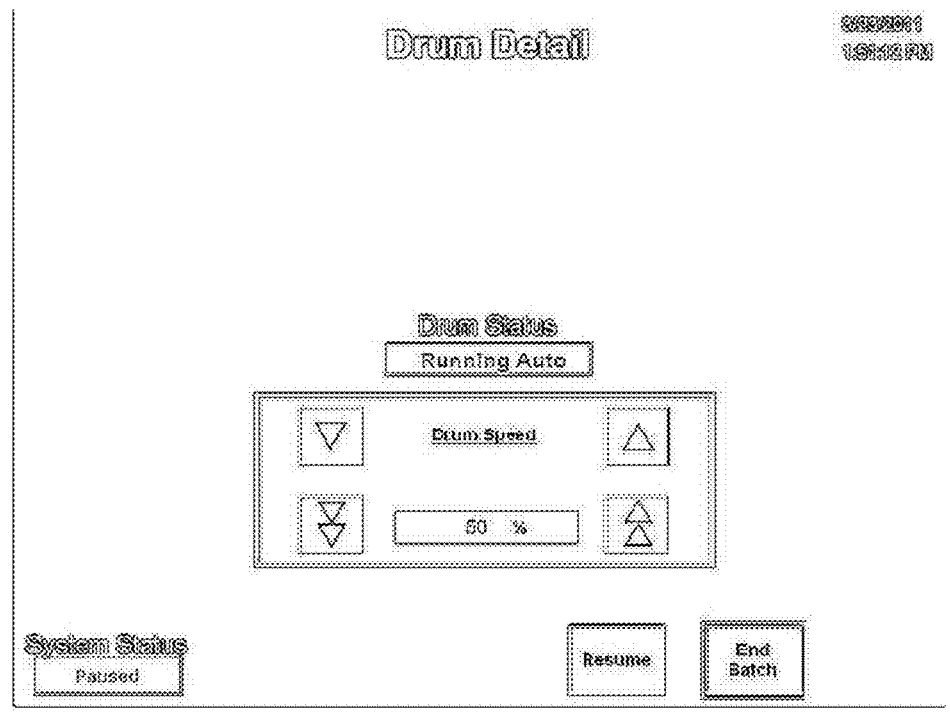

FIGS. 17*a*-17*c* depict exemplary seed apparatus drum-detail control screens that provide a user-interface to monitor, operate and adjust the speed of the drum 208 of treatment apparatus 200.

Figure 17D:
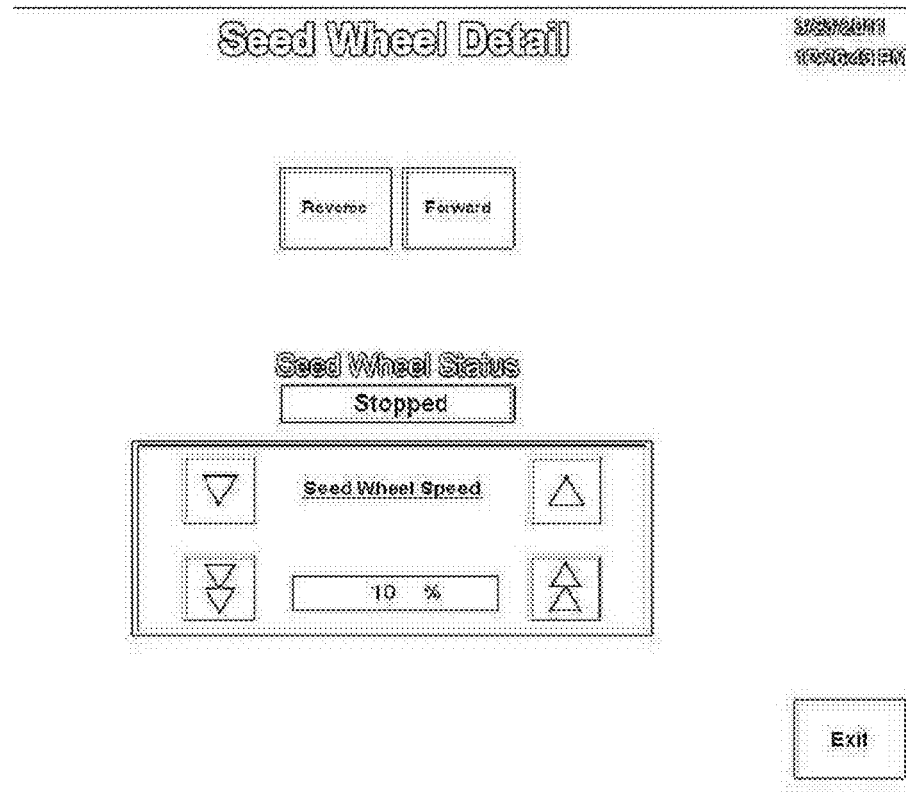

FIG. 17*d* depicts an exemplary seed-wheel detail control screen. Similar to the drum control screen the seed wheel screen provides a user-interface to adjust the speed of a motor driving the seed wheel of treatment apparatus 200, which controls the rate at which untreated seed is introduced into the treatment apparatus 200.

Figure 18:
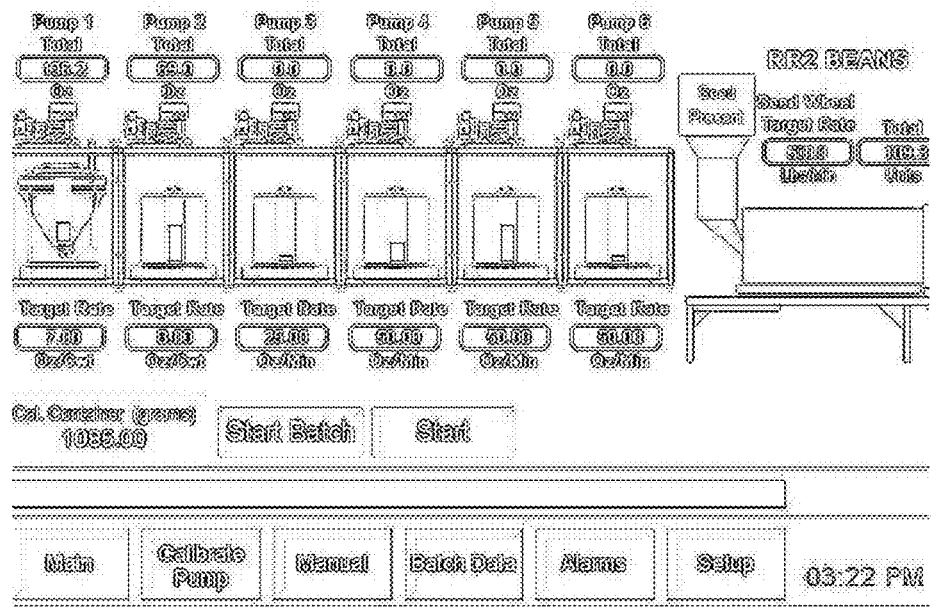
FIG. 18 depicts an exemplary seed treatment system multi-station status screen.

FIG. 18 depicts an exemplary seed treatment system multi-station status screen. This screen depicts the amount of fluid pumped from each station 104, the target flow rates for each station 104, the approximate volume of fluid remaining in each keg, and the target rate for the seed wheel. Additionally this screen indicates that seeds are present in a hopper that provides untreated seeds to the seed treatment apparatus 200. A lack of seeds in the hopper can indicate the end of a batch or cause an alert directing the operator to introduce additional untreated seeds before continuing the chemical application.

Figure 19:
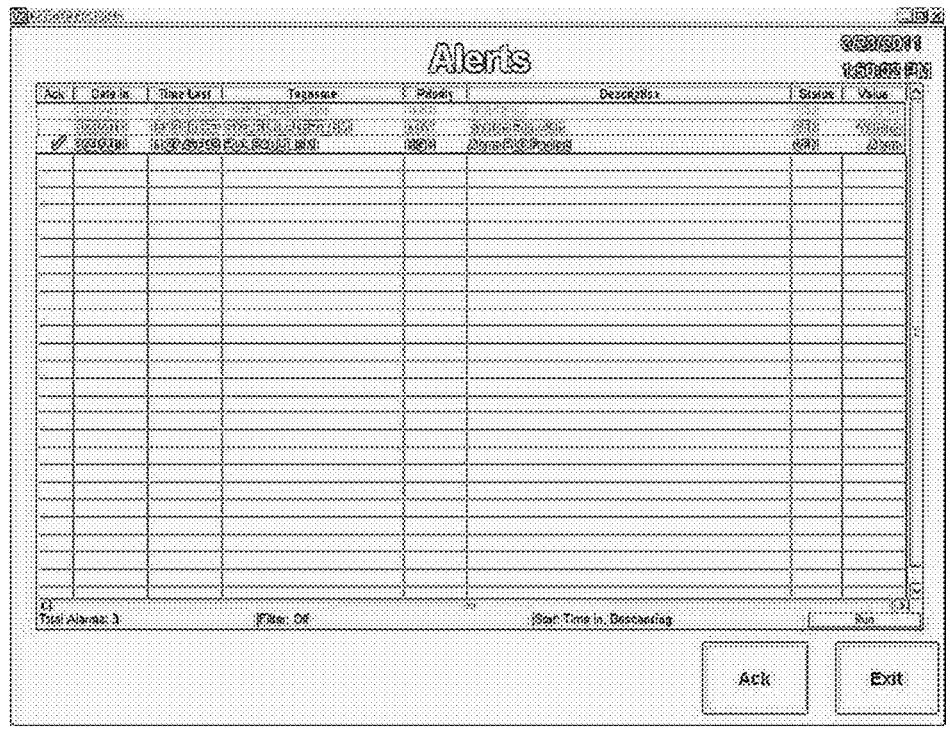
FIG. 19 depicts an exemplary alert/alarm screen.

FIG. 19 depicts an exemplary alert log screen. The alert log screen depicts each alert that is detected or generated by the system 100. Alerts can be categorized as either low priority warnings or high priority alarms. Each alert is time and date stamped and can indicate if an user/operator has acknowledged the presence of the alert.

Figure 20:
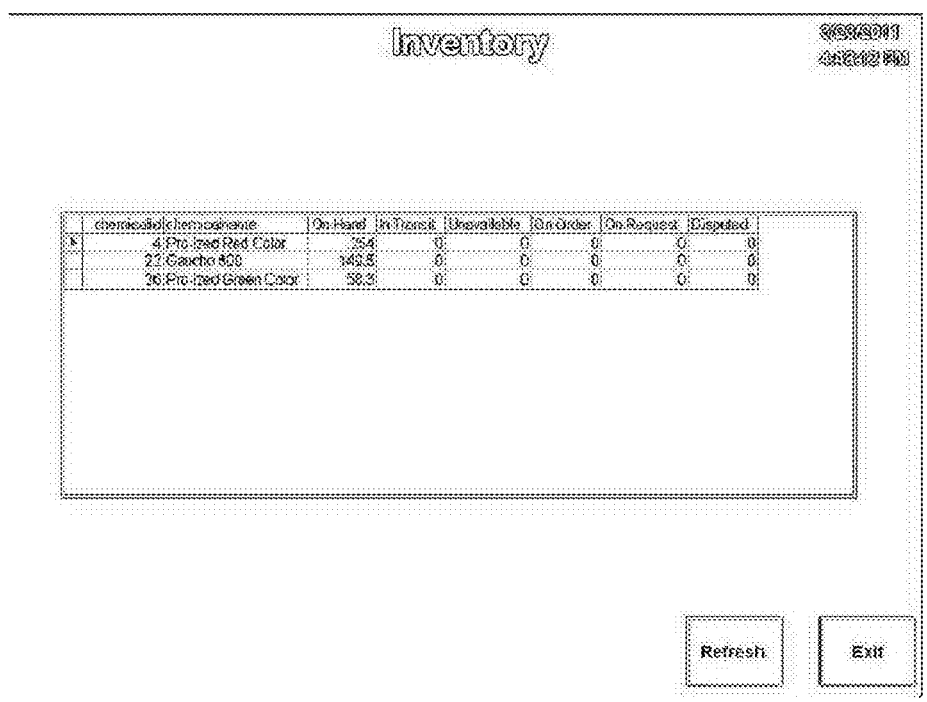
FIG. 20 depicts an exemplary local inventory screen.

FIG. 20 depicts an exemplary inventory screen. The system 100 can maintain an inventory database of all kegs that are available or in transit to an installation. Inventory information can be maintained both locally at the system controller 102 and at a remote data store 180. When a user enters a desired batch quantity of seed and a treatment recipe into the system controller 102 the necessary quantity of each chemical formulation required for the recipe and the amount of seed is calculated. If there is insufficient inventory of any single chemical formulation the system controller 102 can provide an alert or warning indicating that completion of the desired batch could not be completed until more inventory is on hand.

Figure 21A:
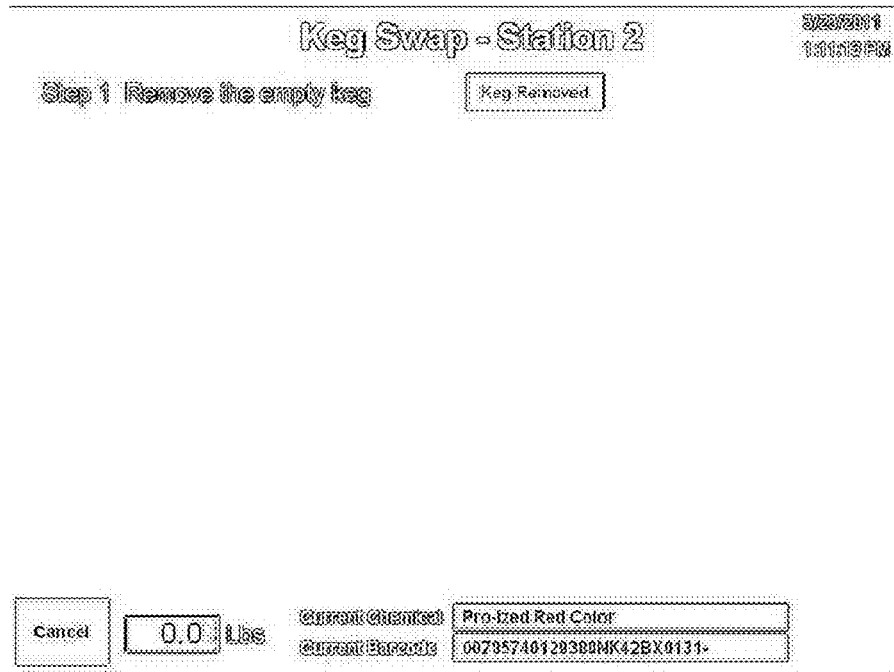
FIG. 21a-21f depict an exemplary set of keg swap instruction screens.
Figure 21B:
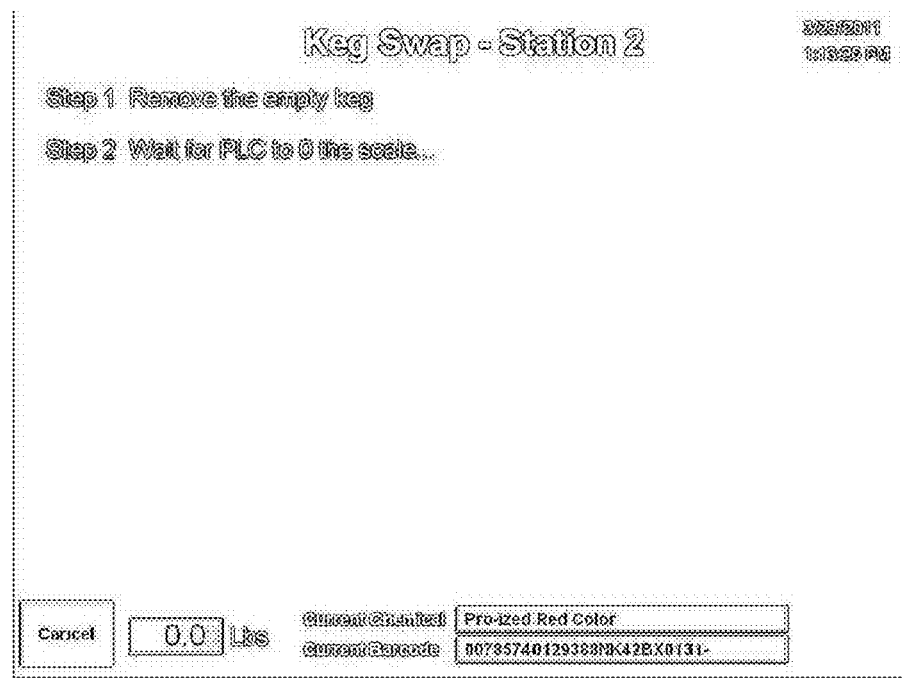
Figure 21C:
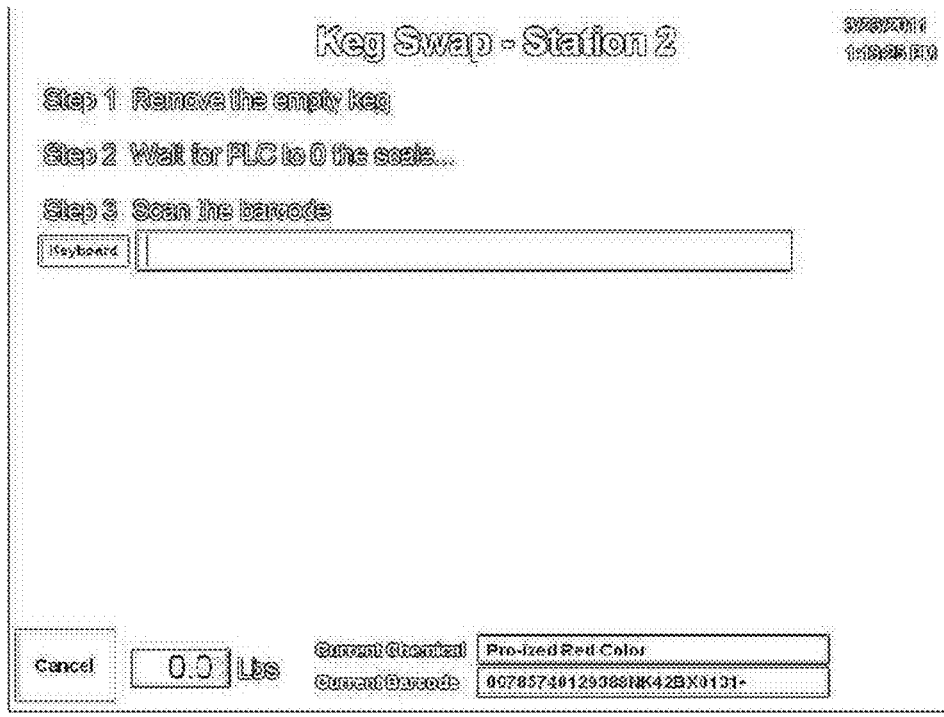
Figure 21D:
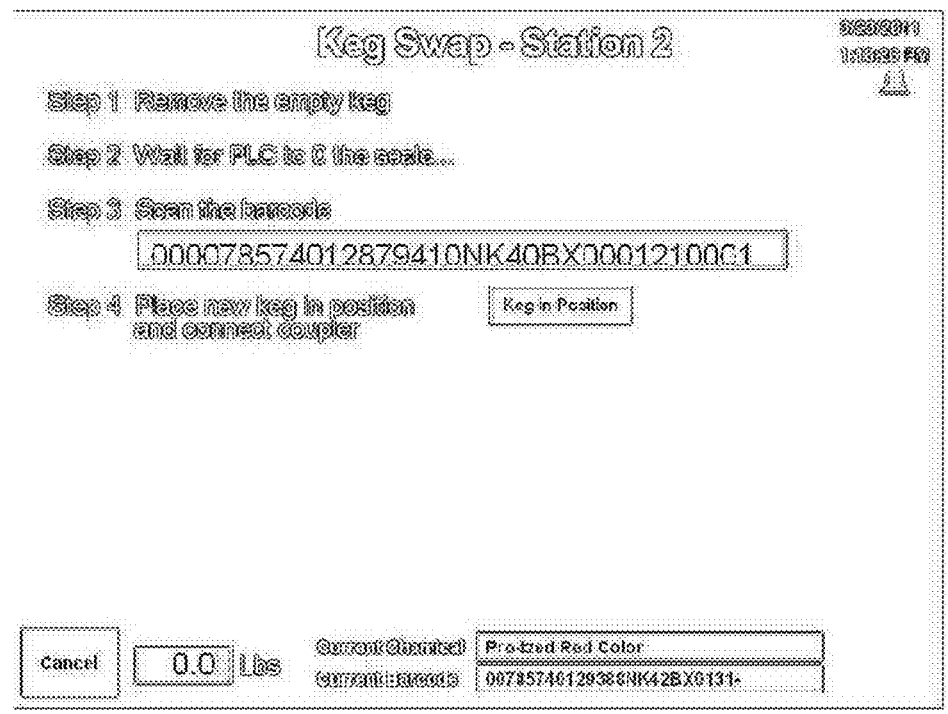
Figure 21E:
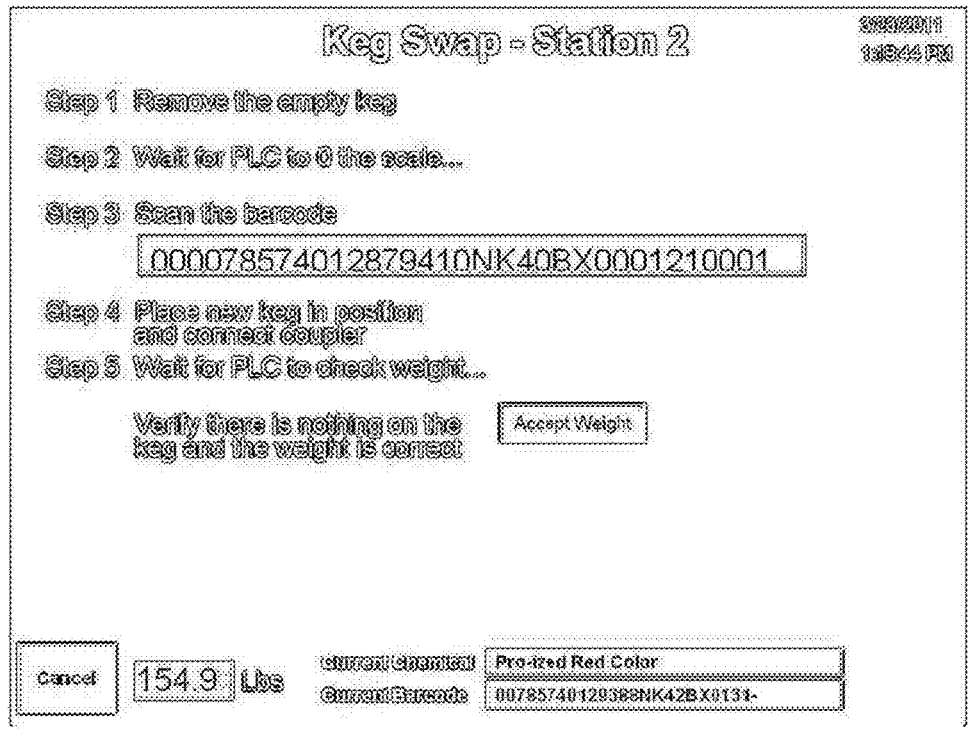
Figure 21F:
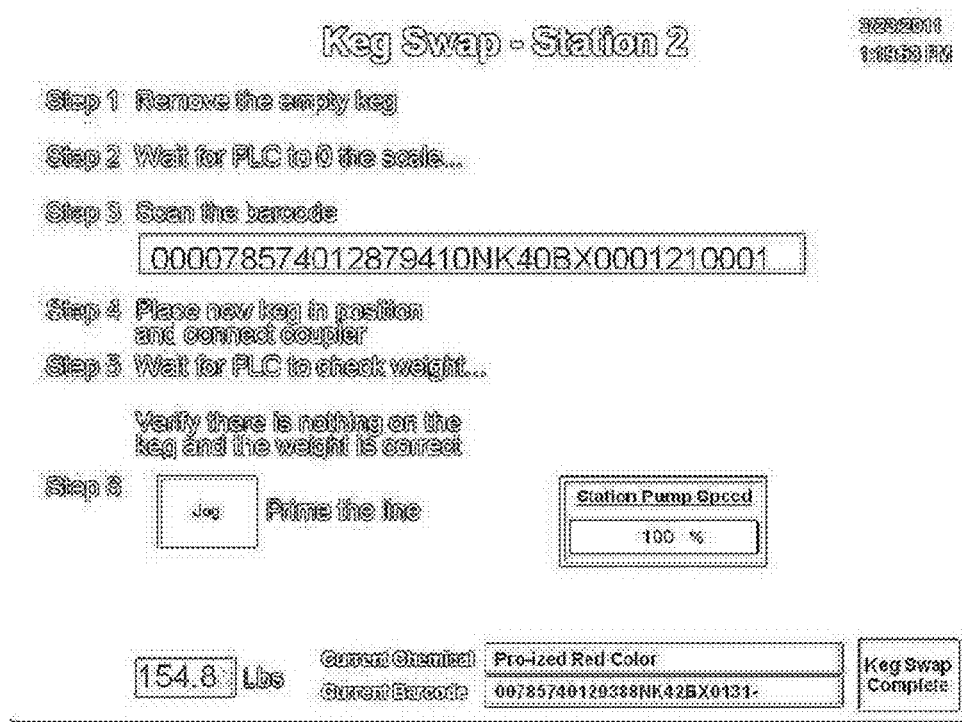

FIGS. 21*a*-21*f* depict the sequence of steps for replacement of a keg 106 at an individual keg station 104. Each step is provided to the system operator and can require the operator to confirm that each step is performed before the next step begins. In this manner the system can verify the desire procedure is followed and that a keg 106 with a chemical formulation other than the formulation that the keg station 104 is configured for is introduced into the system. FIG. 21*f* also provides an interface for the system operator to prime the fluid line at the keg station by running the station pump 108 after a new keg to remove any air. A new keg could potentially have air in the top of an internal dip tube in the keg that should be extracted from the fluid supply lines prior to seed treatment.

Embodiments of system 100 can include an interface to manage and view data related to both retail seed-treaters and end product customers of treated seed.

Figure 22:
FIG. 22 on-line depicts an exemplary login screen.

FIG. 22 depicts an exemplary on-line login screen. Access to the customer and inventory data can be strictly controlled to individuals, groups, retailers, suppliers, or other entities as needed.

Figure 23:
FIG. 23 depicts an exemplary on-line user list screen.

FIG. 23 depicts an exemplary on-line user list screen that depicts retail seed-treaters and their contact information.

Figure 24:
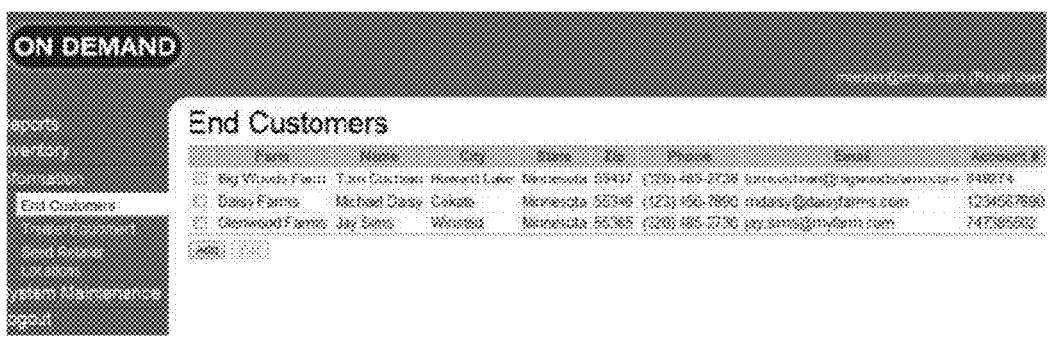
FIG. 24 depicts an exemplary on-line customer list screen.

FIG. 24 depicts an exemplary on-line customer list screen that includes the customer name, address, contact information and account number.

Figure 25:
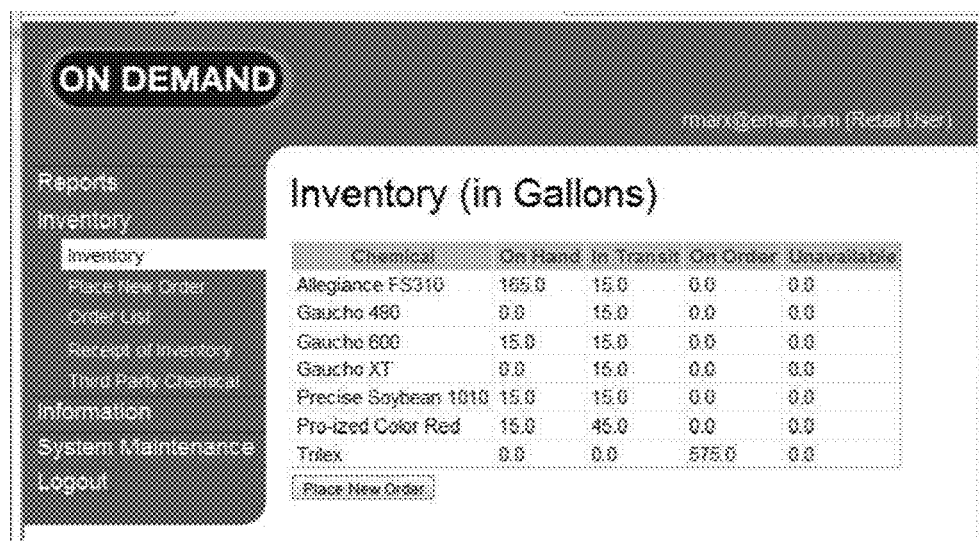
FIG. 25 depicts an exemplary on-line inventory screen.

FIG. 25 depicts an exemplary on-line inventory screen that depicts the current inventory level of an individual retailer. This information can be dynamically updated through the network and information system connections to the retailer's seed treatment system 100 as the retailer's inventory is depleted by seed application batches.

Figure 26:
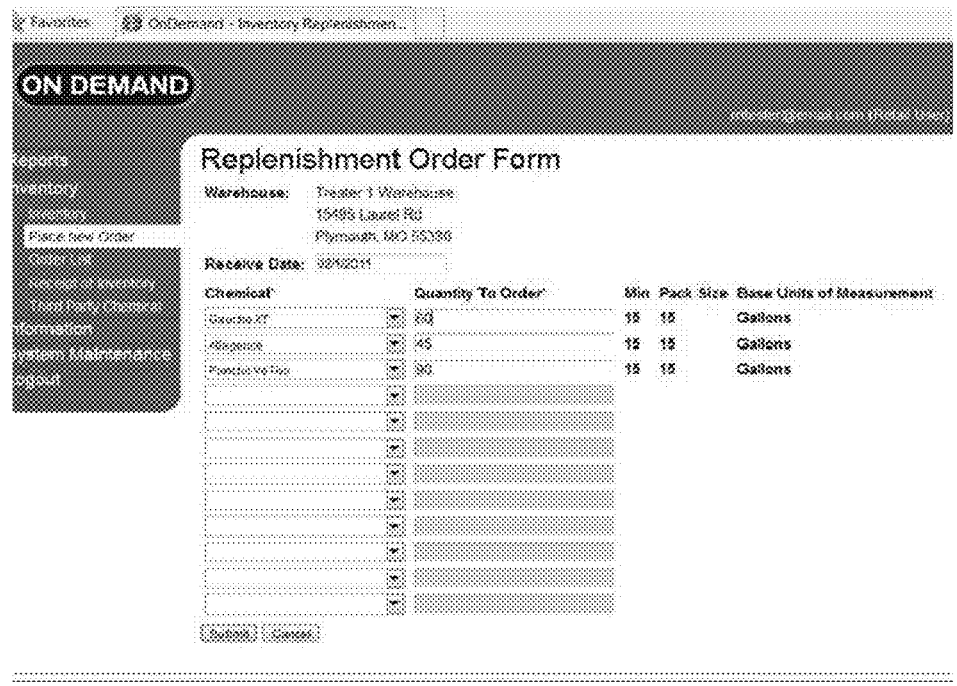
FIG. 26 depicts an exemplary on-line order-from screen.

FIG. 26 depicts an exemplary on-line order-from screen that provides a retailer with an interface to specify the type of chemical and the quantity desired.

Figure 27:
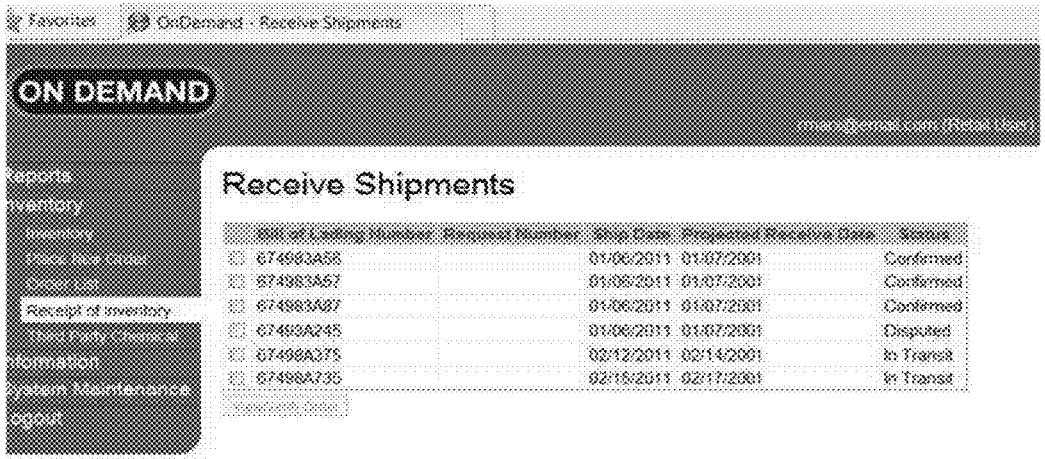
FIG. 27 depicts an exemplary on-line shipment-tracking screen.

FIG. 27 depicts an exemplary on-line shipment-tracking screen that allows both the chemical supplier and the retail seed-treater to track and monitor inventory shipments of treatment components.

Figure 28:
FIG. 28 depicts an exemplary on-line shipment-received reporting screen.

FIG. 28 depicts an exemplary on-line shipment-received reporting screen. This screen allows the retail seed-treater to confirm the receipt of the ordered and received shipments. In this manner the retailer's inventory can be tracked from the chemical supplier, through delivery, and ultimate use in seed treatment application batches.

Figure 29:
FIG. 29 depicts an exemplary on-line inventory screen.

FIG. 29 depicts an exemplary on-line seed variety inventory screen. The inventory screen can depict a plurality of seed varieties and information including the seed name, producing company, seed type, seed material code, and a description. The seed inventory can depict the current inventory at a retail location or provide a listing of seed types that can be ordered by a retailer.

Figure 35:
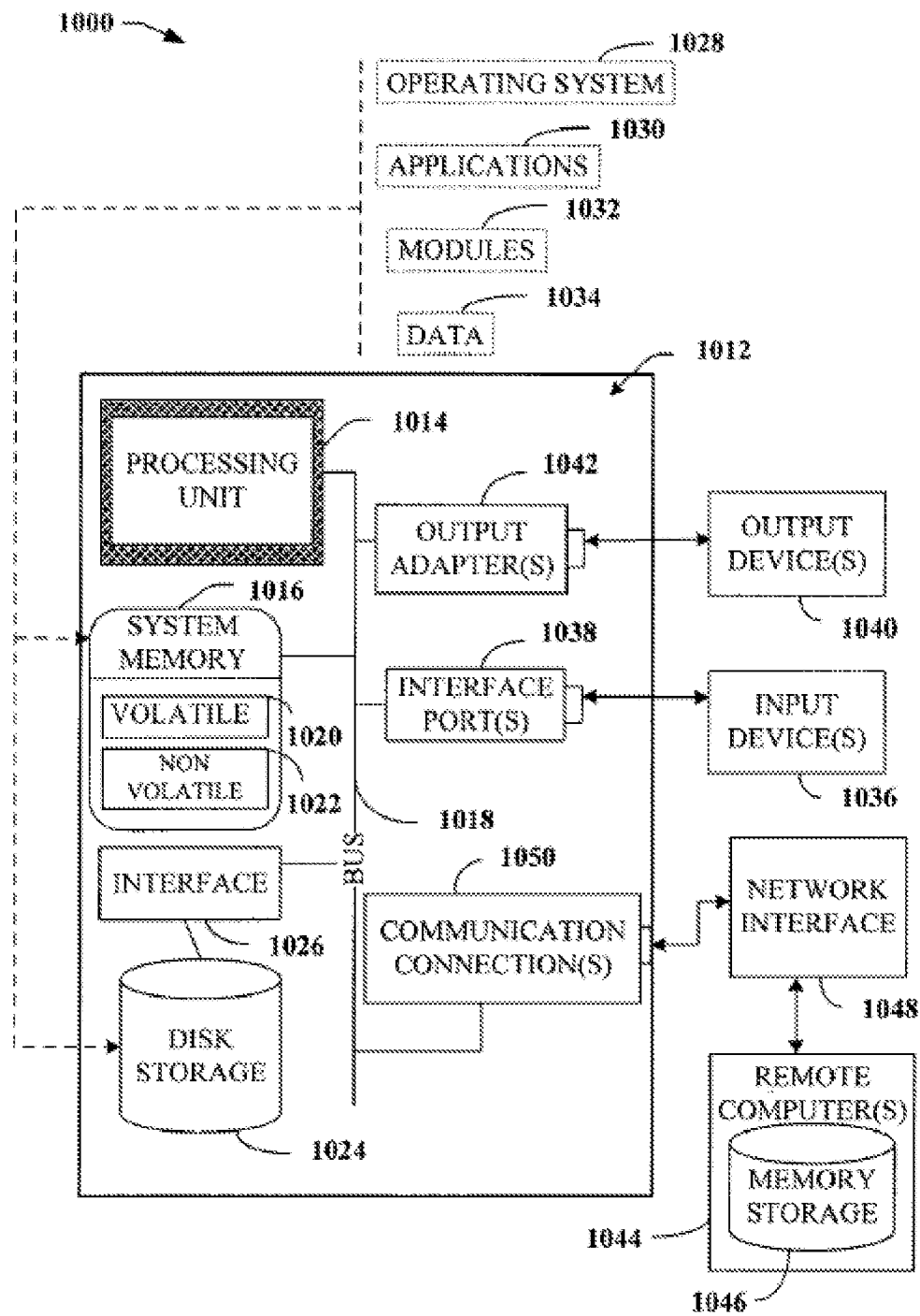
FIG. 35 depicts an exemplary computer controller architecture according to an embodiment of the invention.

Referring to FIG. 35, an exemplary environment 1000 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors, multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Intelligent Drive Electronics (IDE), Peripheral Component Interconnect (PCI), Universal Serial Bus (USB), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), or flash memory. Volatile memory 1020 includes random access memory (RAM). Computer 1012 also includes removable/non-removable, volatile/non-volatile computer storage media, for example disk storage 1024.

It is to be appreciated that FIG. 35 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, stylus, touch pad, keyboard, microphone, scanner, digital camera, web camera, and the like. These and other input devices connect to the processing unit 1014 through the system bus 1018 via interface port(s) 1038. Interface port(s) 1038 include, for example, a serial port, a parallel port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Ethernet, and the like. WAN technologies include, but are not limited to, point-to-point links, circuit-switching networks like Integrated Services Digital Networks (ISDN) and variations thereon, packet switching networks, and Digital Subscriber Lines (DSL).

An embodiment of the present invention provides for the reclamation of kegs 106 and any chemical residue or unused formulation contents upon the substantial depletion of the chemical formulation. By recording the weight of the original contents in a full keg 106 prior to use, monitoring and recording the use of the chemical formulation through continuous weighing during the application, and recording the weight of a keg 106 upon its removal from a station 104 and return to a processing facility can provide for the verification of keg integrity, and the content formulation quality. The recycling or reclamation of the keg 106, the keg stirrer components and/or any keg port or valve components can reduce the overall cost of chemical formulation distribution. Environmental protection through proper handling of the keg 106 and its contents through the distribution cycle from filling, delivery, use, return and reclamation is provided by an embodiment of the present invention that includes the tracking of each individual keg 106. The tracking of each keg 106 can be accomplished by maintaining an inventory database of each keg 106 that includes a location and a unique identifying number, bar code, or RFID tag data, for each keg 106. Loss prevention of excess chemical and kegs can be tracked, monitored, and remedied because a complete audit trail of the location of each keg 106 and its contents is maintained.

An embodiment of the present invention includes a method of tracking the use of a chemical formulation by providing a varying nominal quantity of chemical formulation in each keg or container and recording that nominal quantity in each container. For example a chemical provider can fill a container, the container having a unique identifier and an actual capacity greater than an indicated capacity, with a nominal amount of a chemical formulation above the indicated capacity and record an original weight of the container and the chemical formulation in the container. By recording the unique identifier and the original weight of the container the chemical provider can maintain a database of information including the precise amount of chemical formulation that was prepared and distributed in the container to a customer.

Figure 37:
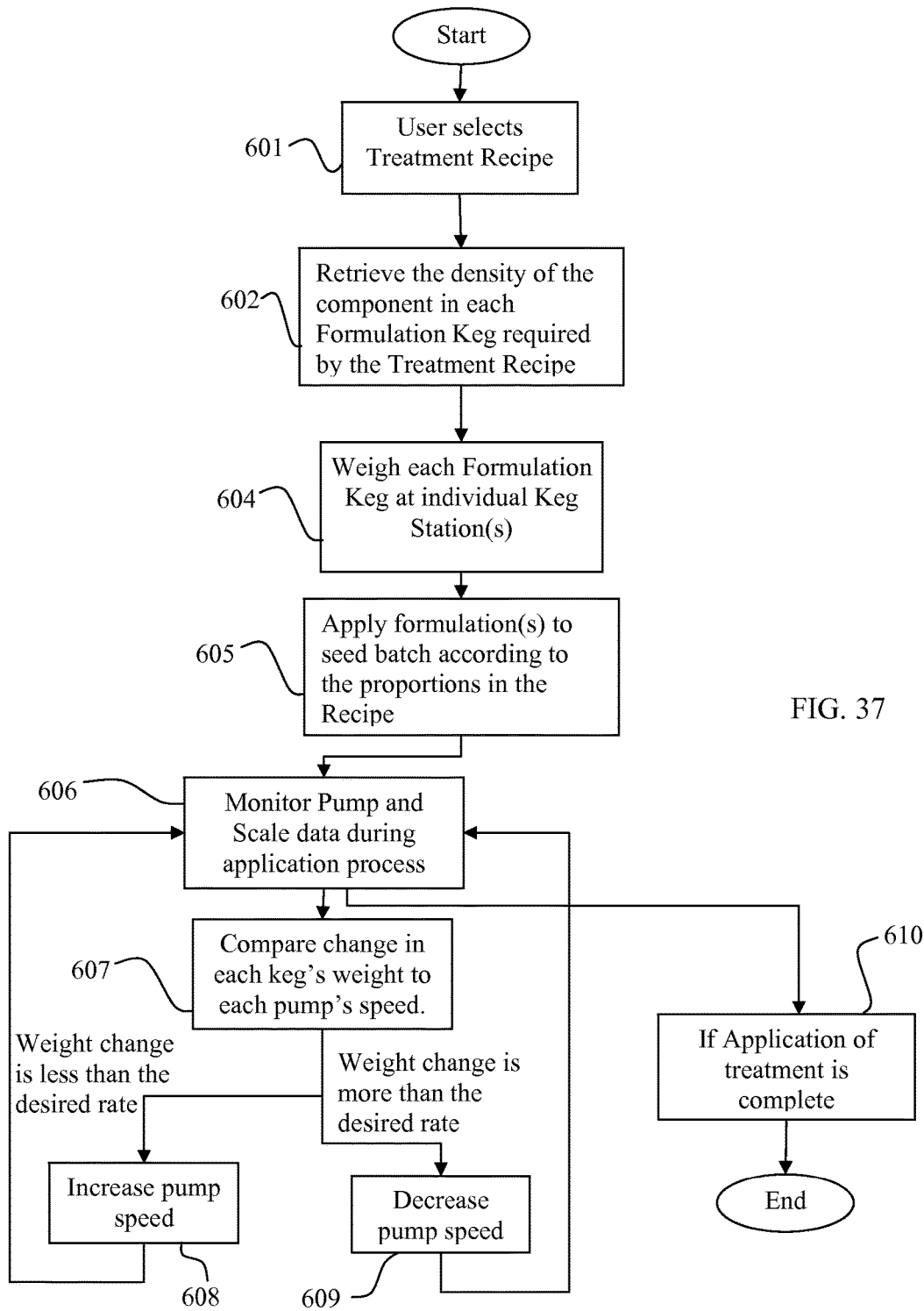
FIG. 37 depicts an exemplary block diagram of an adaptive pump rate algorithm according to an embodiment of the present invention.
Figure 38:
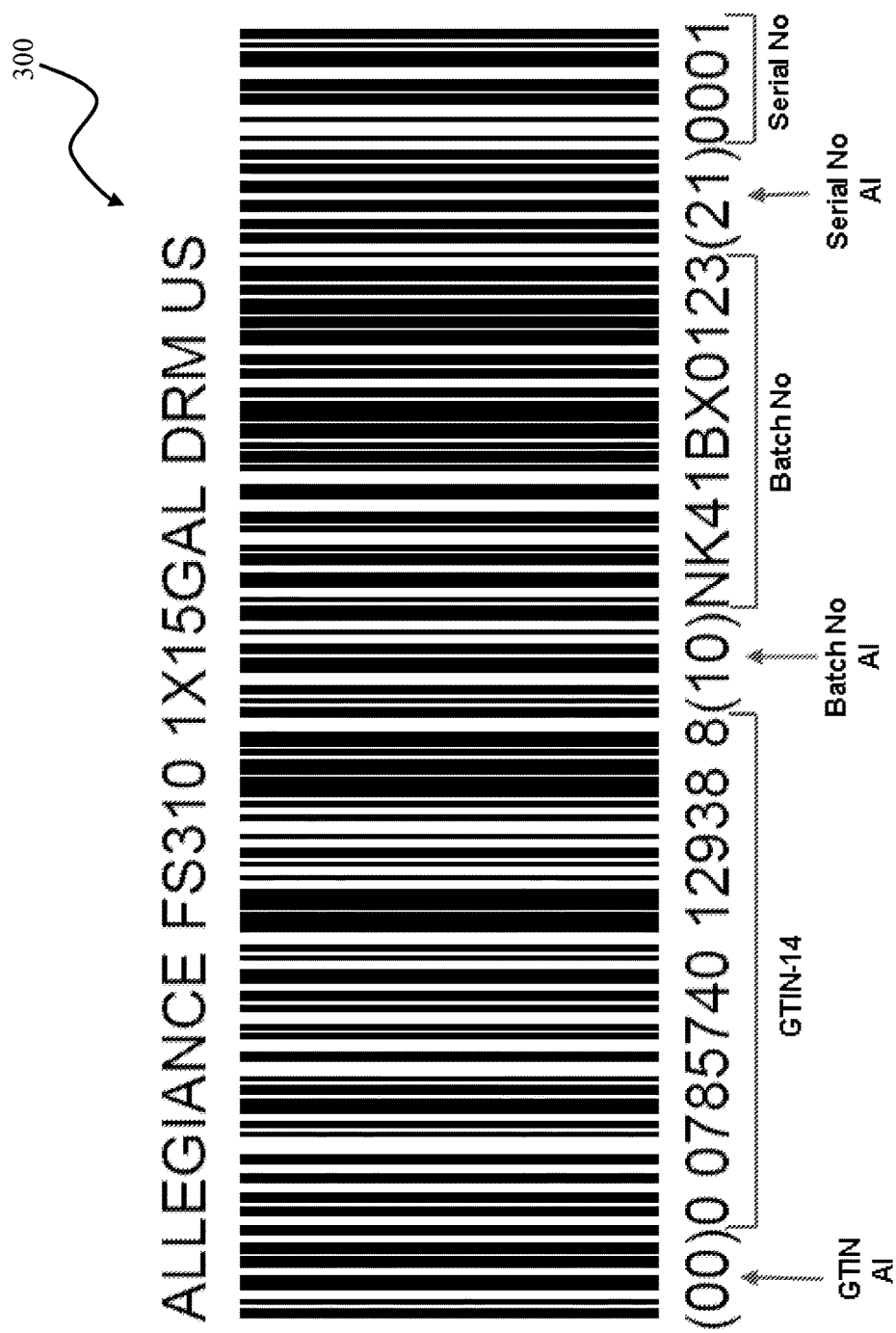
FIG. 38 is an exemplary barcode suitable for use with kegs herein.

FIG. 37 depicts an exemplary bar-coded label 300 that can be affixed to an individual keg 106 providing a unique identifier. An actual barcode would not contain the spaces or parenthesis. They are included in the figure to clarify the human readable text. The application identifiers (AI) indicate what the following data represents.

This is an exemplary fixed length barcode, however, some keg formulations can have a different length batch number and may not have the serial number portion at the end of the bar code. In one embodiment of the invention a fixed ten character batch number is padded with leading zeroes and a four character serial number is used.

The Global Trade Item Number (GTIN) will typically be 14 characters. The entire GTIN-14 can be used to identify the material and can include several sub-parts or fields. The first digit encodes the package size, zero represents smallest saleable unit, in this case a fifteen-gallon keg. The next seven digits represent the GS1 Company Code, for example 0785740 is the code for Bayer Crop Science. The next five digits represent the UCC product code, in this example 12938 is the code for Allegiance FS310 1X15GAL DRM US. The last digit is a check digit, 8 in this example.

The use of an embodiment of a chemical application system, such as seed treatment system 100, can provide the chemical provider with a mechanism to remotely monitor the withdrawal of the chemical formulation from the container and record a quantity of the chemical formulation withdrawn from the container by monitoring the change in weight of the container as the chemical formulation is withdrawn. Upon receipt of the returned container after the quantity of the chemical formulation is withdrawn from the container the chemical provider can again weigh the container and record a received weight of the container and any remaining amount of the chemical formulation in the container. By comparing the received weight of the container and the weight of the quantity of the chemical formulation withdrawn from the container to the original weight of the container the chemical provider is able to determine if the chemical formulation was tampered with, spilled, diluted, or otherwise used in a manner inconsistent with the environmental or contractual requirements.

The generation of a report including the unique identifier of the container, the chemical formulation, the customer, the distributor, the original weight of the container, the nominal amount of a chemical formulation, the withdrawn quantity of the chemical formulation, and the received weight of the container can provide an audit trail that enables an investigation of any irregularities in the handling or use of the chemical formulation.

Embodiments can provide instructions that discourage any manual access to liquid seed treatment chemicals, such as by opening and manually pouring the chemicals out, thereby reducing the likely hood that any chemical is spilled or contaminated. Instructions can be provided to maintain a closure on the kegs when not placed on a keg station and coupled to an appropriate quick-connector.

FIG. 36 depicts an exemplary flow diagram of a process to treat a batch of seed for an end customer and appropriately bill that customer for only the amount of treatment chemical that was actually applied to the end-customer's seeds. Various steps in the sale and billing of the chemical components utilized in a seed treatment batch include:

A user selecting a treatment recipe.

An inventory check in the local database is performed for presence of the formulation(s) required by the Recipe.

If formulation(s) out of stock that formulation is ordered and the sale is postponed until the necessary components are in-stock or an alternate recipe can be selected.

Upon the selection of a recipe with sufficient stock on hand, each formulation keg at each individual keg/pump station is weighed and the weights are recorded in a database.

The formulation(s) are applied to the seed batch according to the proportions specified in the selected recipe.

During the application process the pump and scale data from each station are logged.

If a keg-swap is required to replace an emptied keg during application, the application process can be suspended during the swap, or utilize a second keg station setup to supply the same chemical formulation.

Upon completion of the application process the final pump and scale data are again logged, recording the weight of each keg at the station and resulting weight of the formulation applied to the seed batch.

The volume of the formulation applied to seed batch is calculated along with the corresponding cost of the formulation.

A bill is generated for amount of each chemical formulation and for the total cost of the recipe applied to the batch of seeds.

FIG. 37 depicts an exemplary flow diagram of a process to adjust the flow rate of each individual pump during the treatment application process. Various steps in automatic adjustment of an individual chemical component treatment rate can include:

Retrieving the density of each component in a treatment recipe from an individual keg or a user entered value.

Weighing each keg containing a component required by the treatment recipe.

Applying each component at a rate specified by the treatment recipe.

Monitoring the change in weight of each keg during the application process

Utilizing the retrieved density information, comparing the change in weight of each keg to the expected component application rate and the speed of the pump Adjusting the pump speed until the application rate specified in the treatment recipe is achieved.

Continuing to monitor the treatment rate of each component during the entire treatment application process.

In one embodiment the process depicted in FIG. 37 can include adjusting a rate at which water is mixed with the individual treatment components to control the concentration of the treatment formulation. The rate of water injection can be adjusted in response to an increase or decrease of the rate of seeds flowing through the treatment apparatus, to the relative humidity of the environment as sensed by a weather station component, to moisture readings obtained from seeds entering or exiting the seed treatment apparatus, or in response to an operators commands to manually increase or decrease the moisture content of the seeds emerging from the seed treatment apparatus.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art. Embodiments of the present invention also have application in areas other than seed treatment, such as applications where a precise custom blending of liquid products are desired or required. For example, custom blending can be provided with an embodiment of the present invention, without being coupled to a seed treatment apparatus. A custom seed-treater, or a seed company entity, can utilize a recipe that calls for the blending of several components. The recipe can be transmitted over a network to an embodiment of the present invention, which in turn will precisely release materials from their respective kegs to a common receptacle, whereupon the components are collected to create the custom blended seed-treatment composition. At that or a later time, the custom blended seed treatment composition can be stored or transferred. When desired, the composition can be supplied in to the proper portion to an appropriate system. That system can be equipped to coat the seeds, whereupon the custom blended mixture is applied to the seeds, or some other appropriate use or application.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The invention claimed is:

1. A seed treatment system for use at a facility for delivery of treated seeds to retail customers for planting, the facility having a stock of manually handleable kegs received from a seed treatment formulation supplier, the manually handleable kegs each filled with fluid being one of a plurality of different seed treatment formulations, the seed treatment system comprising:

a plurality of keg stations for placement at the facility, each keg station having a scale and a seating surface defining a receiving region for receiving a selected one of the stock of the filled manually handleable kegs, each keg station further having a fluid coupling for connecting to said selected one, and a pump connected to the fluid coupling for pumping the seed treatment formulation in said selected one out of said selected one, wherein when the selected one is depleted, said selected one may be replaced with a selected another of the stock of manually handleable kegs;

a programmable system controller coupled to each pump at each of the plurality of keg stations for controlling each said pump;

a continuous flow treatment seed treater having a seed inlet, a treatment portion, and a treated seed discharge portion; and a mixing manifold mounted to the seed treater and extending to the treatment portion of the seed treater, and wherein each of the keg stations having a fluid line for connecting directly to the mixing manifold mounted to the seed treater, wherein the seed treatment formulations from more than one of the plurality of keg stations may be simultaneously dispensed through said respective fluid lines to the mixing manifold wherein the seed treatment formulations are mixed in the mixing manifold and then applied into a continuous flow of seed in the treatment portion of the seed treater;

wherein each said seating surface is perpendicular to the direction of gravity, and wherein each said fluid coupling is, with respect to the direction of gravity, attached to a top side of said selected one of the stock of the filled manually handleable kegs;

wherein each keg has a stirrer mechanism; and wherein the programmable system controller is configured to direct a station controller to prevent operation of the stirrer mechanism during application of a chemical formulation from one of the manually handleable kegs.

2. The seed treatment system of claim 1 where each of the receiving regions of each keg station is sized for accommodating the manually handleable keg sized for 7 to 55 gallons.

3. The seed treatment system of claim 1, the programmable system controller is further configured for controlling each pump of each keg station and monitoring the loss of weight measured by the scale at each respective keg station due to the respective pumping.

4. The seed treatment system of claim 1, wherein each keg station has a pump controller and each pump is a variable flow pump.

5. The seed treatment system of claim 1, further comprising a mix tank station with a pump connected to the programmable system controller.

6. The seed treatment system of claim 1 wherein the seed treatment system is at the facility for delivery of treated seeds to retail customers and is in combination with the stock of manually handleable kegs.

7. The seed treatment system of claim 6 further comprising bulk seed storage and conveyance apparatus for mechanically conveying a stream of bulk seed storage to the continuous flow treatment seed treater, the conveyance apparatus extending to the seed treater.

8. A seed treatment system comprising:
a plurality of keg stations each having a receiving region with a seating surface for receiving a keg filled with a fluid of one of a plurality of seed treatment formulations, each keg station having a scale and a pump;
a programmable system controller electrically coupled to the pump and the scale of each of the plurality of keg stations, the programmable system controller configured to receive a weight reading from the scale of each of the plurality of keg stations and simultaneously operate and control each pump of more than one keg stations in response to a seed treatment recipe;
a seed-treater configured to apply a plurality of chemical treatments from the more than one keg stations to a quantity of seed in a uniform manner, the seed treater in direct fluid communication with each keg station;
wherein each said seating surface is perpendicular to the direction of gravity;
wherein each keg has a stirrer mechanism; and
wherein the programmable system controller is further configured to direct a station controller to prevent operation of the stirrer mechanism during application of a chemical formulation from one of the kegs.

9. The seed treatment system of claim 8 wherein the programmable system controller is operably connected to a computer network and configured to receive and send data relating to seed treatment formulations.

10. The seed treatment system of claim 9, wherein data collected during seed treatment by the programmable controller includes at least one of the following set:
a weight of chemical pumped from each container;
a duration of time the pump of each pump-station was in operation;
an average speed of the pump of each pump-station during operation; and
a quantity of chemical applied to a batch of seed.

11. The seed treatment system of claim 8, wherein each keg further comprises a support frame, and said support frame supports the respective pump at a position over the respective receiving region for the keg.

12. The seed treatment system of claim 11, wherein each keg station further an air-removal valve that is in fluid communication with the each respective pump.

13. A seed treatment system for treating seeds for delivery of the treated seeds to retail customers for planting, the seed treatment system comprising:
a seed treater having a seed inlet, a treatment portion, and a treated seed discharge portion,
a bank of keg stations, each keg station having a receiving platform for receiving a selected manually handleable keg and a fluid coupling for connecting to the keg placed on said platform, a weighing mechanism for weighing the keg placed on the platform including contents of said keg, and a variable flow pump; the bank of keg stations fluidly connected to the seed treater; and
a control processor connected to the seed treater and to each keg station of the bank of keg stations, the control processor adapted for controlling the pumping rate of each of the respective calibrated pumps, for receiving signals relating to the weighing of the kegs at each keg station, for selectively operating simultaneously select pluralities of the variable flow pumps of the keg stations in accord with one of a plurality of formulation recipes stored in the control processor or input into the control processor, and for controlling operation of the seed treater, wherein seed treatment formulations comprising fluids from kegs on the keg stations in which the select plurality of pumps are operated simultaneously are simultaneously dispensed into the treatment portion of the seed treater;
a programmable system controller coupled to each variable flow pump at each of the keg stations for controlling each said variable flow pump;
wherein each keg has a stirrer mechanism;
wherein the programmable system controller is configured to direct a station controller to prevent operation of the stirrer mechanism during application of a chemical formulation from one of the kegs;
wherein each said platform is perpendicular to the direction of gravity, and wherein each said fluid coupling is, with respect to the direction of gravity, attached to a top side of each said keg.

14. The seed treatment system of claim 13, wherein each keg station has a pump controller connected to each respective variable flow pump.

15. The seed treatment system of claim 13, further comprising a mix tank station with a pump connected to the programmable system controller.

16. The seed treatment system of claim 13 in combination with a stock of manually handleable kegs, wherein each keg has a capacity of from 5 to 25 gallons.

\* \* \* \* \*